US011941075B2

(12) United States Patent
Heully

(10) Patent No.: US 11,941,075 B2
(45) Date of Patent: Mar. 26, 2024

(54) METHOD OF BUILDING A THREE-DIMENSIONAL NETWORK SITE, NETWORK SITE OBTAINED BY THIS METHOD, AND METHOD OF NAVIGATING WITHIN OR FROM SUCH A NETWORK SITE

(71) Applicant: New3S, Saint Mande (FR)

(72) Inventor: Herve Heully, Fontenay sous bois (FR)

(73) Assignee: NEW3S, Saint Mande (FR)

( * ) Notice: Subject to any disclaimer, the term of this patent is extended or adjusted under 35 U.S.C. 154(b) by 0 days.

(21) Appl. No.: 17/893,438

(22) Filed: Aug. 23, 2022

(65) Prior Publication Data

US 2022/0405344 A1 Dec. 22, 2022

Related U.S. Application Data

(63) Continuation of application No. 17/159,355, filed on Jan. 27, 2021, now abandoned, which is a
(Continued)

(30) Foreign Application Priority Data

May 21, 2014 (FR) ...................................... 1401153

(51) Int. Cl.
*G06F 16/957* (2019.01)
*G06F 16/954* (2019.01)
(Continued)

(52) U.S. Cl.
CPC ........ *G06F 16/9577* (2019.01); *G06F 16/954* (2019.01); *G06T 19/003* (2013.01);
(Continued)

(58) Field of Classification Search
CPC ............... G06F 16/9577; G06F 16/954; G06F 3/04815; G06T 19/003; H04L 63/101; H04W 4/029
See application file for complete search history.

(56) References Cited

U.S. PATENT DOCUMENTS 6,348,927 B1    2/2002  Lipkin
2004/0221265 A1 11/2004 Leung
(Continued)

FOREIGN PATENT DOCUMENTS

EP    0 753 835    1/1997
EP    0 753 836    1/1997
(Continued)

OTHER PUBLICATIONS

Senff, D. (2013). Design and implementation of web-based navigation concepts for a multi-dimensional product catalog (Doctoral dissertation, University of Applied Sciences).*
(Continued)

*Primary Examiner* — Sarah Lhymn
(74) *Attorney, Agent, or Firm* — Clark & Brody LP

(57) ABSTRACT

A method for producing network sites, in particular websites, offers real immersion in the sites (in the manner of video games) with intuitive and fluid navigation that does not require a means for directing the avatar, allows selective referencing by a search engine of objects contained on the site, as well as providing improved access security. A simple mechanical control means (arrow keys on a keyboard, mouse without click buttons, joystick formed by a handle on a base with push buttons) or virtual control means (arrow-based computer representation, system for the detection of a movement of the hand, eye, etc., accelerometer remote control, etc.) can be used to direct the avatar. The method allows the movements of the avatar to be interpreted, such as a simple walk through the site or a command to navigate
(Continued)

Figure 3:
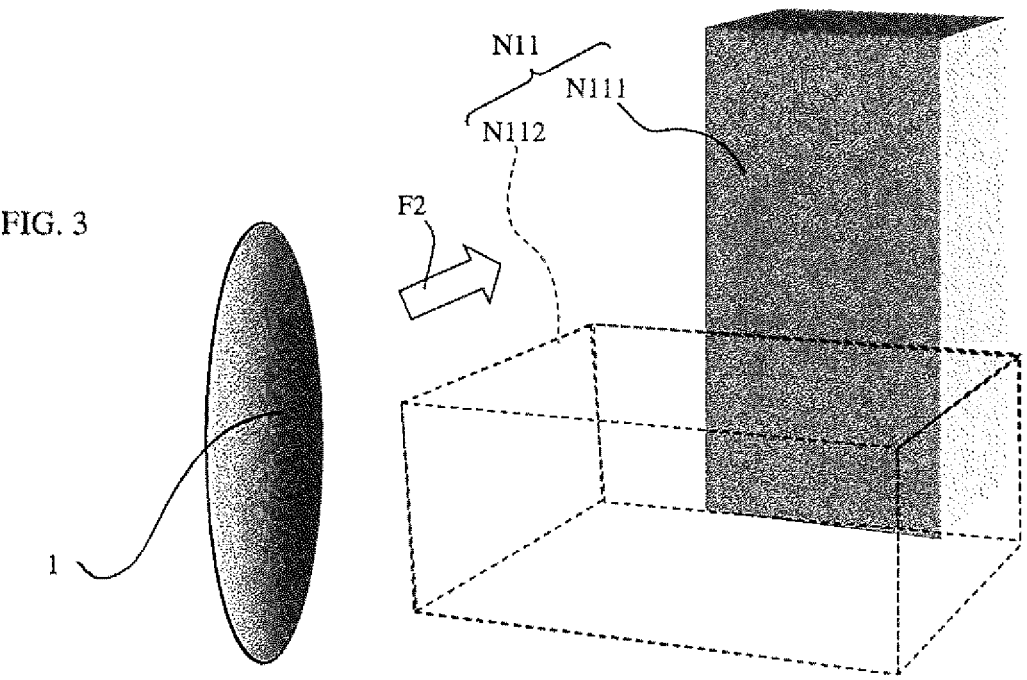

to another space on the site (same URL) or to another site (different URL).

13 Claims, 42 Drawing Sheets

Related U.S. Application Data continuation-in-part of application No. 15/312,193, filed as application No. PCT/FR2015/051325 on May 20, 2015, now abandoned.

(51) Int. Cl.
*G06T 19/00* (2011.01)
*H04L 9/40* (2022.01)
*H04W 4/029* (2018.01)
*G06F 3/04815* (2022.01)

(52) U.S. Cl.
CPC .......... *H04L 63/101* (2013.01); *H04W 4/029* (2018.02); *G06F 3/04815* (2013.01)

(56) References Cited

U.S. PATENT DOCUMENTS

| | | |
|---|---|---|
| 2008/0104018 A1 | 5/2008 | Xia |
| 2008/0109446 A1 | 5/2008 | Wang |
| 2013/0013675 A1 | 1/2013 | Lacapra |
| 2013/0212538 A1 | 8/2013 | Lemire |
| 2013/0271462 A1 | 10/2013 | Frank |
| 2014/0074272 A1 | 3/2014 | Cowden |
| 2014/0137050 A1 | 5/2014 | Alhashash |
| 2015/0067149 A1 | 3/2015 | Hitomi |
| 2015/0091906 A1 | 4/2015 | Dishno |

FOREIGN PATENT DOCUMENTS

| | | |
|---|---|---|
| WO | 00/45242 | 8/2000 |
| WO | 2009/000028 | 12/2008 |

OTHER PUBLICATIONS

"3D-Doctor User's Manual", Able Software Corp., (2012), pp. 1-269.

Hickson, Ian: HTML5: Working Draft 13, Jan. 2011, revision 1.4626, Section History and Navigation, pp. 1-26.

* cited by examiner

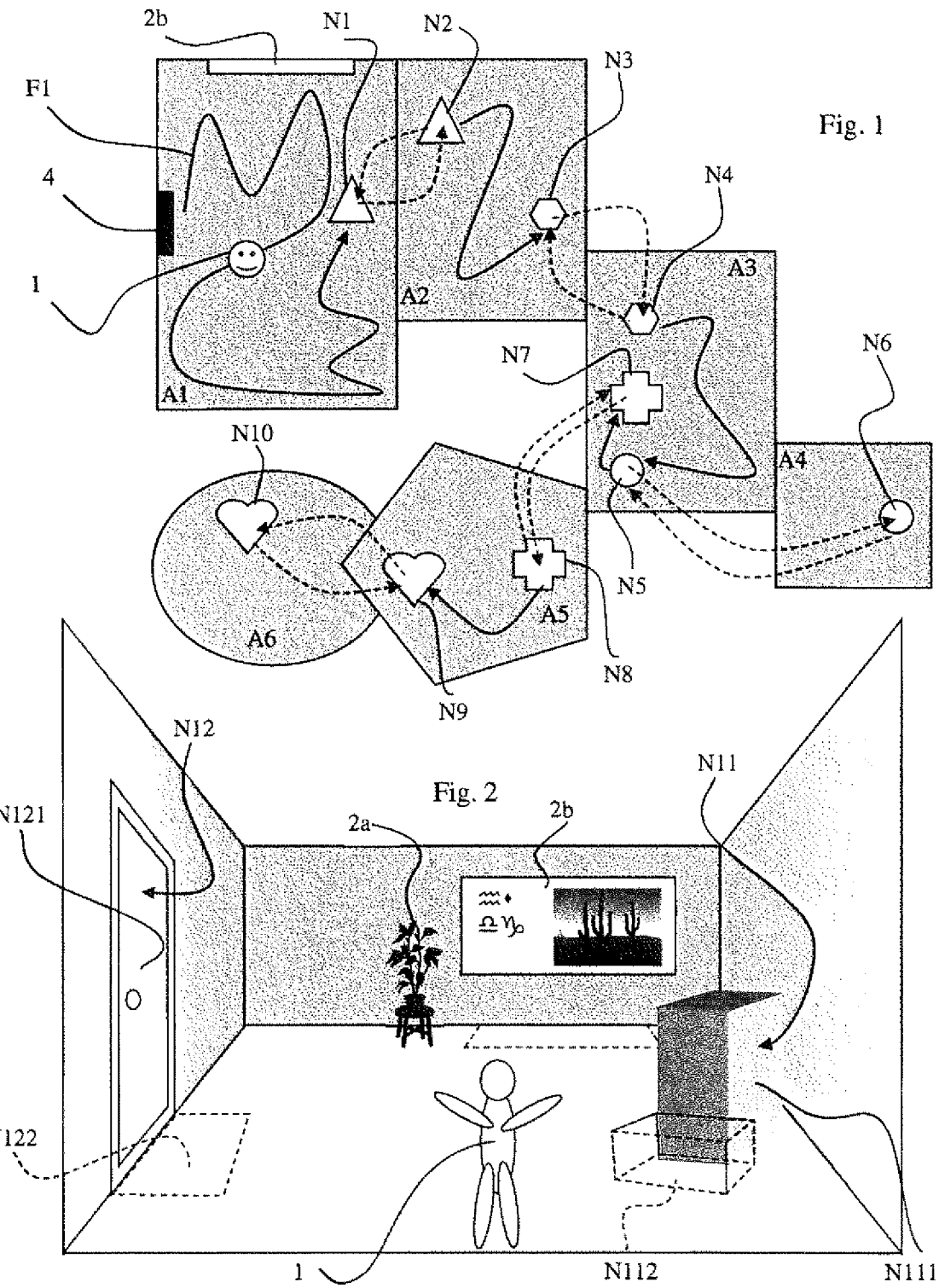

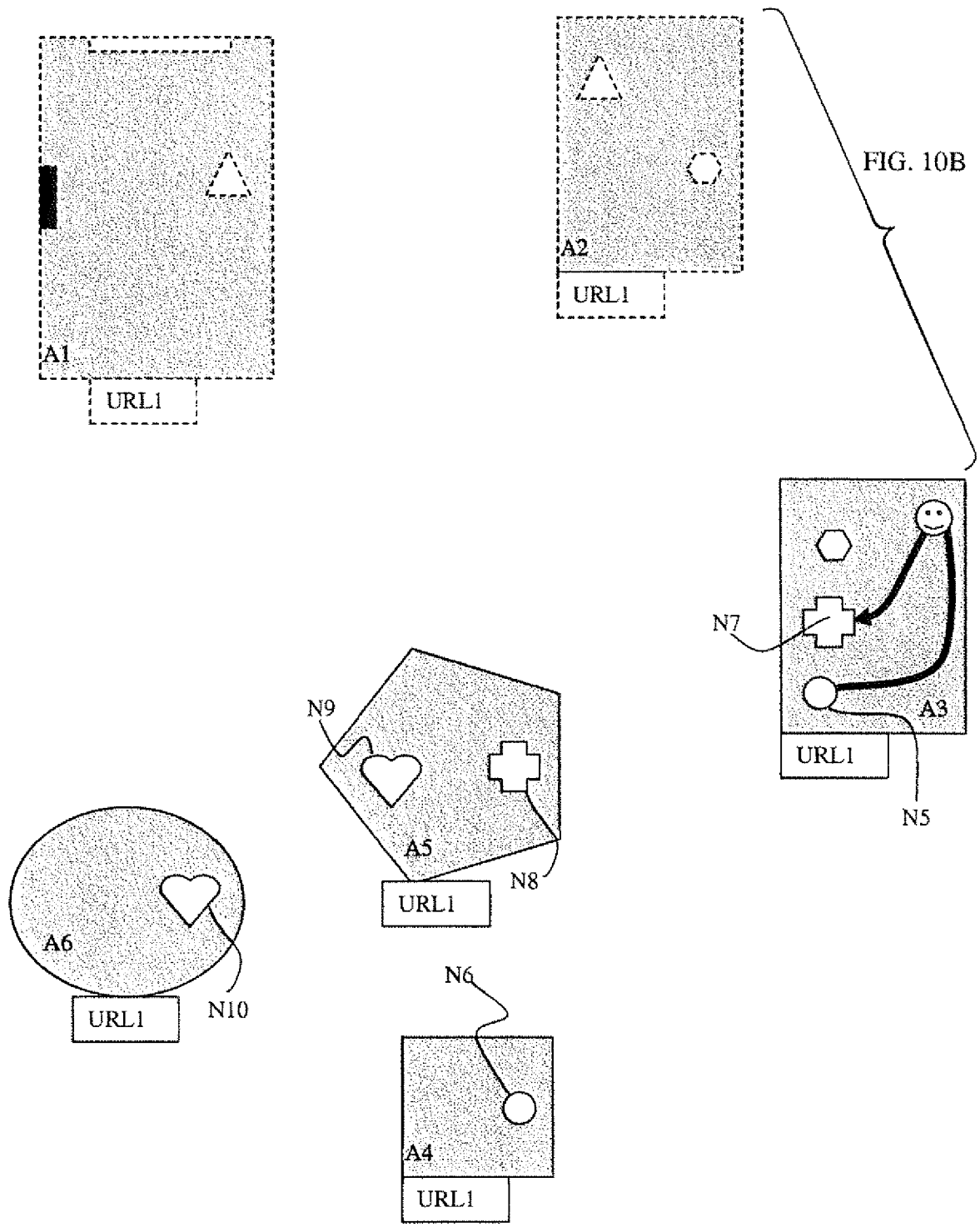

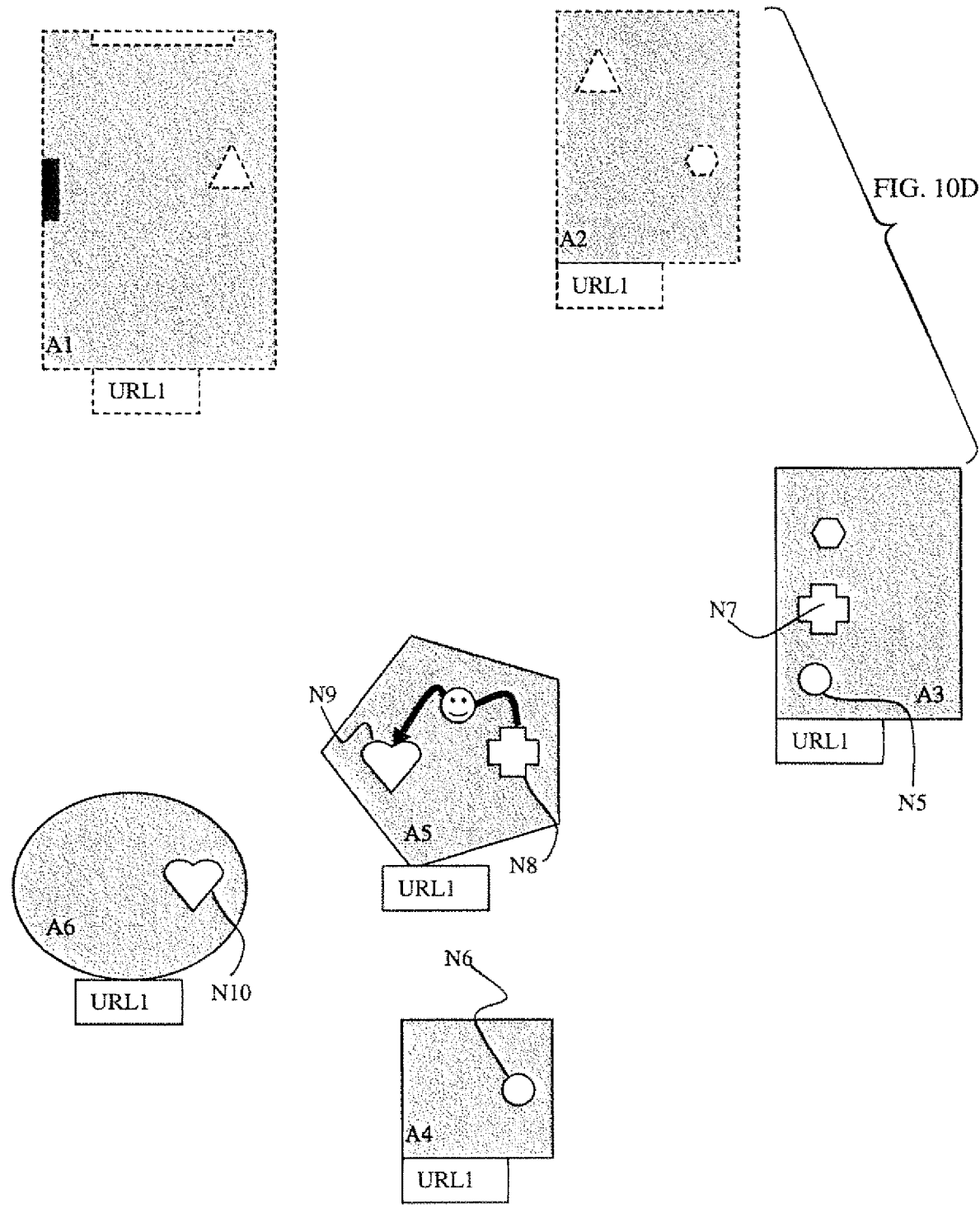

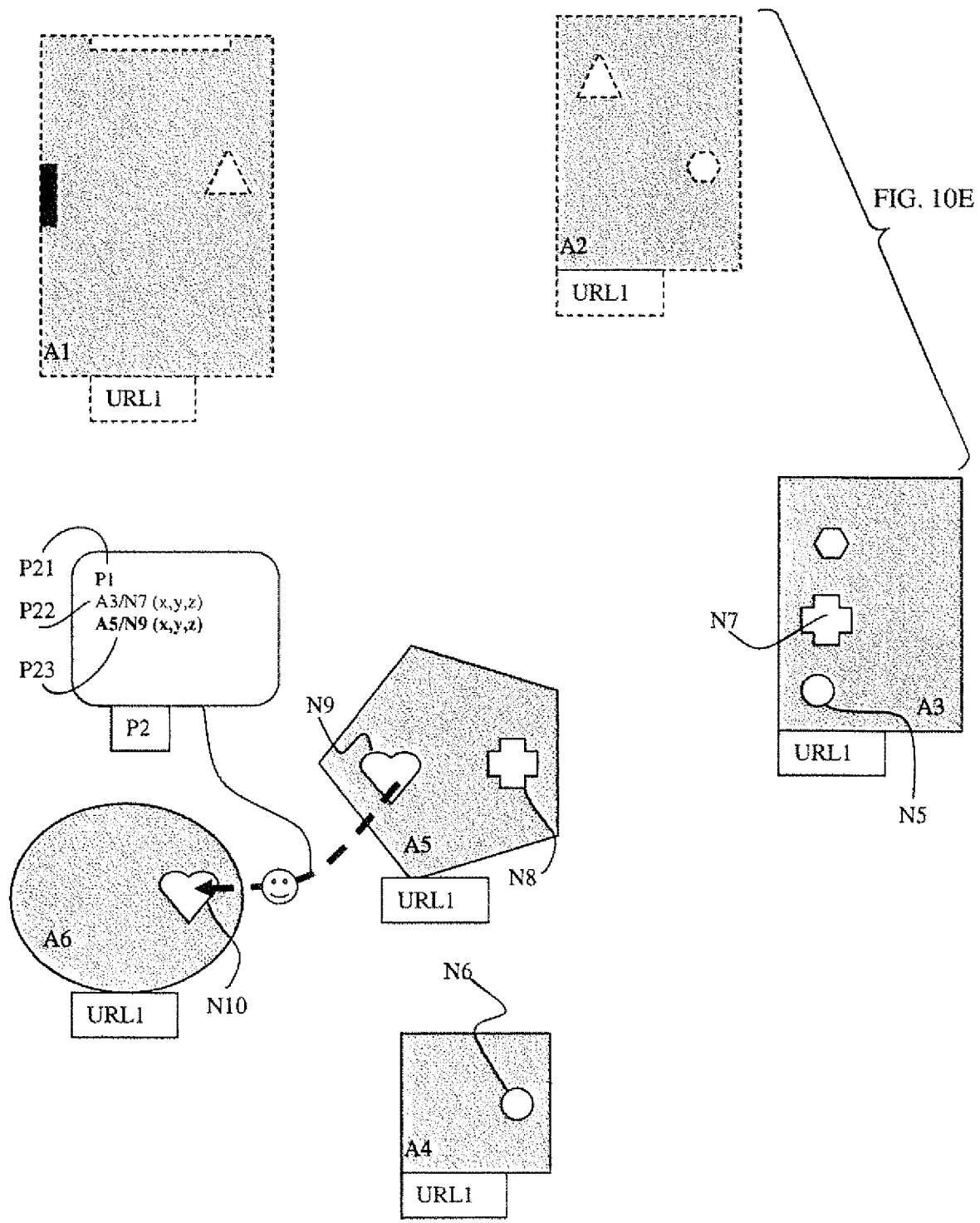

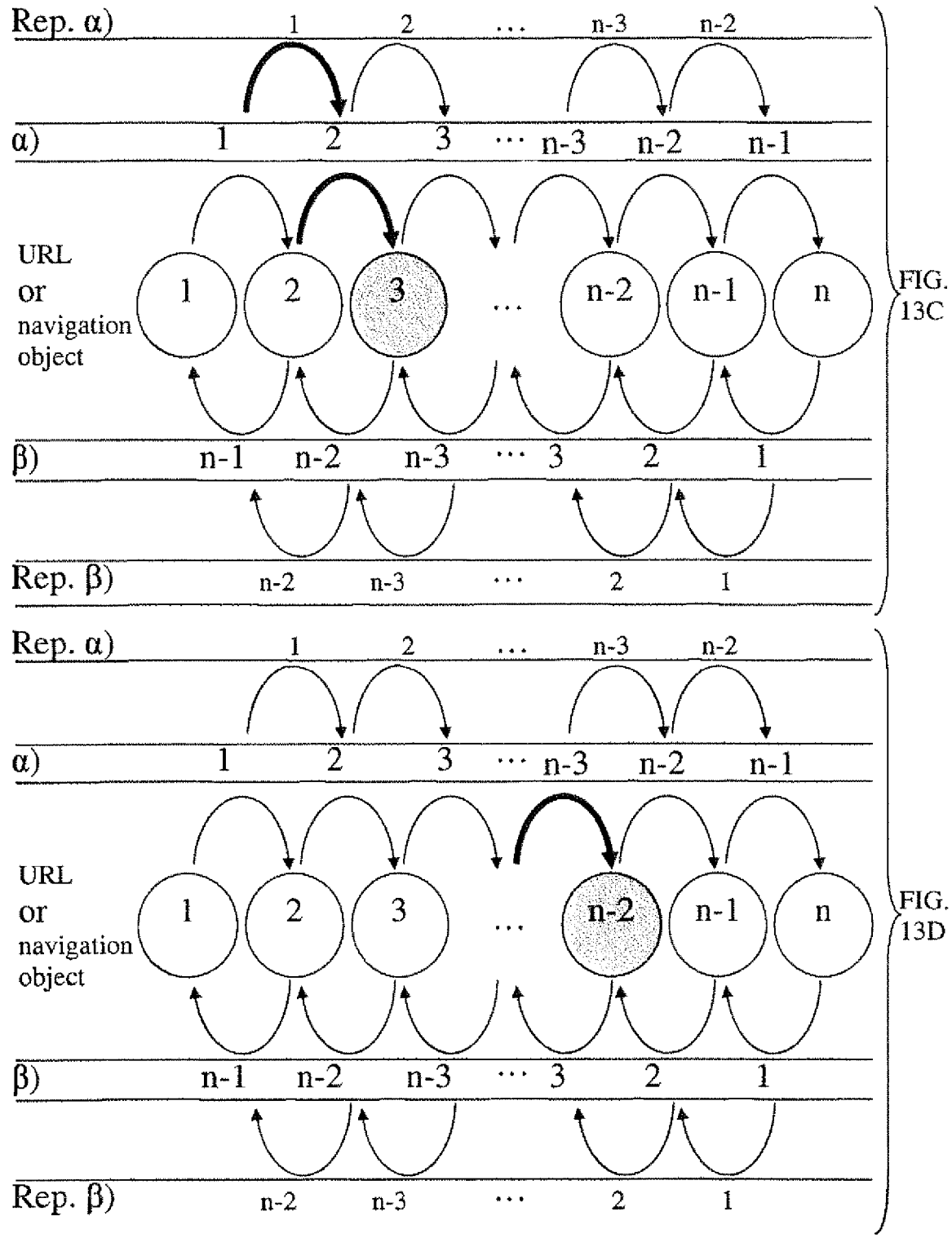

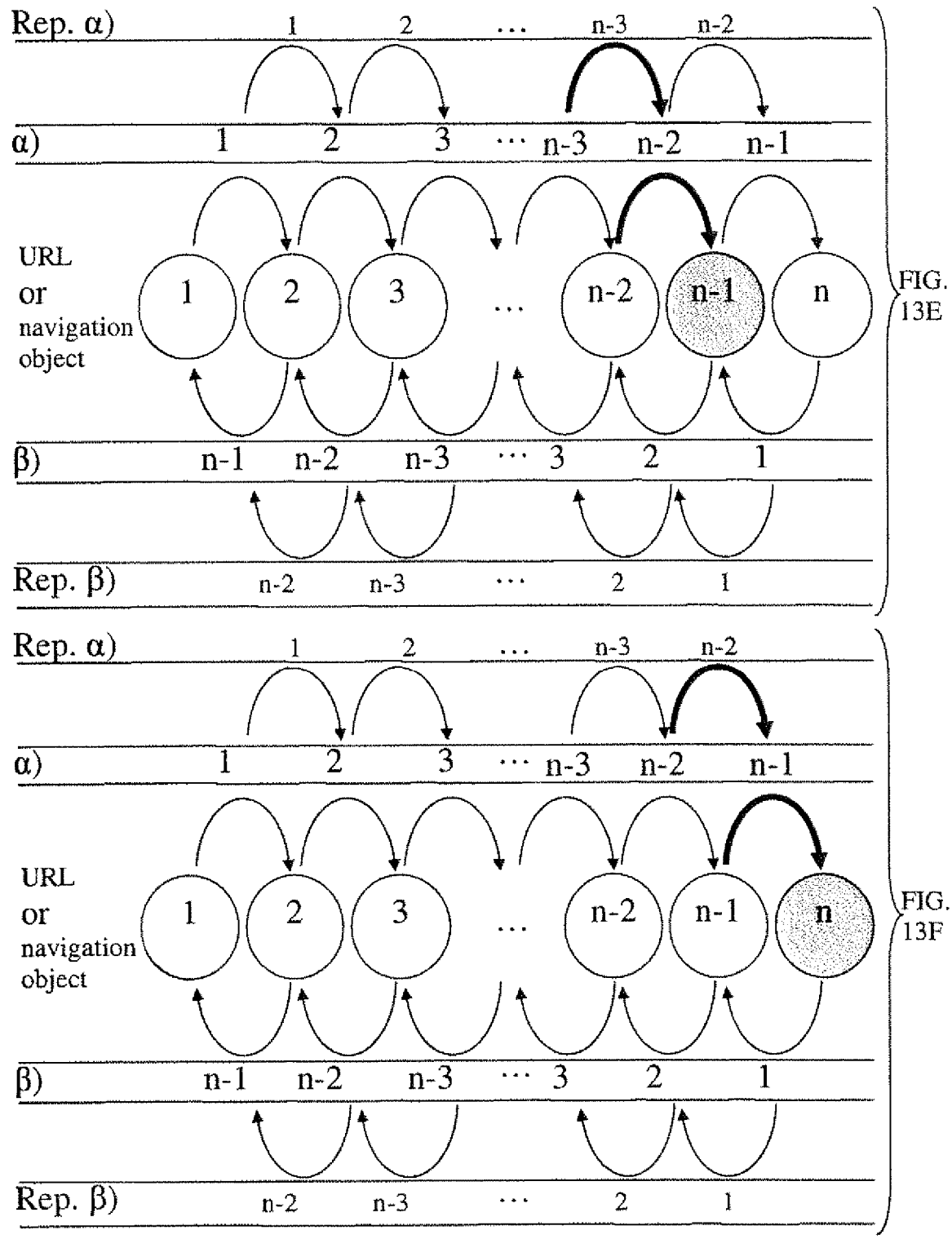

METHOD OF BUILDING A THREE-DIMENSIONAL NETWORK SITE, NETWORK SITE OBTAINED BY THIS METHOD, AND METHOD OF NAVIGATING WITHIN OR FROM SUCH A NETWORK SITE

The subject of the invention is a method of building a three-dimensional network site, as well as a network site obtained by this method, and a method of navigating within or between two network sites according to the invention.

A computerized network is a collection of equipment (computers, servers, etc.) linked together so as to exchange information. A computerized network, such as the Internet, comprises a multitude of sites, termed "network sites", comprising information. These sites can be hosted on one or more computers or servers of the network.

The very great majority of current network sites, Internet sites in particular, take the form of a multitude of pages.

These pages consist of a two-dimensional background on which are posted:
- text;
- images;
- hypertext links (in the form of text or icons) leading, when the user clicks on these links, to new pages of the same site, to other sites, to documents (graphical or text);
- windows capable of displaying videos and/or of streaming music;
- advertisements;
- etc.

Access to these sites and to the pages that they contain is achieved through a software package called a "network browser" into which one inputs the unique network address of the site that one wishes to visit. This address is also called the "URL", for Uniform Resource Locator, or more generally the "Internet address". Going from one URL address to another URL, or from one page to another page is called "navigation".

This entails a character string making it possible to indicate to a network browser how to access a resource (an Internet site, for example) through a computerized network.

Each site has a unique URL, called the "root URL". The pages of each site can have their own URL, or benefit from the same root URL.

An exemplary site whose pages have their own network address is the site of the company New3S®: the root URL of the site is http://www.new3s.com. The "contact us" page has its own URL: http://www.new3s.com/contact.asp.

An exemplary site whose pages benefit from the root address of the site is Google Maps®. The root address of the site is https://maps.google.com. The map of Paris and the map of New York both benefit from the same root address.

Example: load Google Maps®:
https://maps.google.com/
with by default view on the USA if Windows® in English and then enter "Place de la Bastille, Paris, France"
Change view, but identical address: https://maps.google.com/
Click on Route: identical address: https://maps.google.com/
Depature point: 75011 Place de la Bastille, Paris, France
Destination point: Place de la République, Paris, France
The map is modified: identical address: https://maps.google.com/
Double click on the departure point, and then activate Street view® mode.
The map is modified: that is to say immersive view, still interactive but 3D panoramic. Identical address: https://maps.google.com/
Arrive at Place de la République by Street View® mode: Identical address: https://maps.google.com/

In this type of site, the entire content of the URL address is not downloaded in a single step, but in tandem with the user's navigation. Only the content sought is downloaded.

In sites wherein each page comprises its own URL, the content of each URL is downloaded in full in a single step.

The creators and the owners of network sites have numerous concerns, in particular to offer a site which is distinguished from that of competitors and to ensure security of access to certain contents of the site.

Moreover, changes in customs and the evolution of technology are tending to offer Internet access in places and with hardware whose prime usage was not intended for Internet access. Thus, numerous television manufacturers offer devices capable of being linked to the Internet. The services offered are much like Internet sites and, in order to navigate around these sites, manufacturers modify the remote controls to make it possible to click on the icons.

The graphical representation of the computer mouse is replaced with a highlighting of user-selectable links (or icons).

The most rudimentary remote controls comprise navigation buttons in the form of arrows for passing from link to link (that is to say for highlighting the links one after another), and a validation button for clicking on the chosen link.

More enhanced remote controls comprise a touch-sensitive surface and/or accelerometers so that the user makes navigation gestures (for example a right/left or up/down movement) to move the highlighting, and a validation gesture to click on the chosen link.

In all cases, the user can only pass from link to link, in a two-dimensional graphical environment, not allowing a global overview of the whole site.

It is therefore desirable to propose a solution making it possible to offer sites that can be easily apprehended by the user, are secure, and can be conveniently navigated, and allowing greater graphical freedom in order to be distinguished from competitors' sites.

The present invention makes it possible to address several of these concerns.

Internet sites are distinguished from one another only by their graphic charter, their message, their size, etc., but not by their structure which is always a two-dimensional page tree layout.

Furthermore, it is always necessary to use the computer's mouse to click on hypertext links, in order to start up videos or music.

Certain sites offer "3D lounges" or "3D showrooms".

In the present description, the expression "3D" or "three-dimensional" is understood in the sense of the design of the space, and not of its display technique which, for its part, is two-dimensional since it is implemented on a screen of an interface. Stated otherwise, a space is termed three-dimensional when it comprises a perspective and when an object which is mobile in this three-dimensional space can move forward and back, right and left and up and down with respect to the user's position.

Thus, the expression "three-dimensional" actually relates to the characteristics of the space and not the characteristics of the screen, which can, for its part, allow 3D display with active glasses (right eye/left eye selective display) or passive glasses (polarizing filters). Thus, it is not because a space is displayed on a 3D screen that it is three-dimensional within the meaning of the invention; for example, a photo (two-dimensional space within the meaning of the invention) is not three-dimensional because it is displayed on a 3D screen.

"3D lounges" or "3D showrooms" are three-dimensional spaces in which likewise three-dimensional objects, such as desks, stands, etc. are situated. However, though these sites offer a graphical alternative to two-dimensional sites, that is to say to sites consisting of pages, they nevertheless require the use of the mouse to click on the selectable elements (for example to play a video or go to another site). Furthermore, they require the use of the mouse to click in the three-dimensional space and to enable the user or, more precisely, their avatar (computerized representation, in 3D or not, of a user, for example in the form of a stylized figure) to wander around. Stated otherwise, the user needs the mouse as a means of steering and as a means of selection. The avatar has no technical function and serves only to afford the user a sensation of immersion in the 3D space.

Therefore, these sites do not make it possible to dispense with mouse clicks (or manual clicking for touch-sensitive interfaces) for navigation and activation of selectable elements. They therefore cannot constitute a solution suitable for the new media, namely connected televisions and games consoles. Furthermore, their design does not make it possible to depict in the results of the search engines the objects that they contain. Finally, they do not offer any particular solution in regard to security of access.

The object of the invention is therefore to propose a method of building network sites, Internet sites in particular, allowing genuine immersion in the sites (in the manner of video games) through intuitive and fluid navigation requiring only a means of steering of the avatar, while allowing selective referencing by a search engine of the objects contained in the site, as well as enhanced security of access. Thus, a simple mechanical handle (arrow keys on a keyboard, mouse without the click touches, joystick consisting of a stick placed on a mount with push-buttons) or virtual handle (computerized representation of arrows, system for detecting movement of a hand, of an eye, etc., remote control with accelerometer, etc.) makes it possible to steer the avatar and the method according to the invention makes it possible to interpret the avatar's movements as a simple wandering around in the site or as a command controlling navigation towards another space of the site (same URL) or towards another site (different URL).

To this end, the subject of the invention is a method of building a so-called "three-dimensional" network site, such as an Internet site, consultable via an interface linked to the network, characterized in that it comprises the following steps:

A) with a 3D modelling software package:
a1) Generating a three-dimensional project comprising at least one three-dimensional space;
a2) creating at least one two- or three-dimensional so-called "navigation" object in the said project and placing it in the or one of the spaces in a defined spatial position, called the "position of the navigation object";
a3) creating a two- or three-dimensional object which is mobile in the said space and controllable by a user by virtue of a control interface or a peripheral, such as a mouse, keyboard keys, a joystick or a motion sensor, linked to the interface;
B) with a real-time 3D software package:
b1) assigning to the or to each three-dimensional space:
a benchmark system of three-dimensional coordinates;
aesthetic properties, such as textures or images;
functional properties, such as a light source; and
simulated physical properties, such as a gravity force, a magnetic field or an electro-magnetic field;
b2) assigning to the said navigation object:
aesthetic properties, such as textures;
navigation properties, such as a link to a so-called "arrival" position in the said at least one three-dimensional space or a link to a so-called "destination" network address; and
simulated physical properties, such as deformation laws;
b3) assigning to the said mobile and controllable object:
an initial position in the space or one of the spaces of the project, and
aesthetic properties, such as textures;
functional properties, such as mobility in the three-dimensional space; and
simulated physical properties, such as deformation laws;
b5) recording the three-dimensional project as a digital file having a format interpretable by at least one navigation software package;
D) storing the file obtained in step b5) on an on-line network server;
E) assigning a network address to the file so as to render it accessible by the network in the form of a network site.

According to other embodiments:
the navigation object can consist of a two- or three-dimensional information display and of a two- or three-dimensional so-called "detection" zone, preferably arranged in proximity to the information display;
the information display is a means for displaying information which may have an aspect and/or a shape which give information to the user that the object is a navigation object. The information display may be, for example, of the shape of a display rack, of a door, of a window, of a screen displaying an image or a video, etc.
each three-dimensional space of the site can be associated with its own network address;
the or each three-dimensional space of the site can be associated with a common network address;
the method can comprise, before step D), a step C1) of creating and networking an access table for the site comprising at least the following items of information:
a descriptor of the access table comprising a number of rows, a number of columns and one or more field separator(s) used;
an identifier of the or of each three-dimensional space in the site;
an identifier of the or of each navigation object;
the position of each navigation object;
the navigation properties of each navigation object; and
an initial position of a user when the latter accesses the site;
the access table can comprise, furthermore, rights-of-access data;
the rights-of-access data can be data managing the possibility/impossibility of accessing the site, or managing the display/the concealment of one or more navigation objects, or managing
the activation/the inactivation of one or more navigation objects;
the method can comprise, after step C1), a step C2) of encrypting the access table;
the method can comprise, after step C1), a step C3) of dividing the access table into several files, and of peer-to-peer sharing of the said files between several computer servers;

the method can comprise, after step C2), a step C3) of dividing the encrypted access table into several files, and of peer-to-peer sharing of the said files between several computer servers; and/or the method can comprise, after step a3), a step a4) of creating a "previous position" selectable button and a "next position" selectable button, and after step b3), a step b4) of assigning to each of these buttons the following properties:
  associated with a history table;
  selectable with a mouse click or a manual click; and
  displayed constantly on the site.

The subject of the invention is also a three-dimensional network site obtained by the method according to the invention, characterized in that it comprises:
  A network address;
  at least one three-dimensional space;
  at least one navigation object placed at a position of the navigation object;
  at least one object that is mobile and controllable in the said space.

According to other embodiments:
  at least one navigation object can consist of a two- or three-dimensional information display and of a two- or three-dimensional so-called "detection" zone preferably arranged in proximity to the information display;
  the navigation property assigned to the or to each navigation object can be the ability to control the opening, in the navigation software package, of a destination network address which is different from the network address of the three-dimensional space in which the navigation object is situated;
  the navigation property assigned to the or to each navigation object can comprise, furthermore, the ability to position the mobile and controllable object at a so-called "arrival" position in a three-dimensional space of a three-dimensional site having the destination network address;
  the or each navigation object can have as functional property the ability to position the mobile and controllable object at an arrival position in a three-dimensional space of the network site in which the navigation object is situated; and/or
  the network site can comprise:
    a network address;
    at least one three-dimensional space;
    at least one navigation object placed at the position of the navigation object;
    at least one object that is mobile and controllable in the said space. and in that it is associated with an access table comprising at least the following items of information
    a descriptor of the access table so as to be able to be interpreted by the navigation software package, comprising the number of rows, the number of columns and the field separator(s) used;
    an identifier of the or of each three-dimensional space in the site;
    an identifier of the or of each navigation object;
    the position of each navigation object;
    the navigation properties of each navigation object; and
    an initial position of a user when the latter accesses the site.

The subject of the invention is also a method of navigation from or within the network address of a three-dimensional space of a three-dimensional site according to the invention, with the aid of a hardware interface, such as a computer, a tablet or a Smartphone, characterized in that it comprises the following steps:
  α) In a navigation software package suitable for the hardware interface:
    α.1) opening the network address;
    α.2) controlling the movement of the mobile and controllable object in the or one of the three-dimensional spaces from a so-called "initial" position;
    α.3) selecting a navigation object by positioning the mobile and controllable object in a secant manner with respect to the navigation object, which means in a manner where the mobile and controllable object overlaps the navigation object, especially the detection zone of the navigation object;
    α.6) generating a navigation action as a function of the navigation properties assigned to the navigation object.

According to other embodiments:
  step α3) can consist in selecting a navigation object by positioning the mobile and controllable object in a secant manner with respect to the zone of detection of the navigation object, which means in a manner where the mobile and controllable object overlaps the navigation object, especially the detection zone of the navigation object;
  step α) can comprise furthermore, after step α.3), a step α.4) of timeout of predefined duration, starting as soon as the mobile object and the navigation object or the detection zone are overlapping, step α.6) being triggered only if the mobile object remain overlapping the navigation object or the detection zone throughout the duration of the timeout; and/or
  step α) can comprise furthermore, before step α.6), a step α.5) of predefined repositioning of the mobile object with respect to the navigation object, as soon as the mobile object overlaps the navigation object or the detection zone of said navigation object, the repositioning keeping the mobile object overlapping the navigation object or the detection zone.

When the navigation is performed within the same network address:
  the navigation action, generated during step α.6), can comprise the positioning of the mobile and controllable object at a so-called "arrival" position in a three-dimensional space having the same network address as the network site in which the navigation object is situated;
  step α.4) can comprise, furthermore, during the timeout, the consultation by the navigation software package of the access table of the network site;
  step α.1) can comprise, furthermore, the creation and the storage in memory of a first history table of "last in-first out" type, as well as the association of the first history table with the "previous position" and "next position" selectable buttons of the network site; and step α.6) can comprise the insertion, as first entry in the first history table, of the identifier of the three-dimensional space in which the mobile object is situated, and of the position of the navigation object selected in the three-dimensional space;
  step α) can be repeated n-2 times, n being an integer greater than or equal to 3, so as to end up at an arrival position of rank n, the first history table being created only at the first iteration and supplemented during the other iterations, each iteration of step α) corresponding to the positioning of the mobile and controllable object at a new arrival position in a three-dimensional space having the same network address as the network site in which the navigation object is situated, the identifier of the three-dimensional space and the position of the selected navigation object being stored chronologically at each iteration in the first history table during navigation;

the method of navigation can comprise, furthermore, a step β) of backtracking consisting in reading the identifier of the three-dimensional space and the position of the navigation object of rank n-1 in the first history table, and in positioning the mobile object in proximity to the position of the selected navigation object of rank n-1;

step β) can be repeated k times, k being an integer lying between 1 and n-2; and/or k can lie between 1 and n-3, the position of the selected navigation object of rank k corresponding to a network site according to the invention, the method comprising, furthermore, after the iteration of rank k of step β), at least one step γ) of navigating towards a navigation object having a position not stored in the first history table, step γ) comprising the following sub-steps:

γ.1) creation and storage in memory of a second history table of "last in-first out" type, as well as the association of the second history table with "Page forward" and "page back" selectable buttons of the network site;

γ.2) controlling the movement of the mobile and controllable object in one of the three-dimensional spaces of the network site;

γ.3) selecting a navigation object by positioning the mobile and controllable object overlapping the navigation object, especially the detection zone of the navigation object;

γ.6) generating a navigation action as a function of the navigation properties assigned to the navigation object, and inserting:
   as first entry in the second history table, a reference to the first history table;
   as second entry in the second history table, the identifier of the departure three-dimensional space and the position of the navigation object selected in the departure three-dimensional space;
   as last entry in the first history table, a reference to the second history table.

When the navigation is performed from network address to network address:

the navigation action, generated during step α.6), can comprise the opening, in the navigation software package, of a destination network address which is different from the network address of the three-dimensional space in which the navigation object is situated;

the navigation action can comprise, furthermore, the positioning of the mobile and controllable object at a so-called "arrival" position in a three-dimensional space of a three-dimensional site having the destination network address;

step α.4) can comprise, furthermore, during the timeout, the transmission to the navigation software package of the access table of the second network site;

step α.4) can comprise, furthermore, during the timeout, and after the reception of the access table of the second network site, the displaying of a so-called "arrival" position by default and of the position of the object or of each of the navigation objects of the second network site, so that the user can choose the position at which he wishes to arrive in the second network site;

step α.1) can comprise, furthermore, the creation and the storage in memory of a first history table of "last in-first out" type, as well as the association of the first history table with "Page forward" and "page back" selectable buttons of the navigation software package; and step α.6) can comprise the insertion, as first entry in the first history table, of the network address of the departure three-dimensional space and the position of the navigation object selected in the departure three-dimensional space;

step α) can be repeated n-2 times, n being an integer greater than or equal to 3, so as to end up at a network address of rank n, the first history table being created only at the first iteration and supplemented during the other iterations, each iteration of step a) corresponding to an opening of a new network address, each network address and, if appropriate, a position of each navigation object being stored chronologically in the first history table during navigation;

the method of navigation can comprise, furthermore, a step β) of backtracking consisting in reading the network address of rank n-1 in the first history table, and in opening this network address of rank n-1 in the navigation software package;

step β) can also comprise the positioning of the mobile object in proximity to the position of the navigation object selected in the three-dimensional space having the network address of rank n-1;

step β) can be repeated k times, k being an integer lying between 1 and n-2; and/or k can lie between 1 and n-3, the network address of rank k corresponding to a network site according to the invention, the method comprising, furthermore, after the iteration of rank k of step β), at least one step γ) of navigating towards a network site having a network address not stored in the first history table, step γ) comprising the following sub-steps:

γ.1) creation and storage in memory of a second history table of "last in-first out" type, as well as the association of the second history table with "Page forward" and "page back" selectable buttons of the navigation software package;

γ.2) controlling the movement of the mobile and controllable object in the or one of the three-dimensional spaces of the network site having the network address not stored in the first history table;

γ.3) selecting a navigation object by positioning the mobile and controllable object overlapping the navigation object, especially the detection zone of the navigation object;

γ.6) generating a navigation action as a function of the navigation properties assigned to the navigation object, and inserting:
   as first entry in the second history table, a reference to the first history table;
   as second entry in the second history table, the network address of the departure three-dimensional space and the position of the navigation object selected in the departure three-dimensional space;
   as last entry in the first history table, a reference to the second history table.

Figure 4:
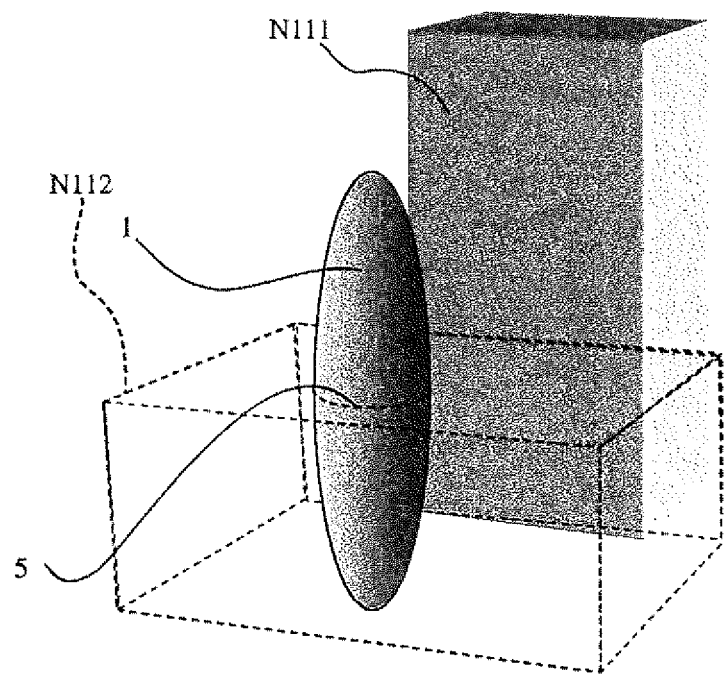
Figure 5:
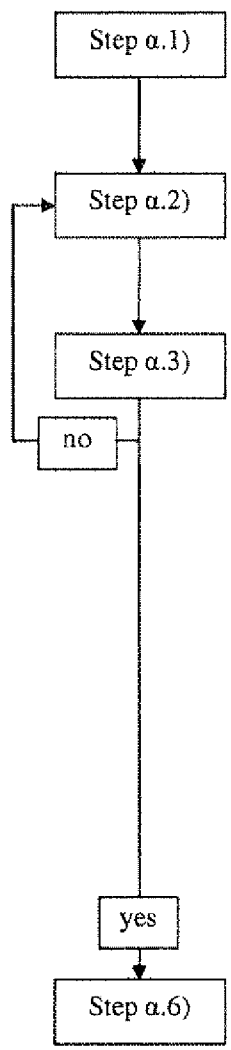
Figure 6:
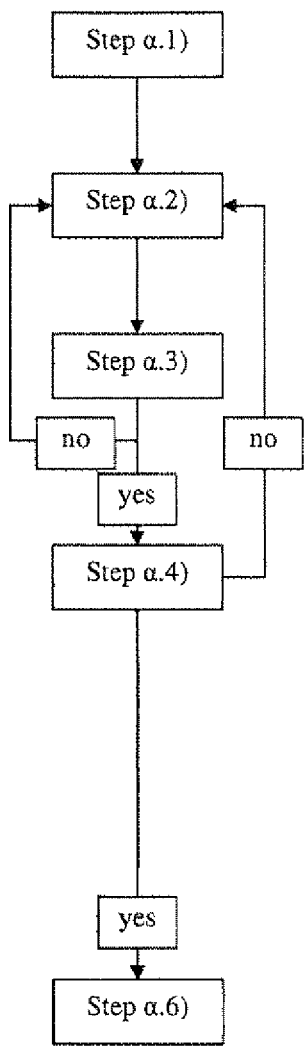
Figure 7:
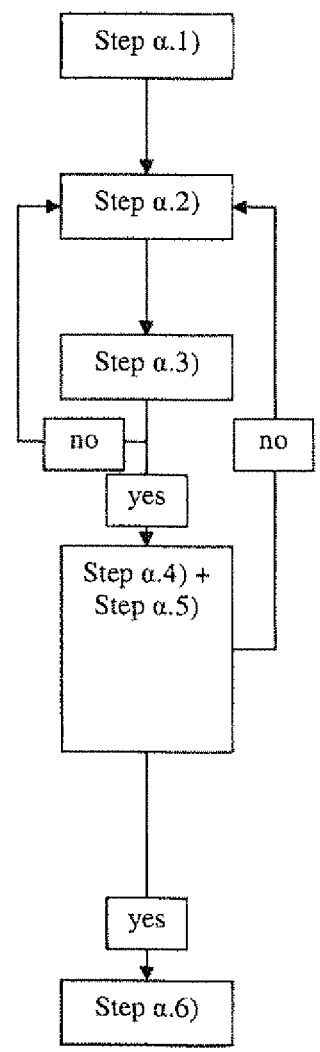
Figure 8:
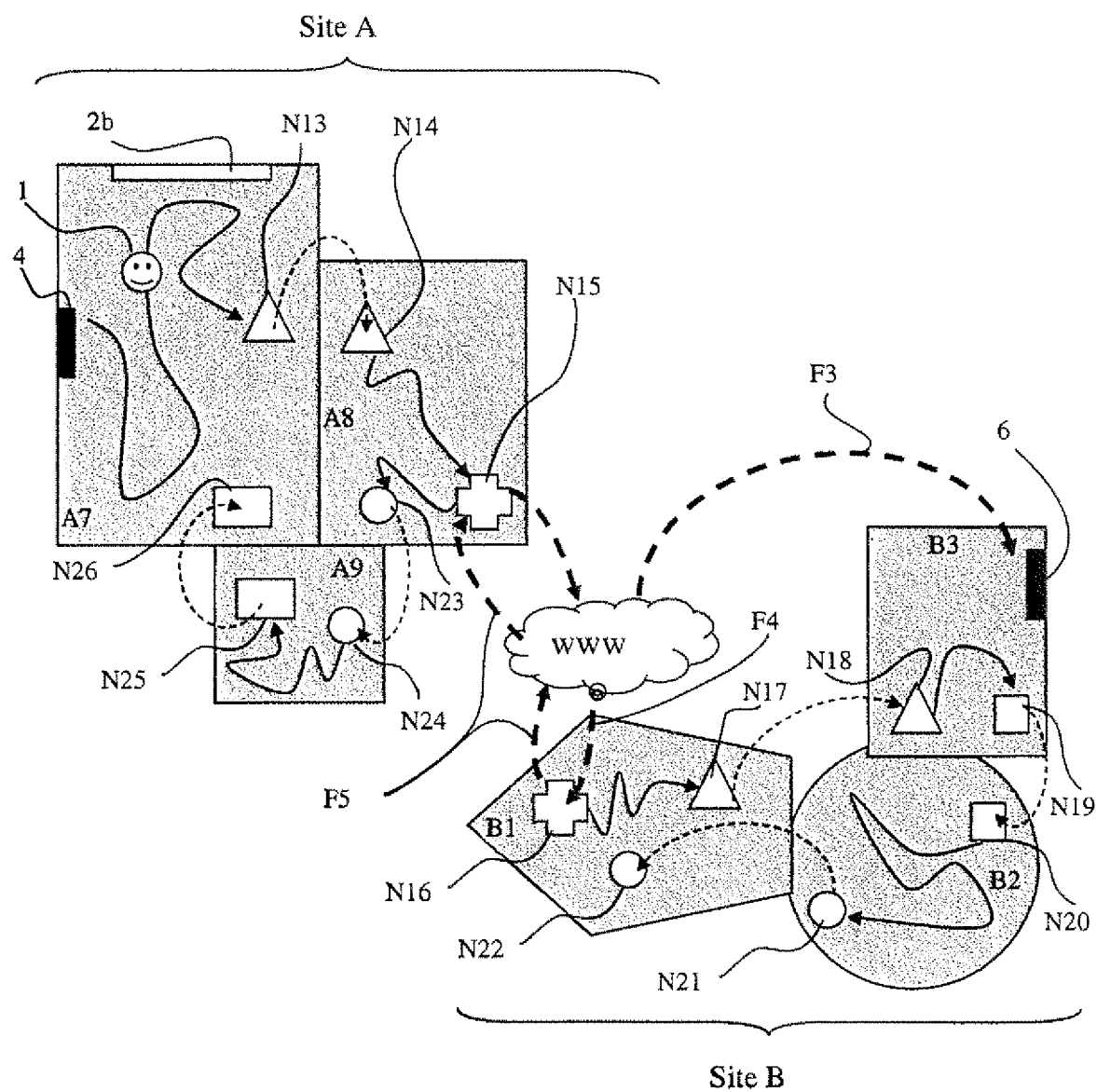
Figure 8A:
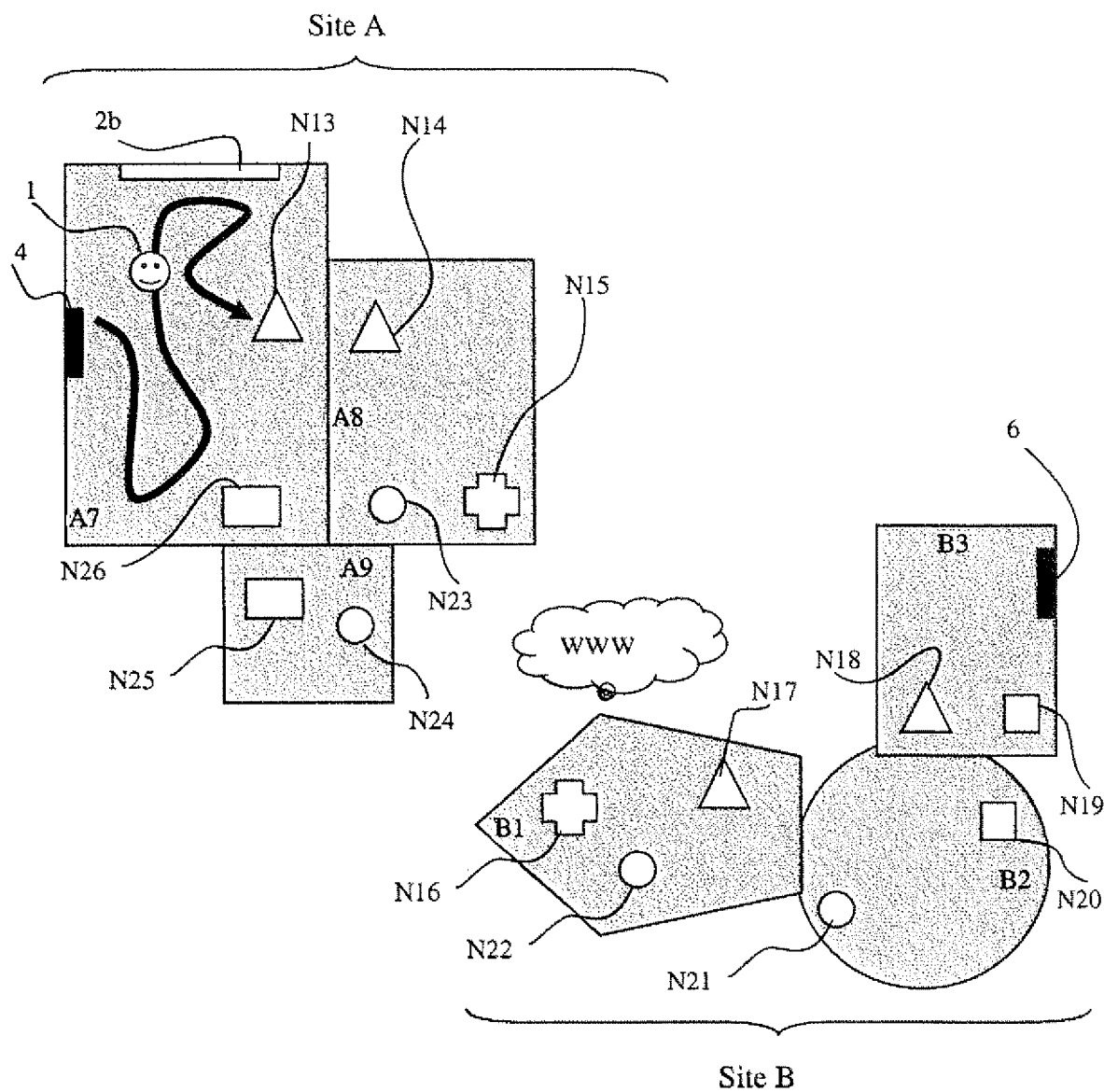
Figure 8B:
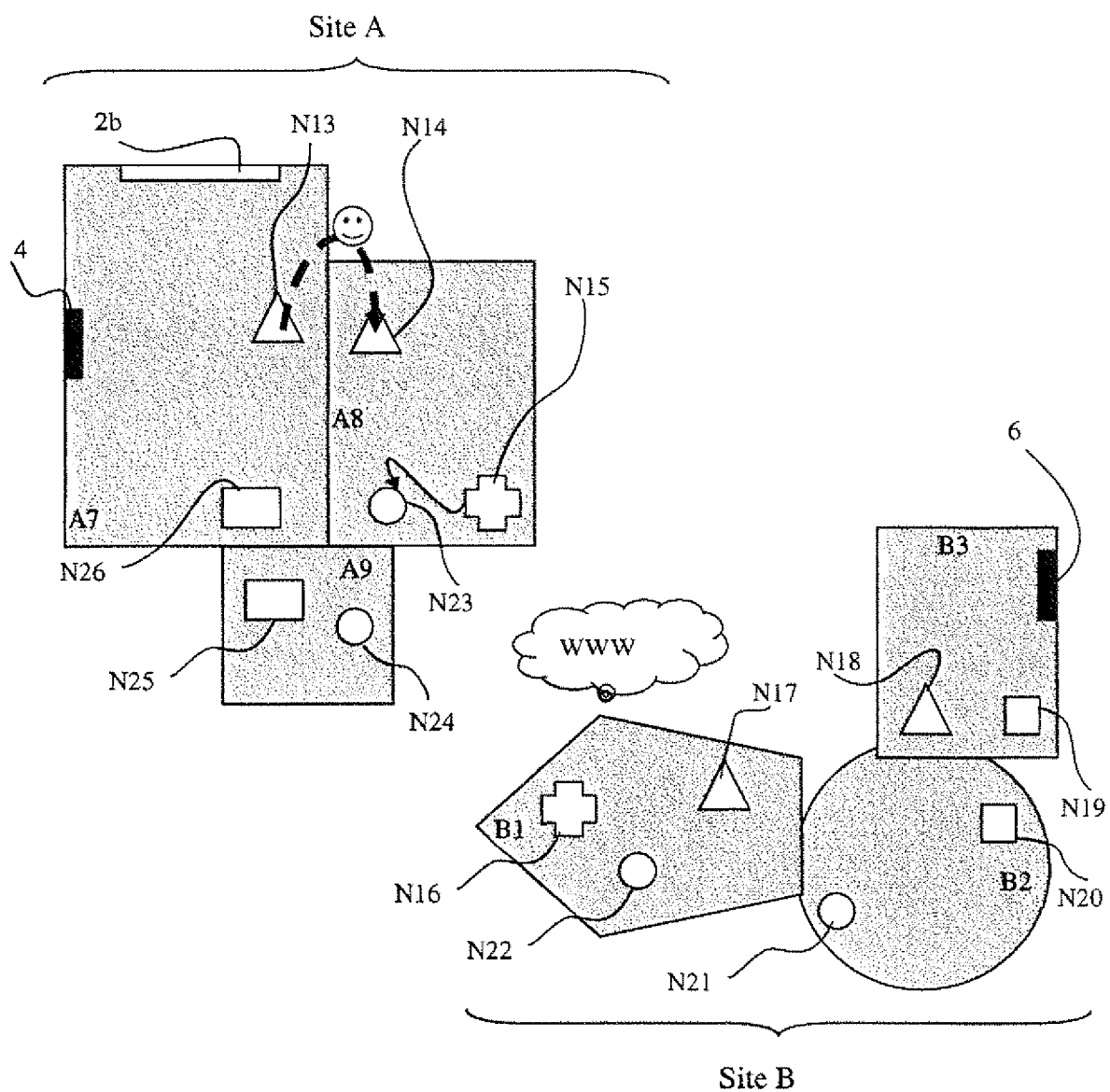
Figure 8C:
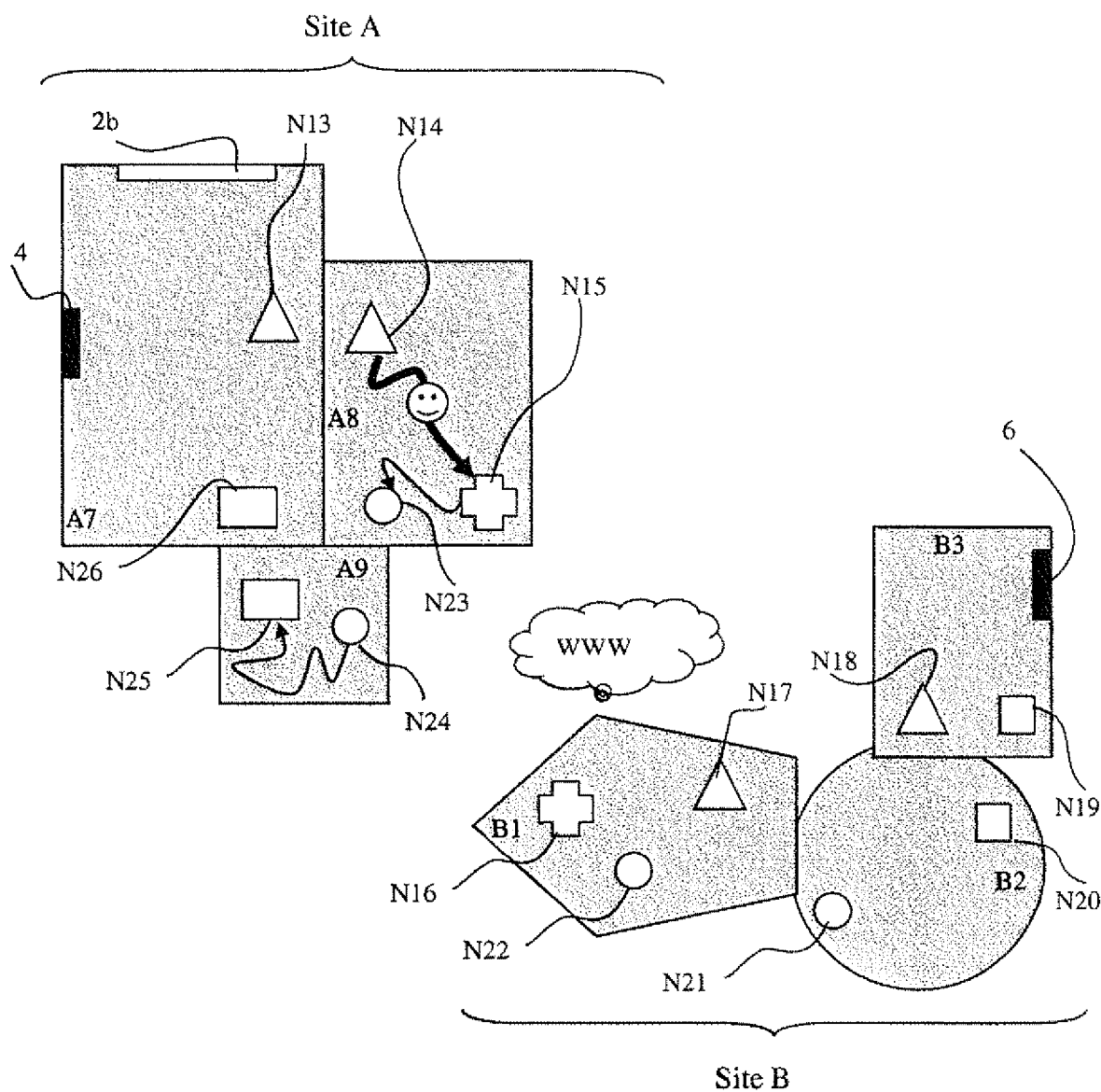
Figure 8D:
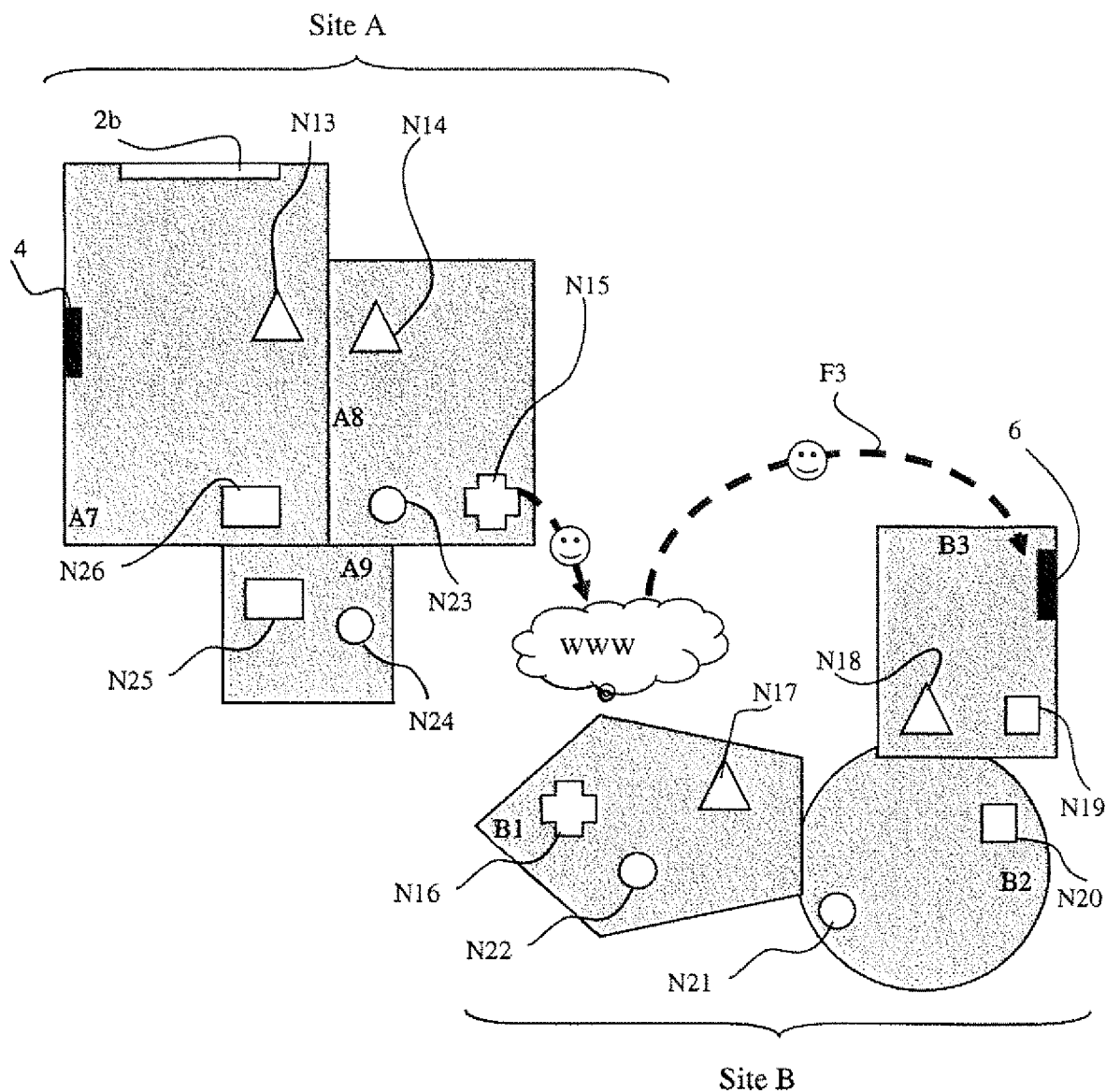
Figure 8E:
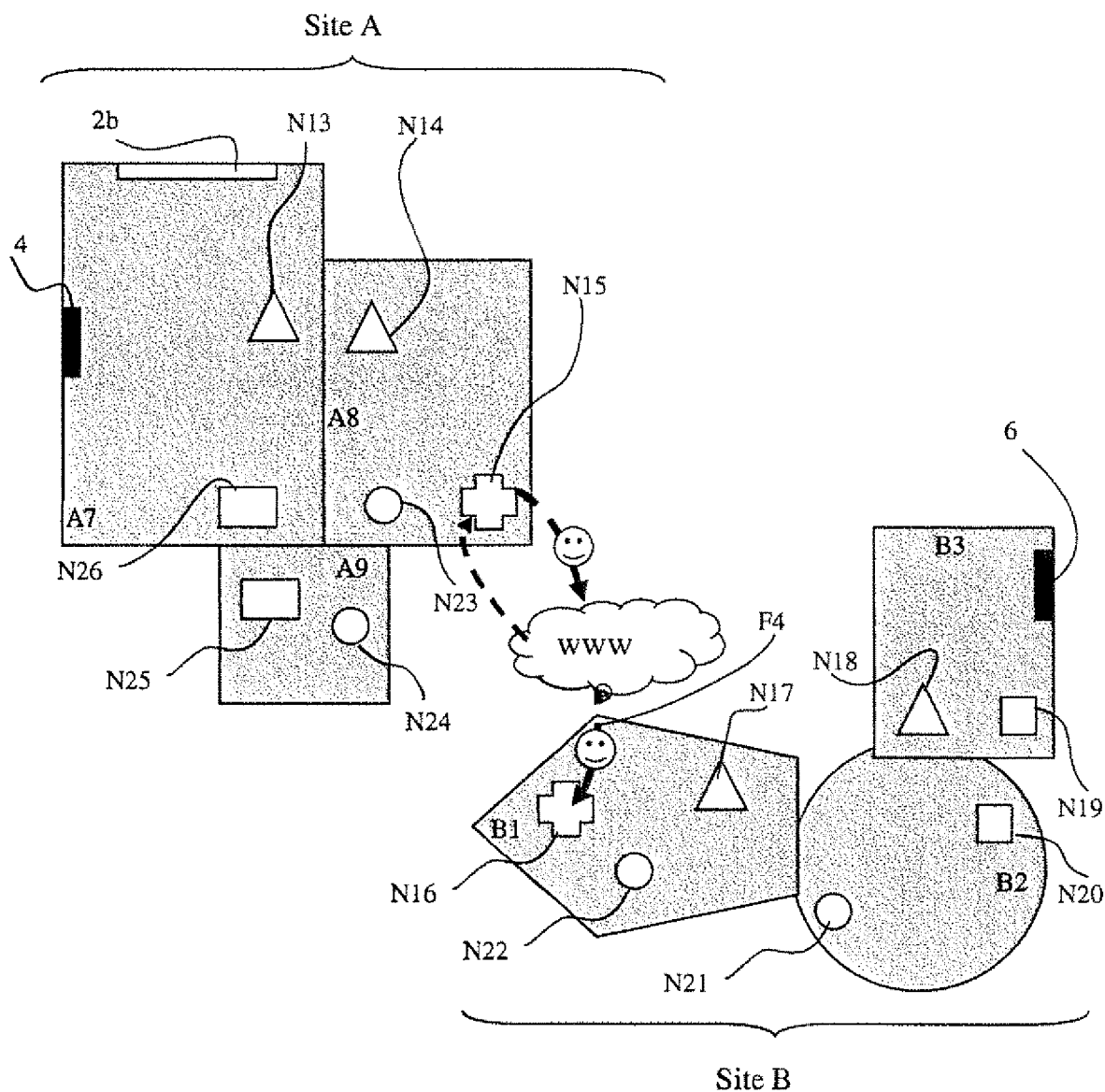
Figure 8F:
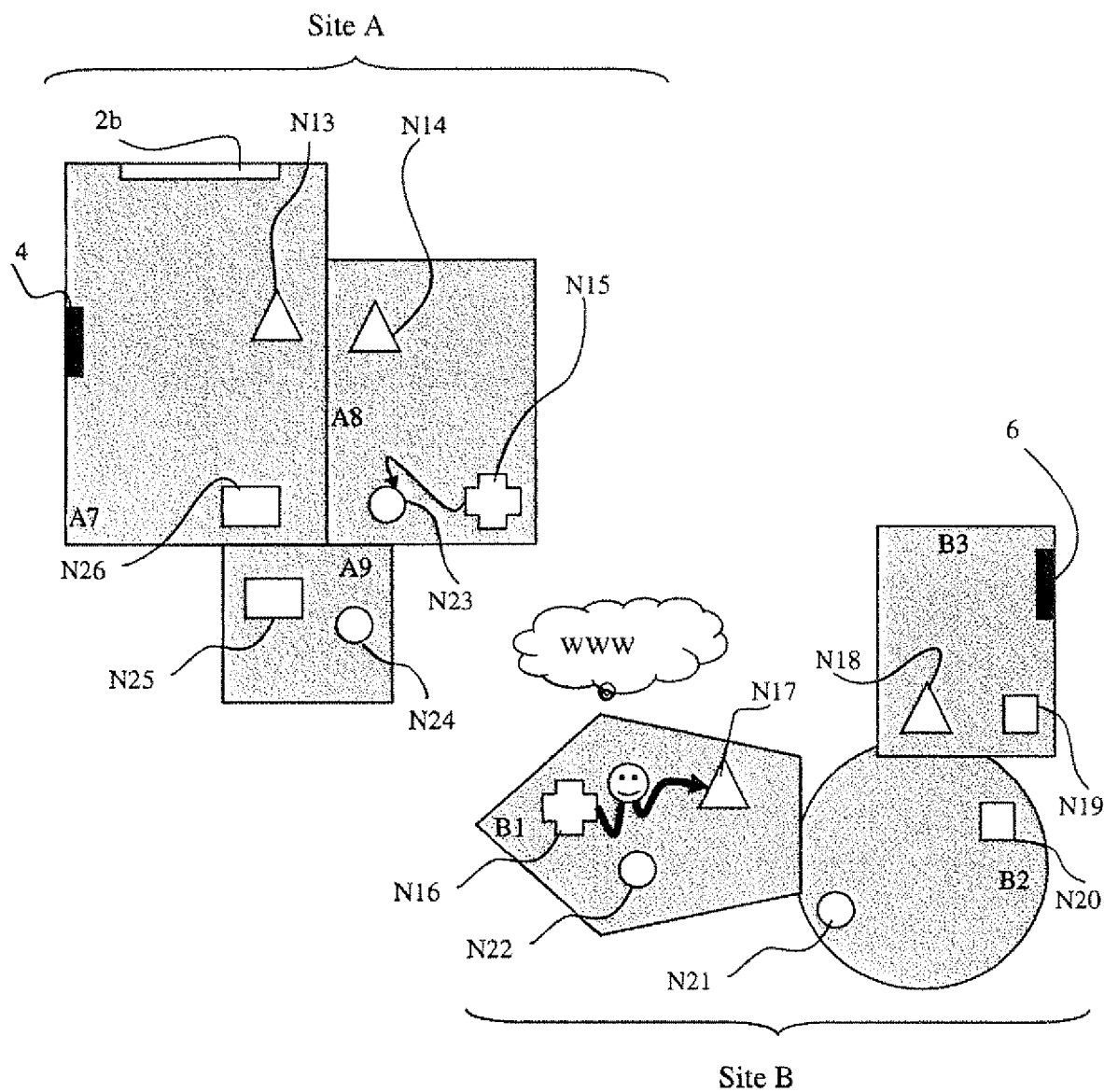
Figure 8G:
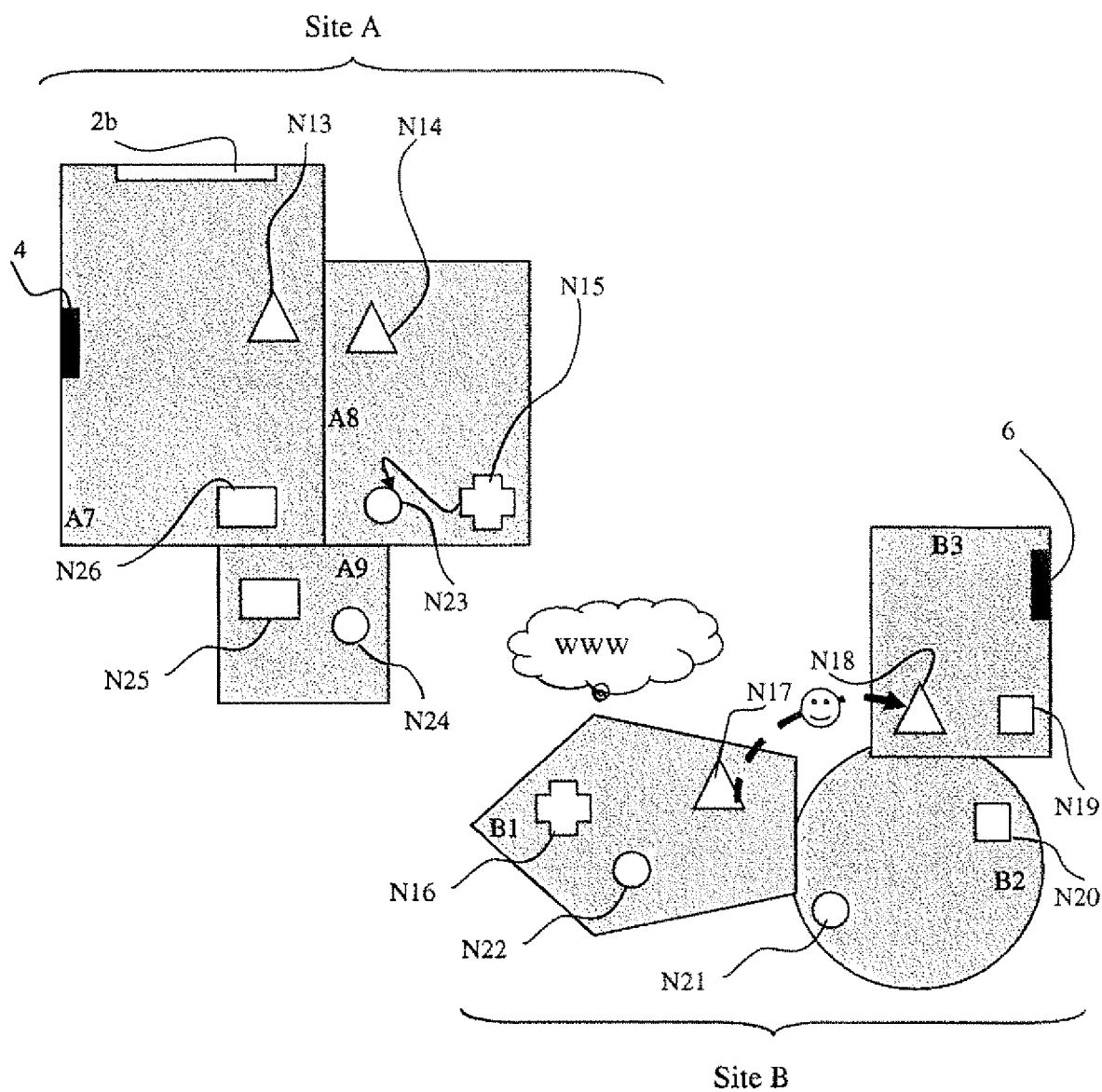
Figure 8H:
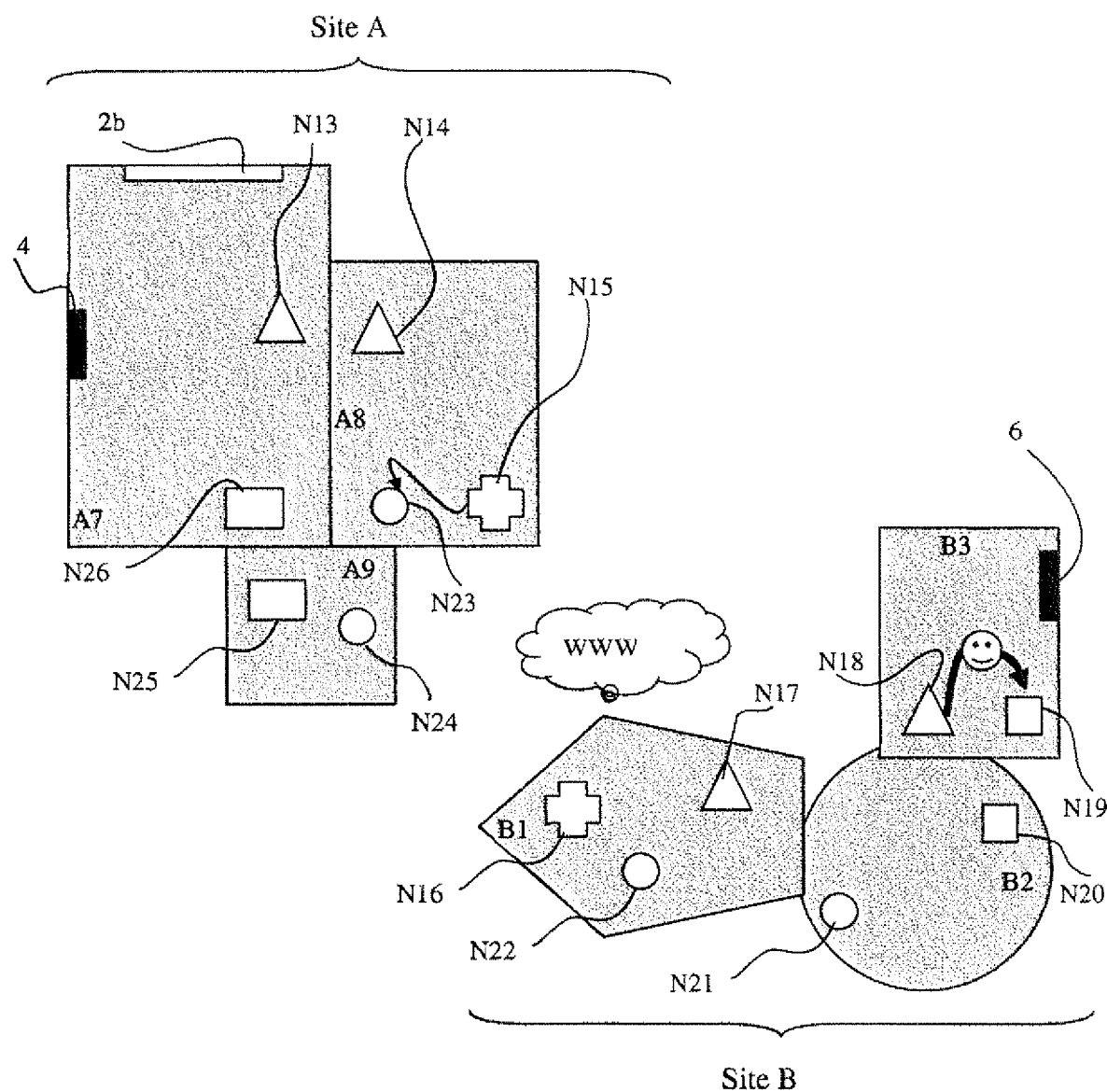
Figure 8I:
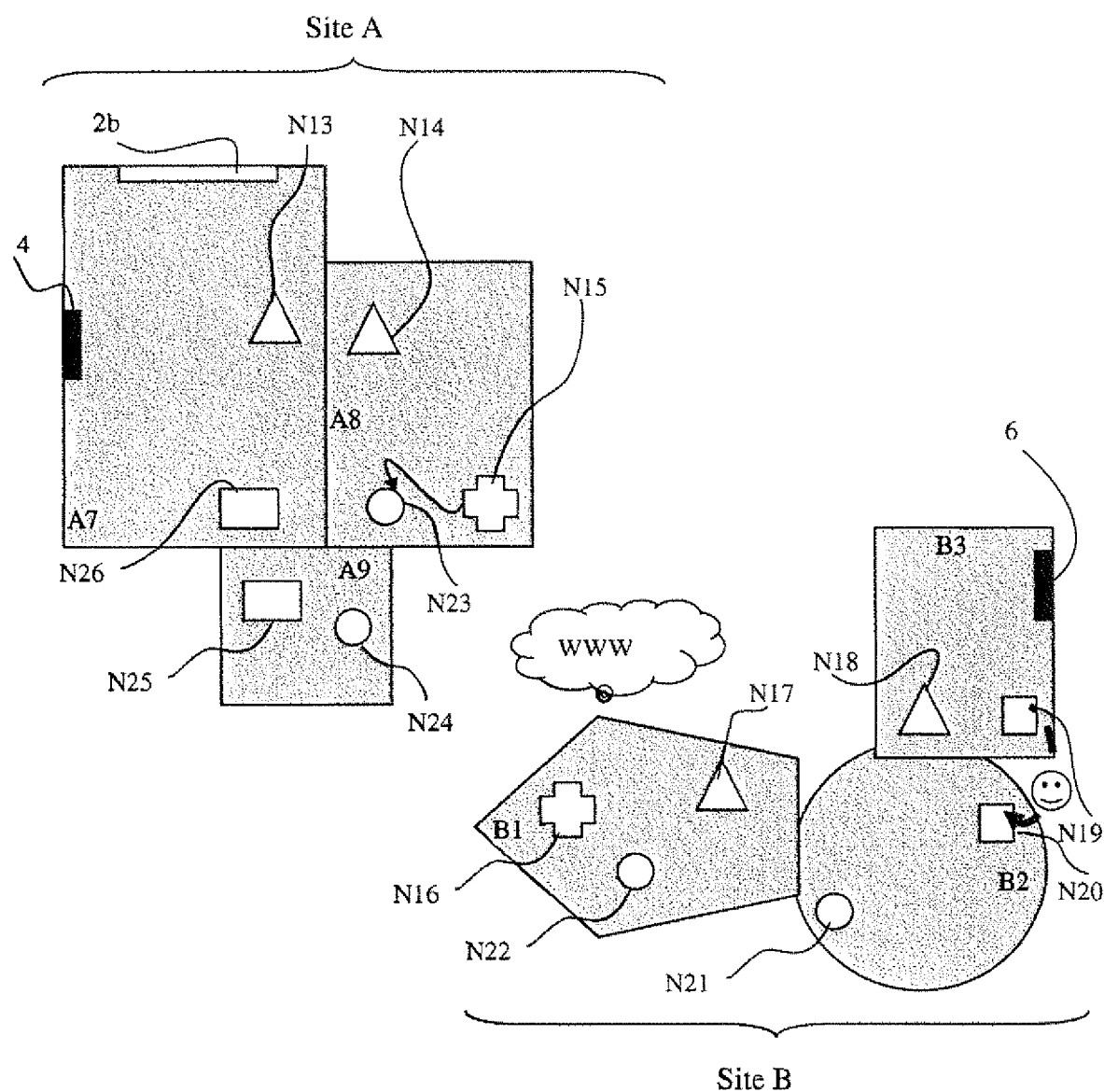
Figure 8J:
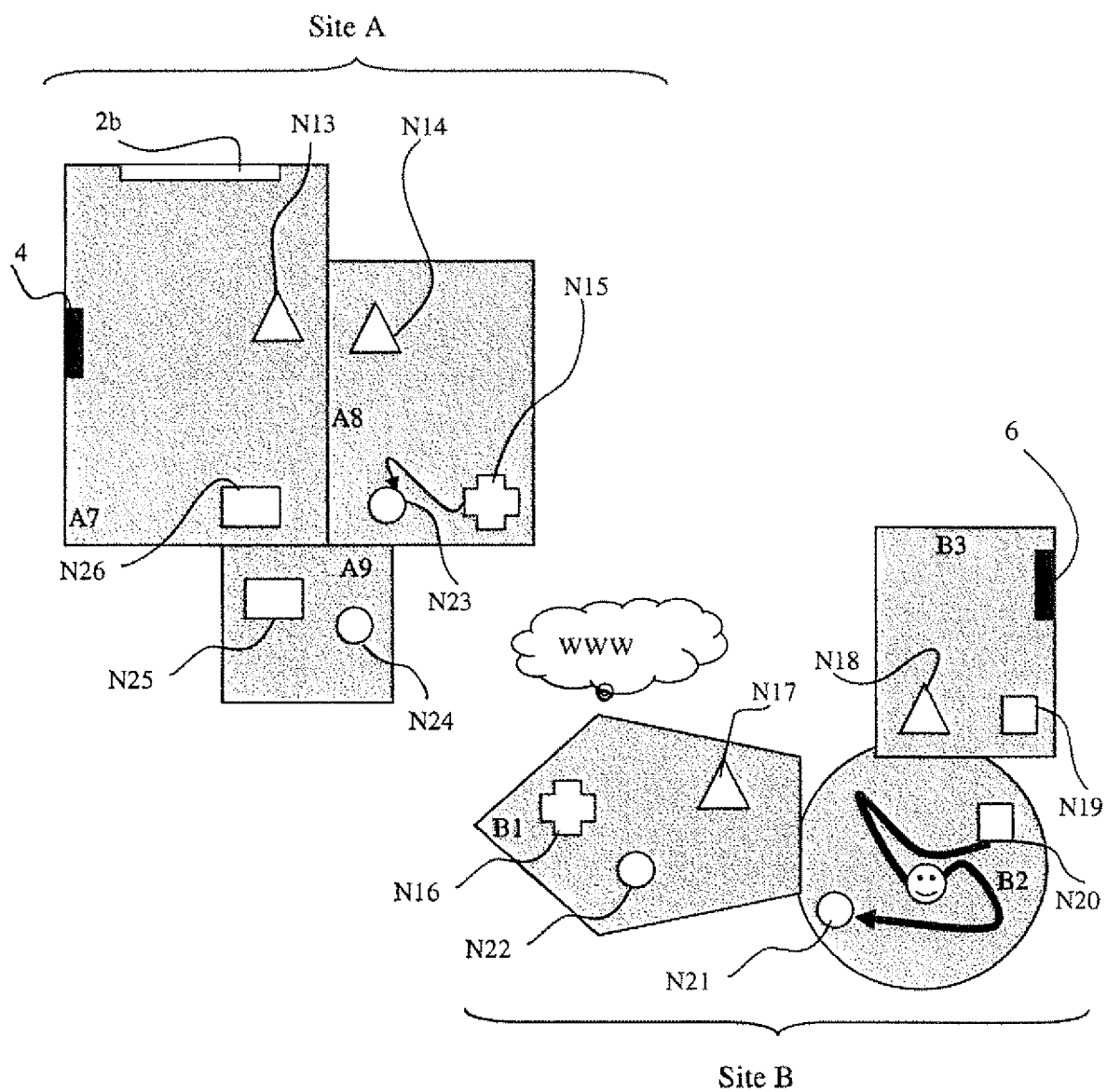
Figure 8K:
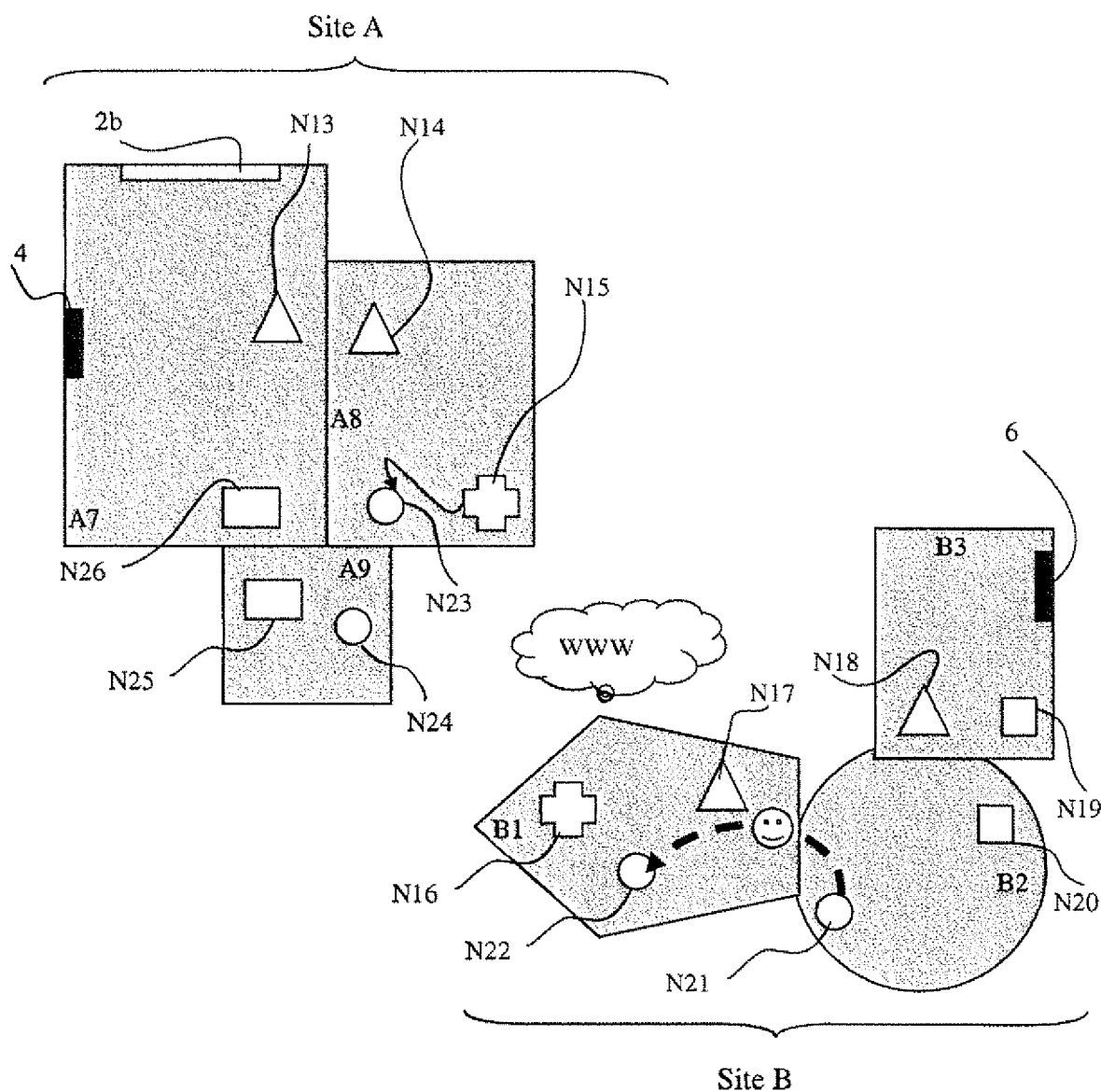
Figure 8L:
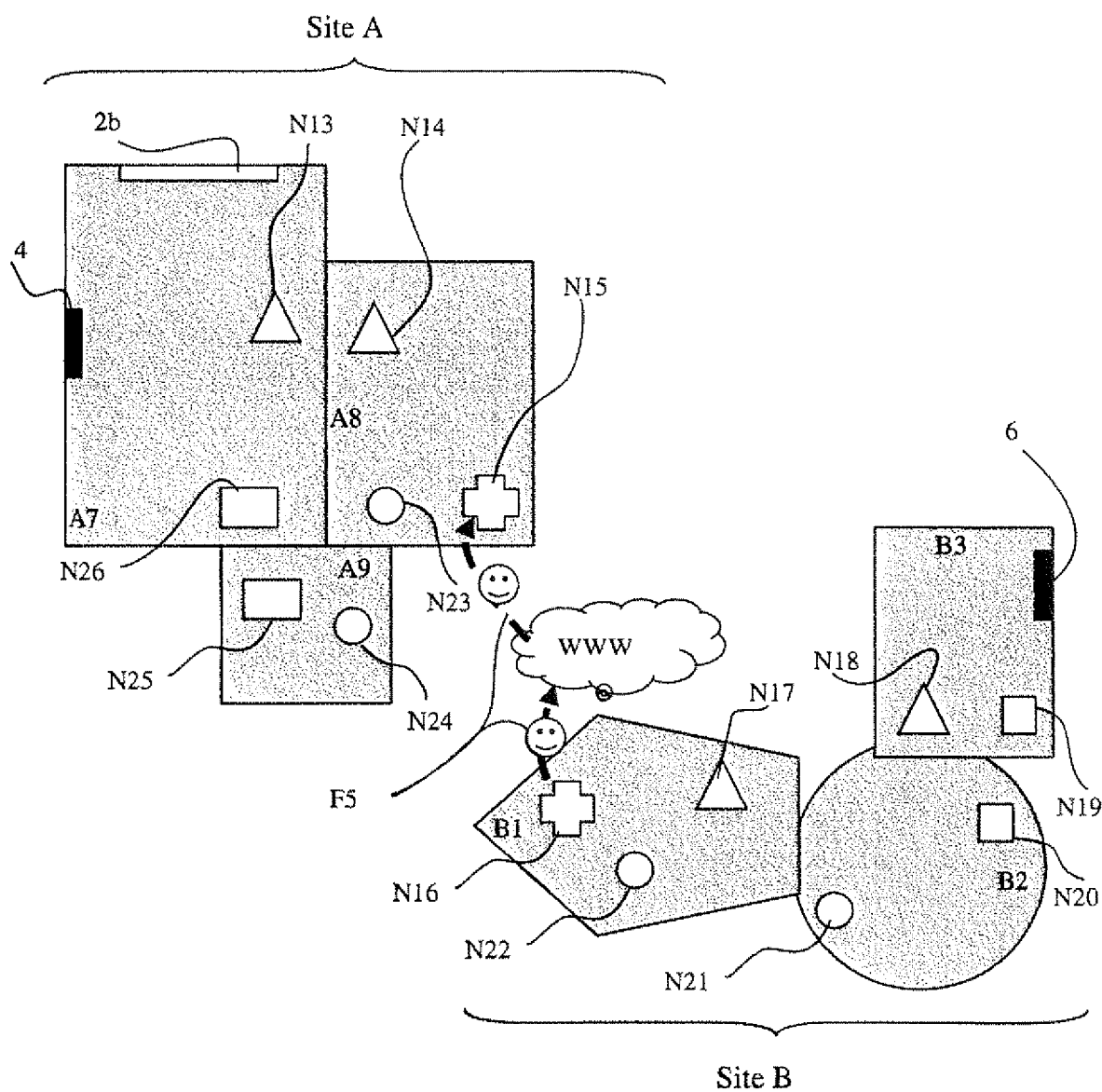
Figure 8M:
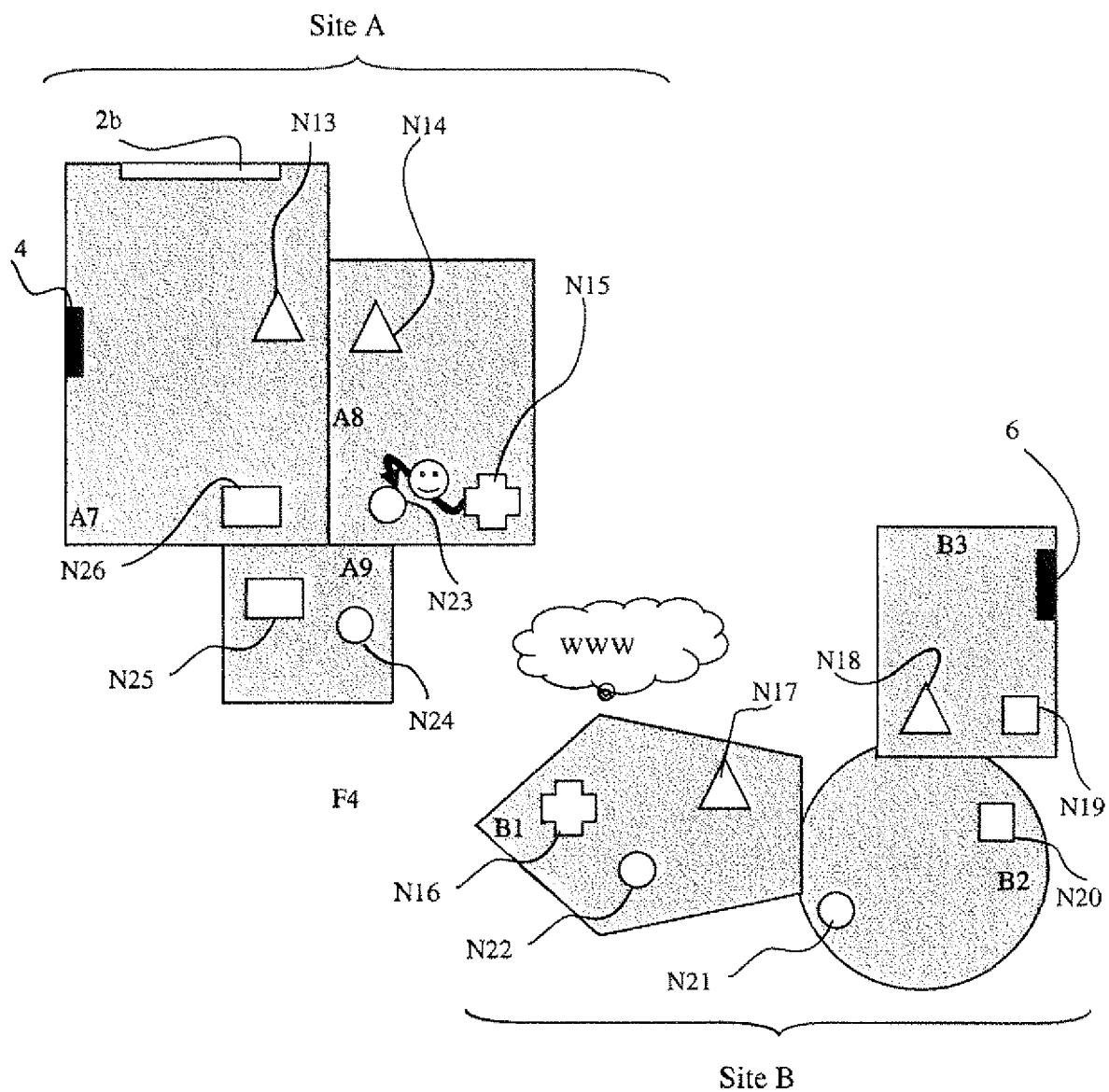
Figure 8N:
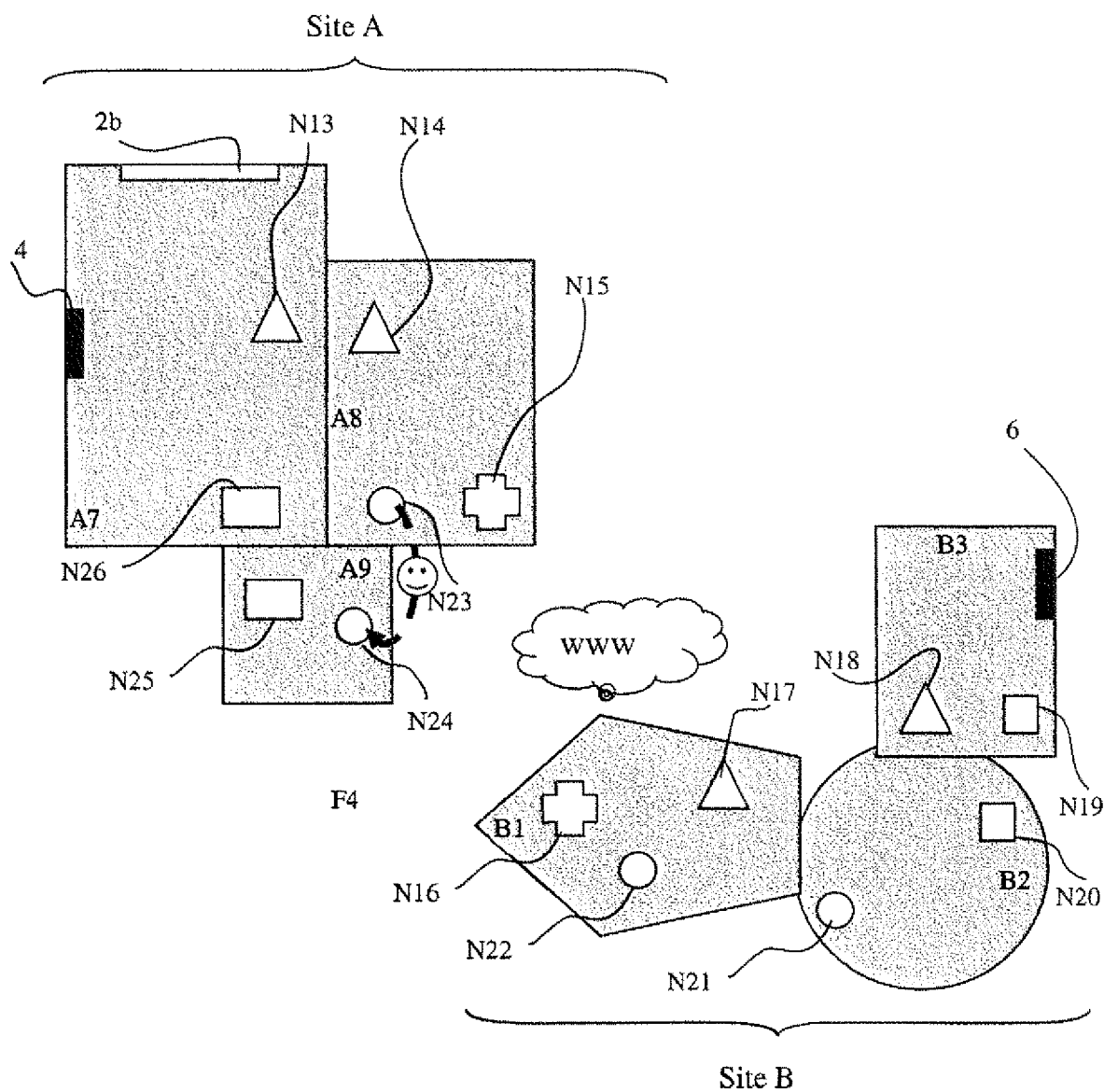
Figure 8O:
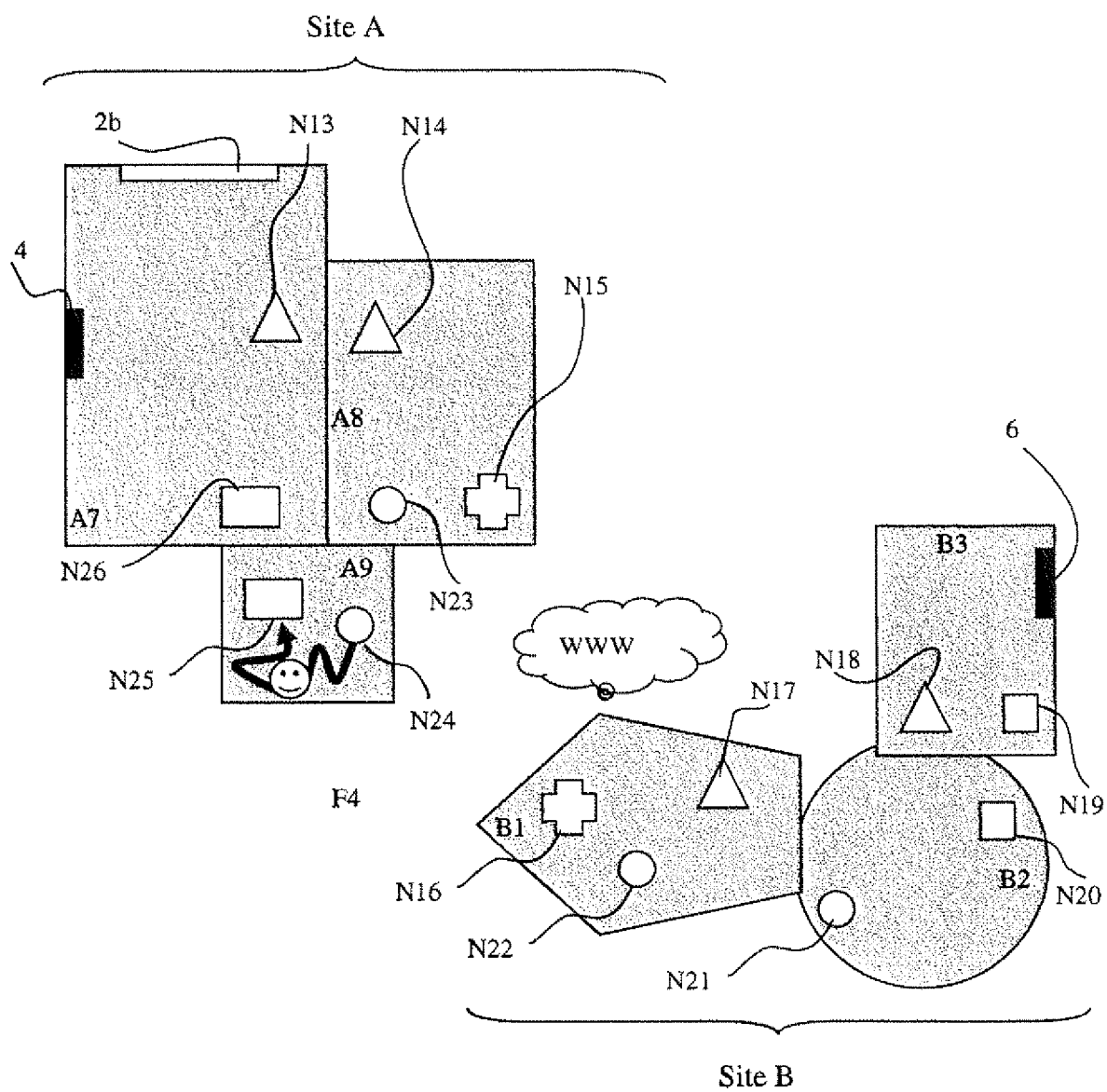
Figure 8P:
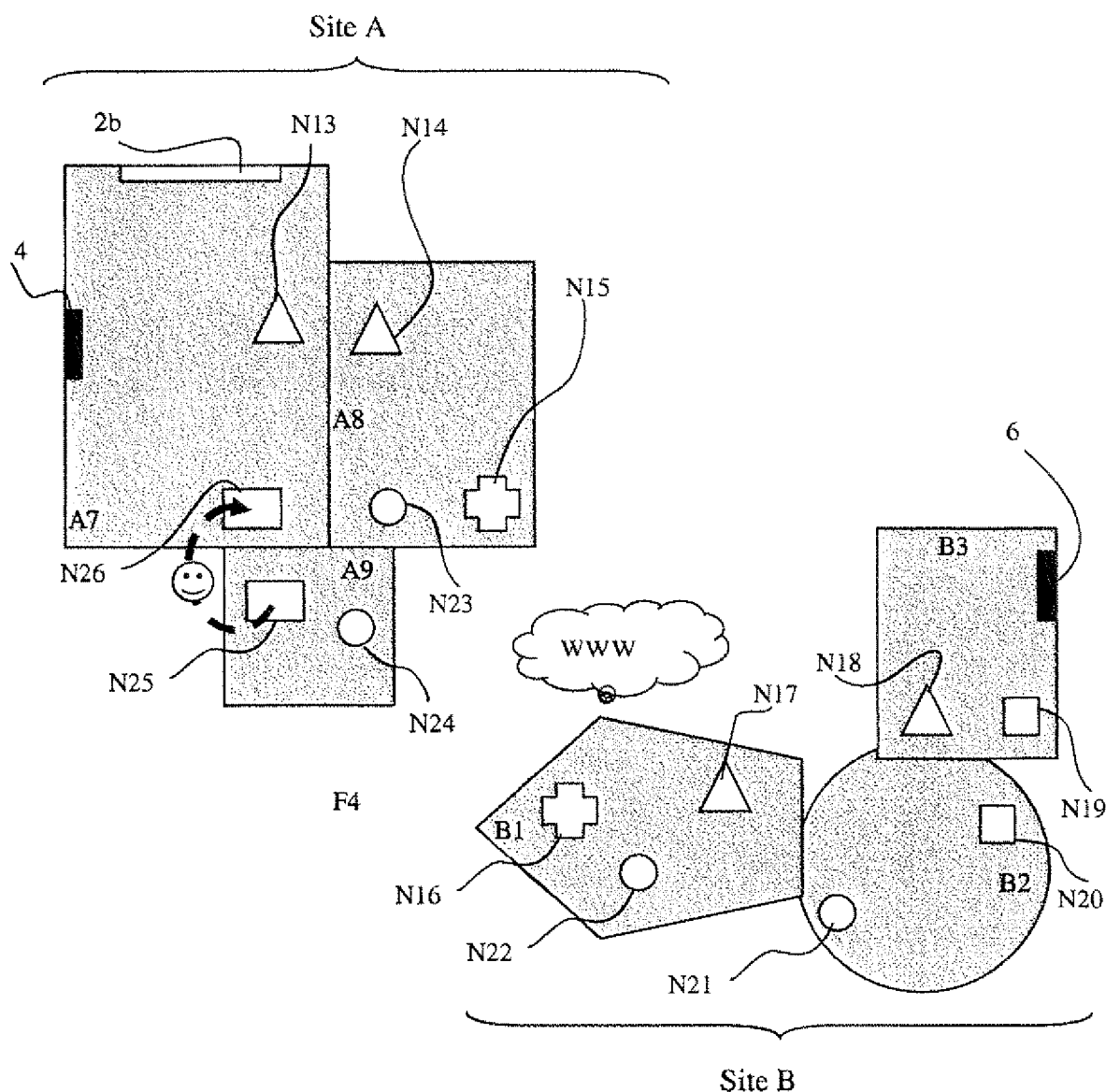
Figure 9:
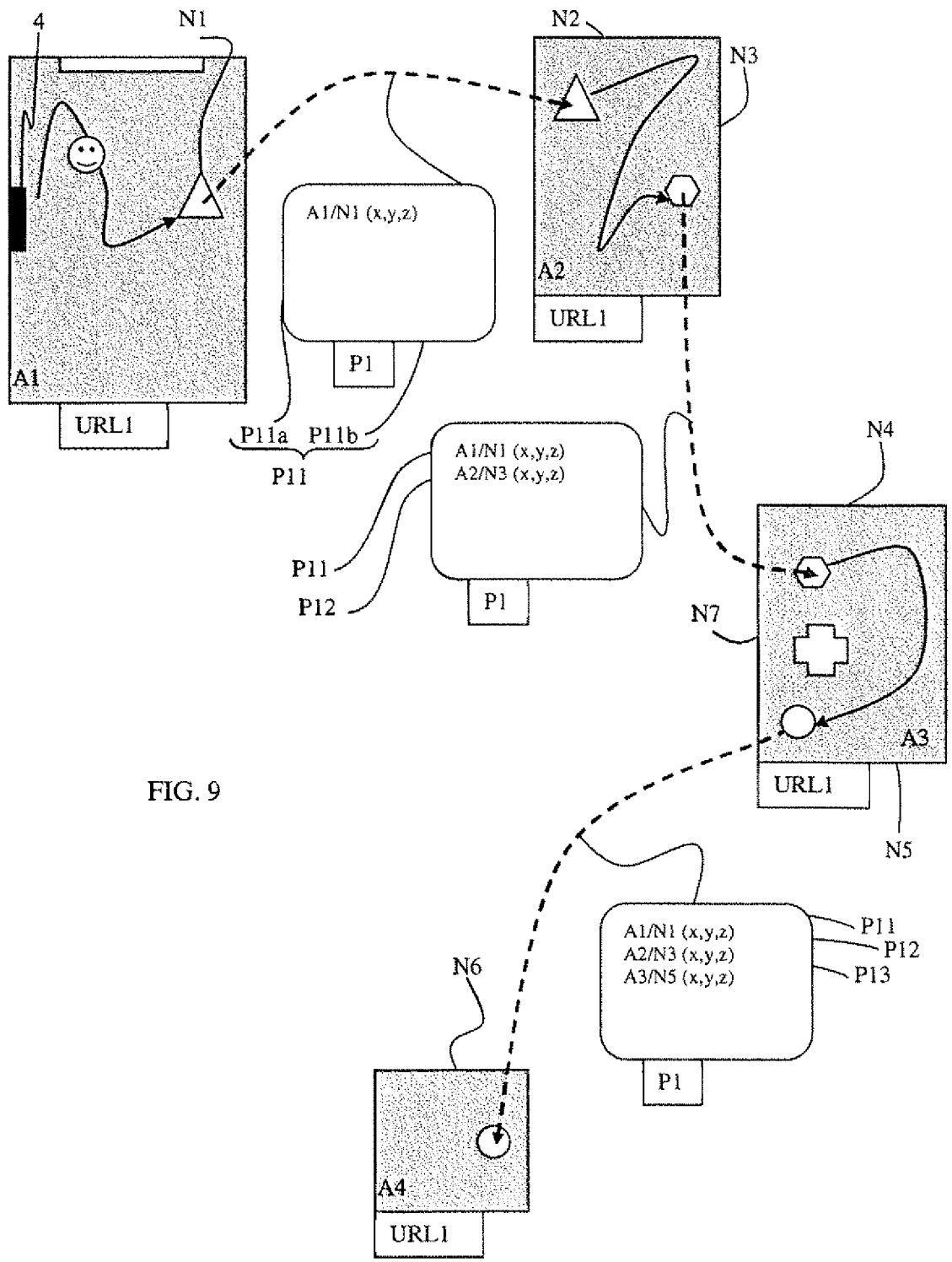
Figure 10:
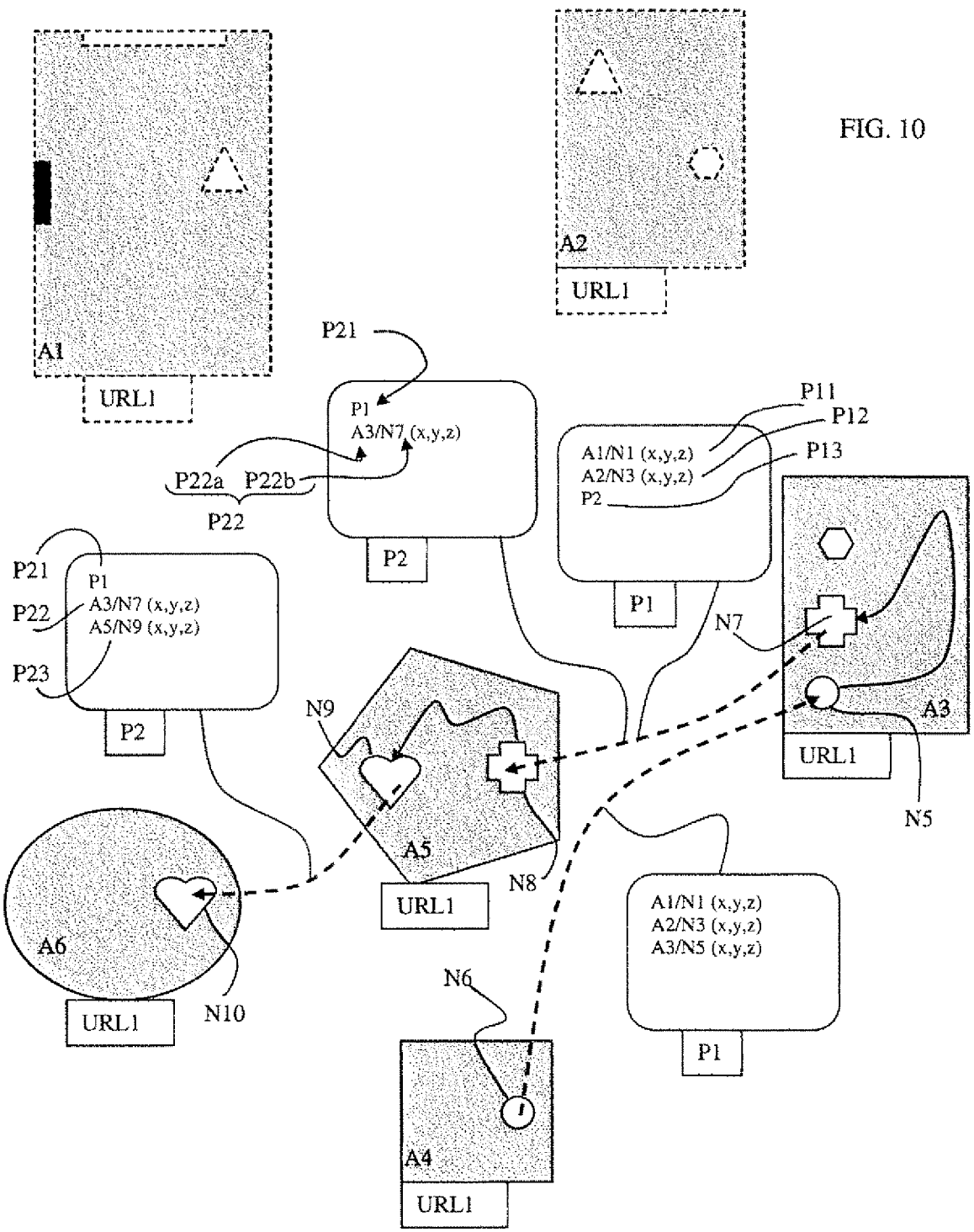
Figure 11:
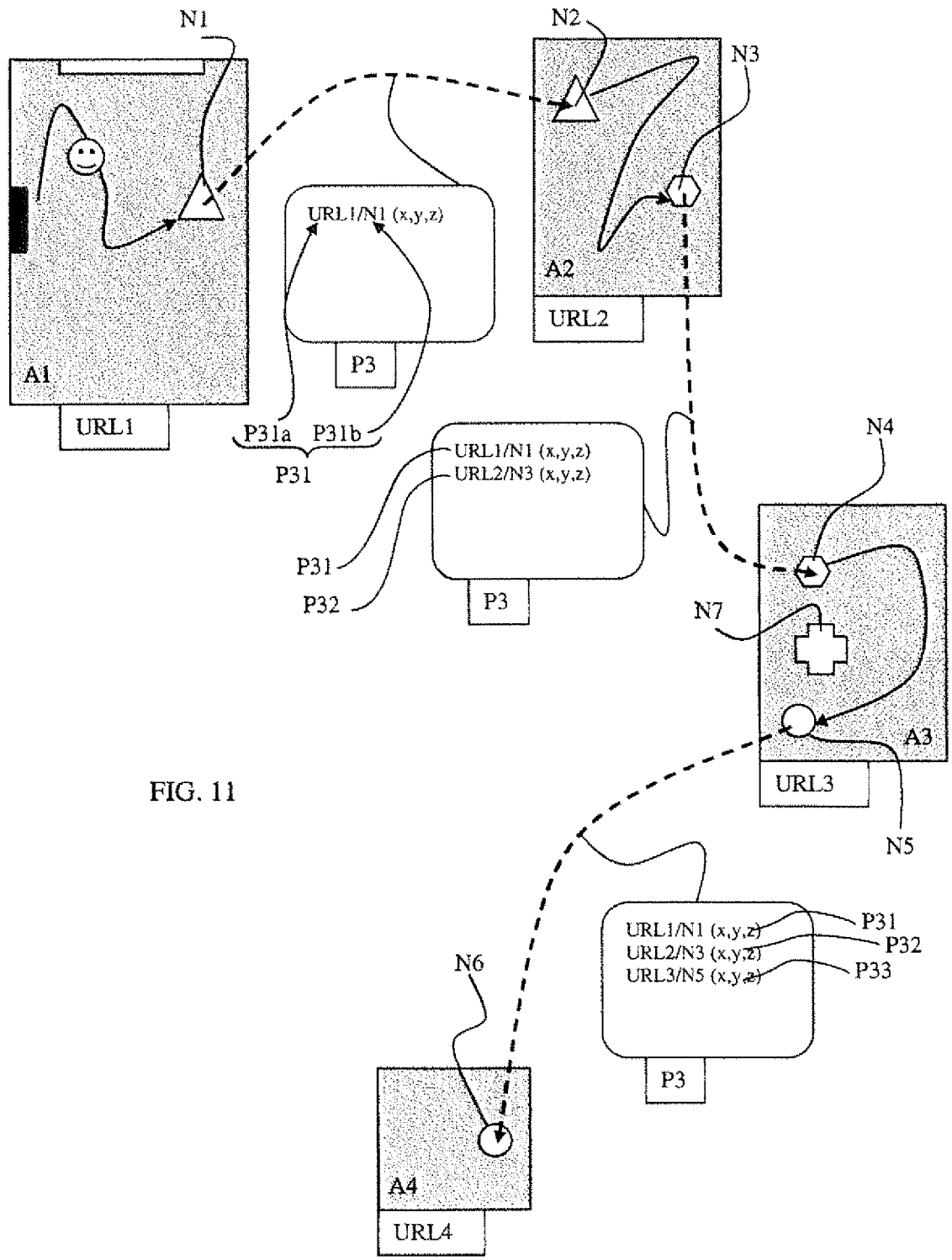
Figure 12:
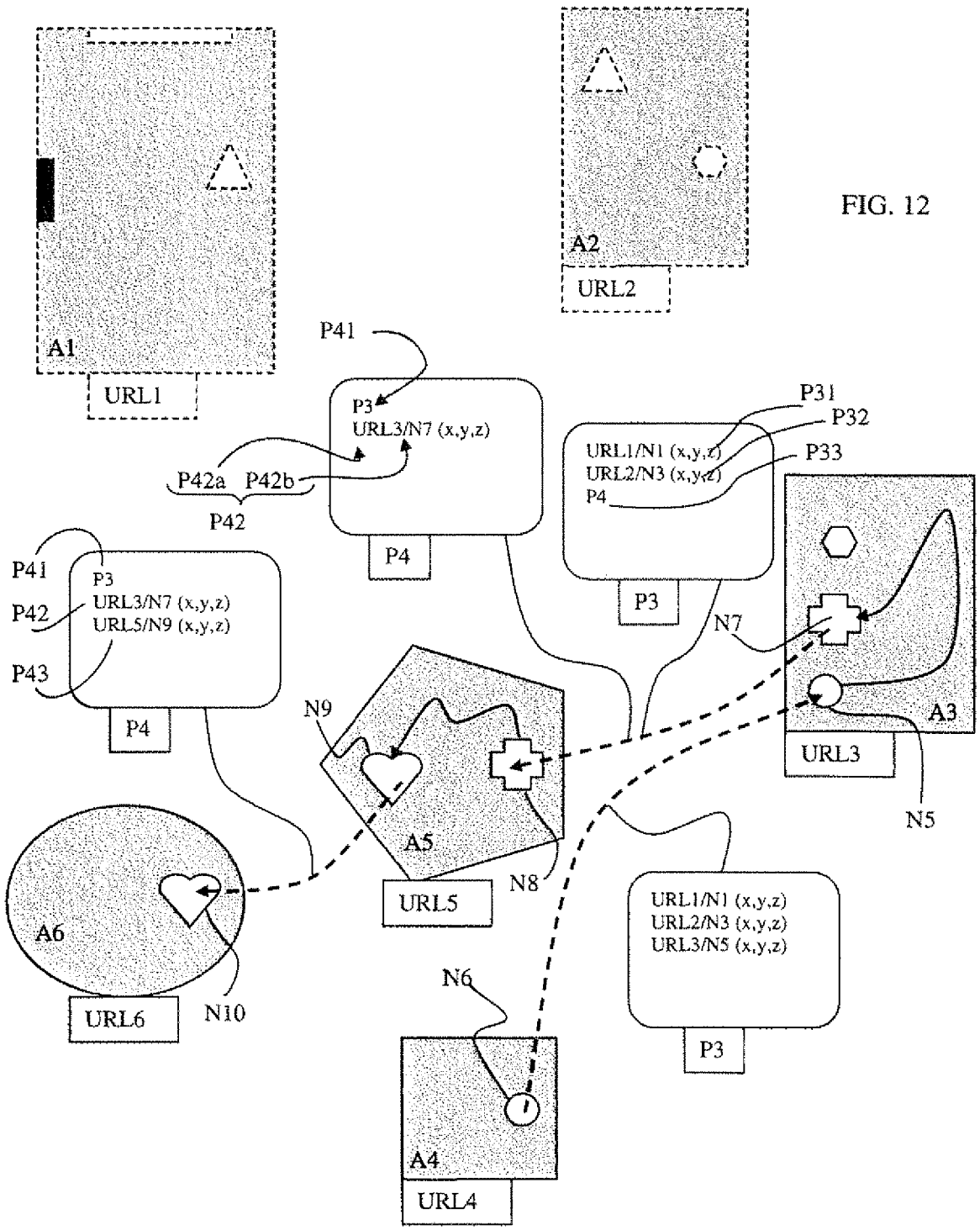
Figure 13A:
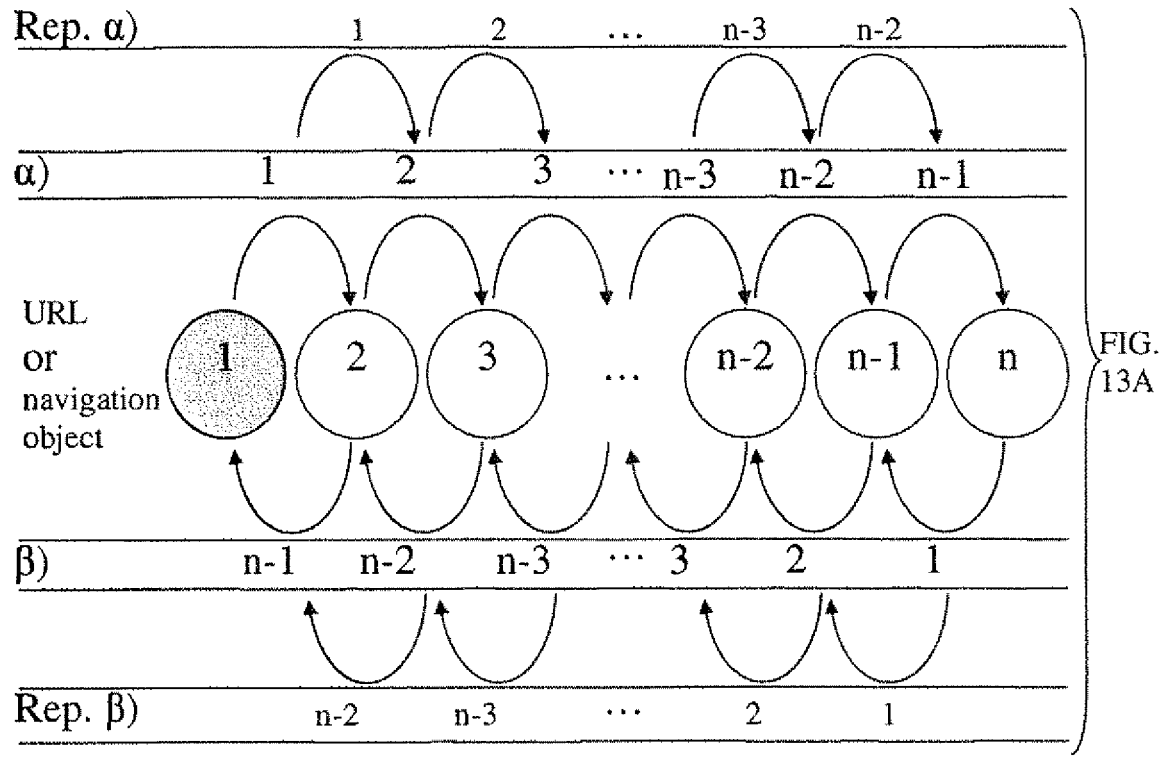
Figure 13B:
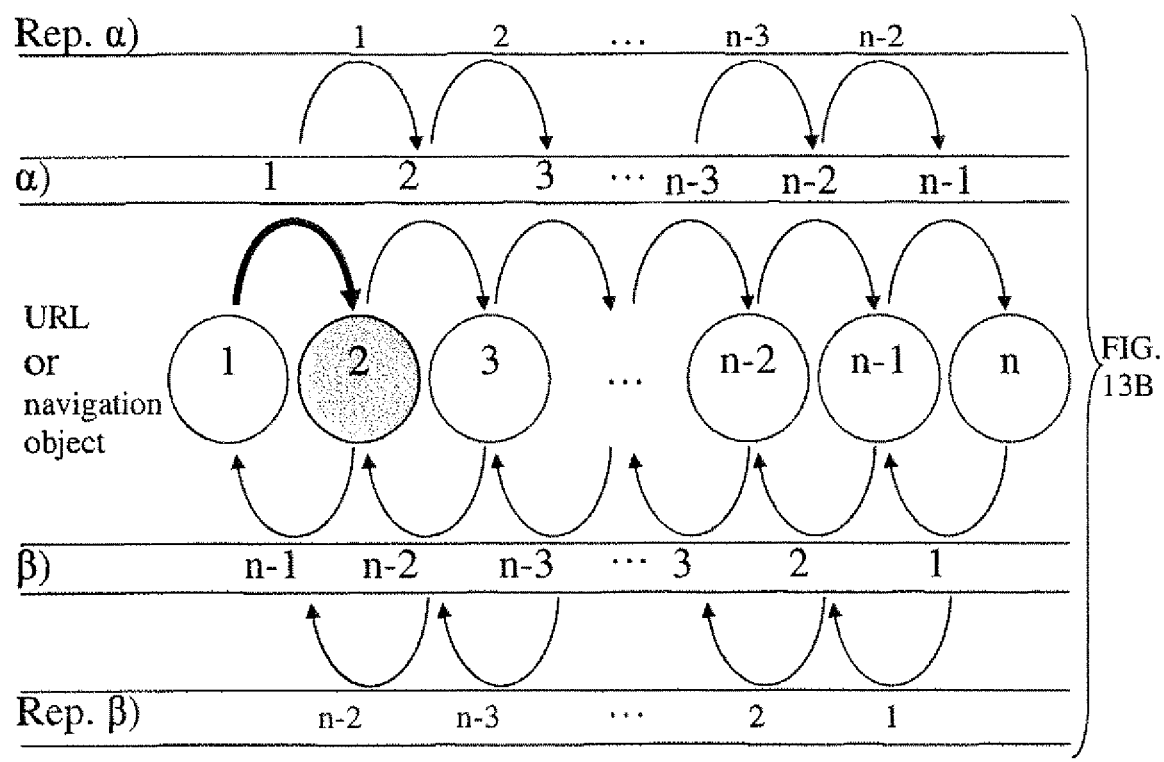
Figure 13G:
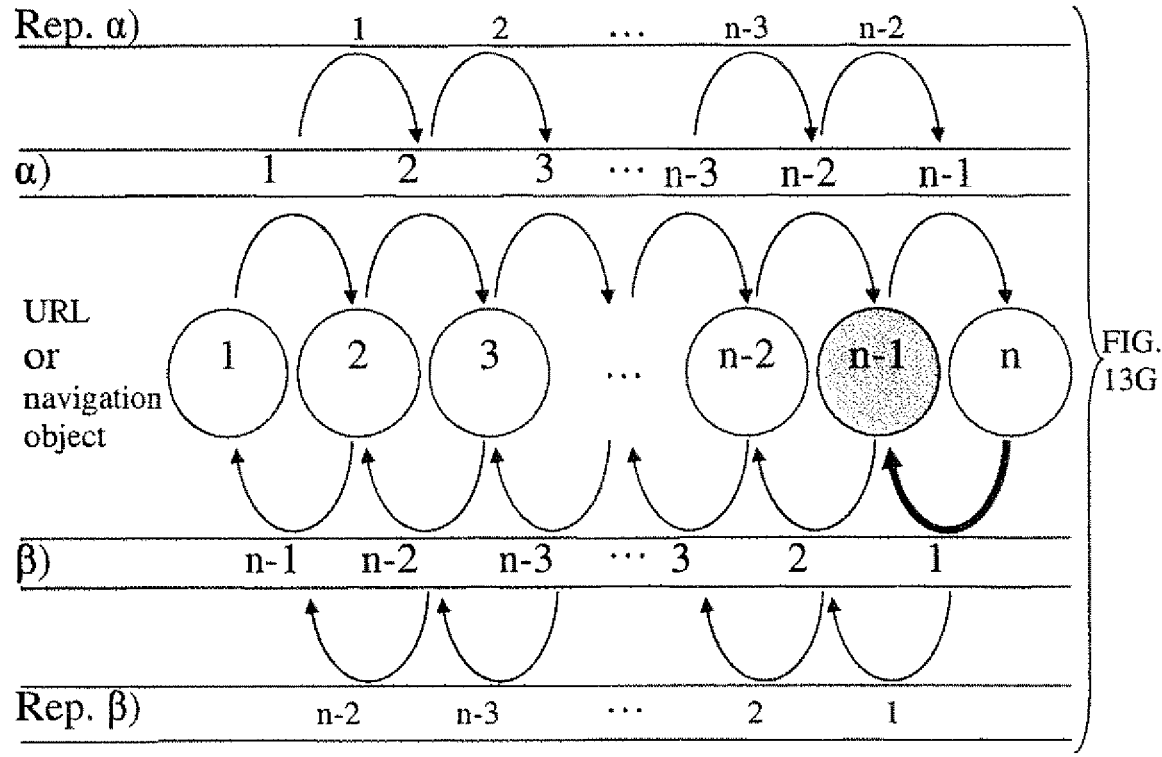
Figure 13H:
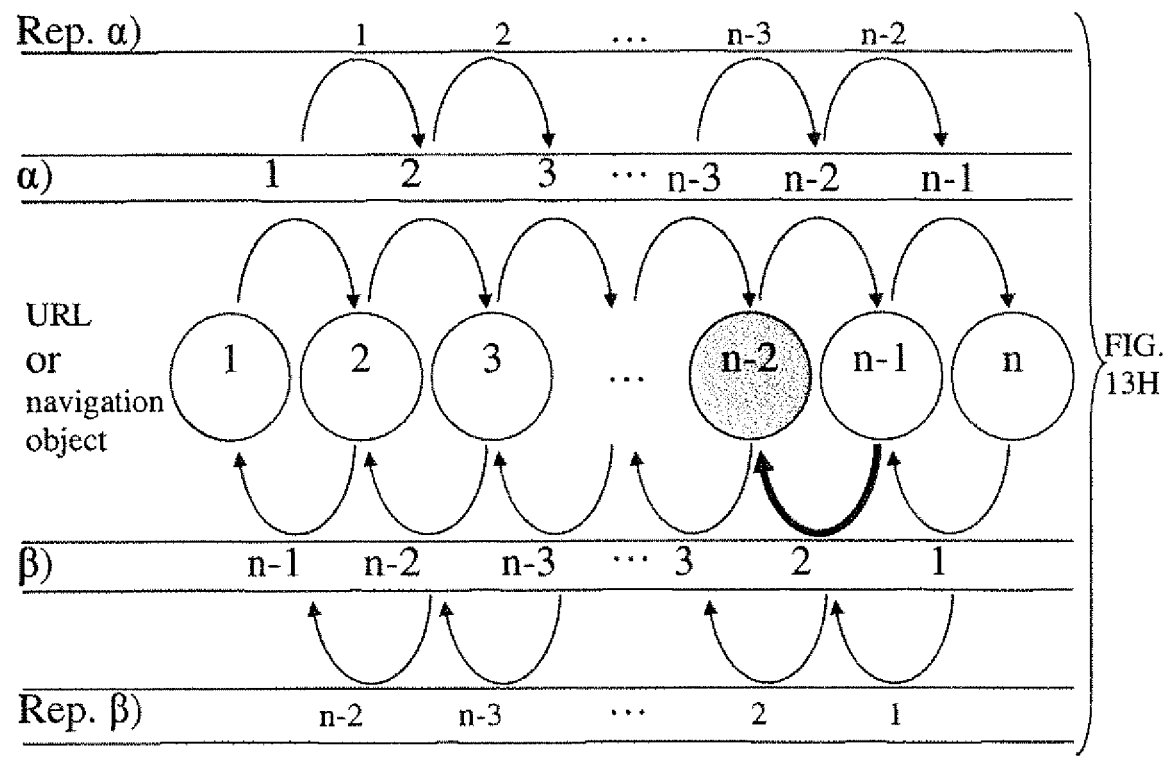
Figure 13I:
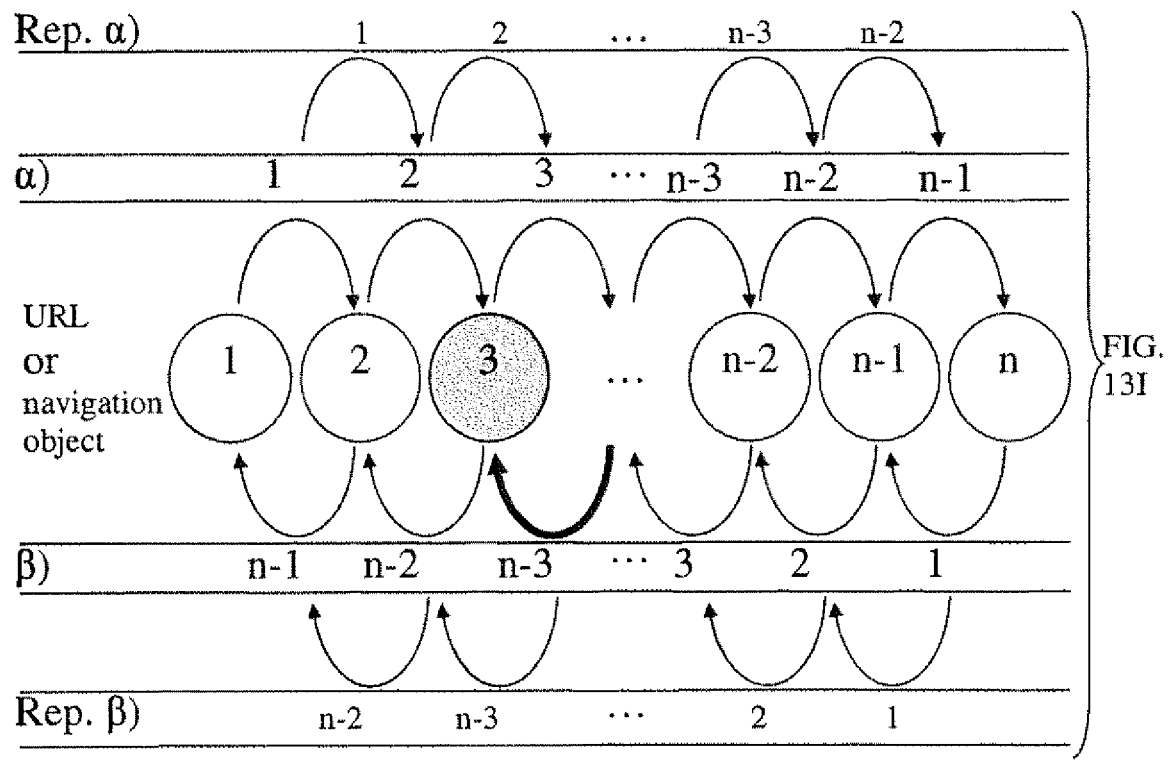
Figure 13J:
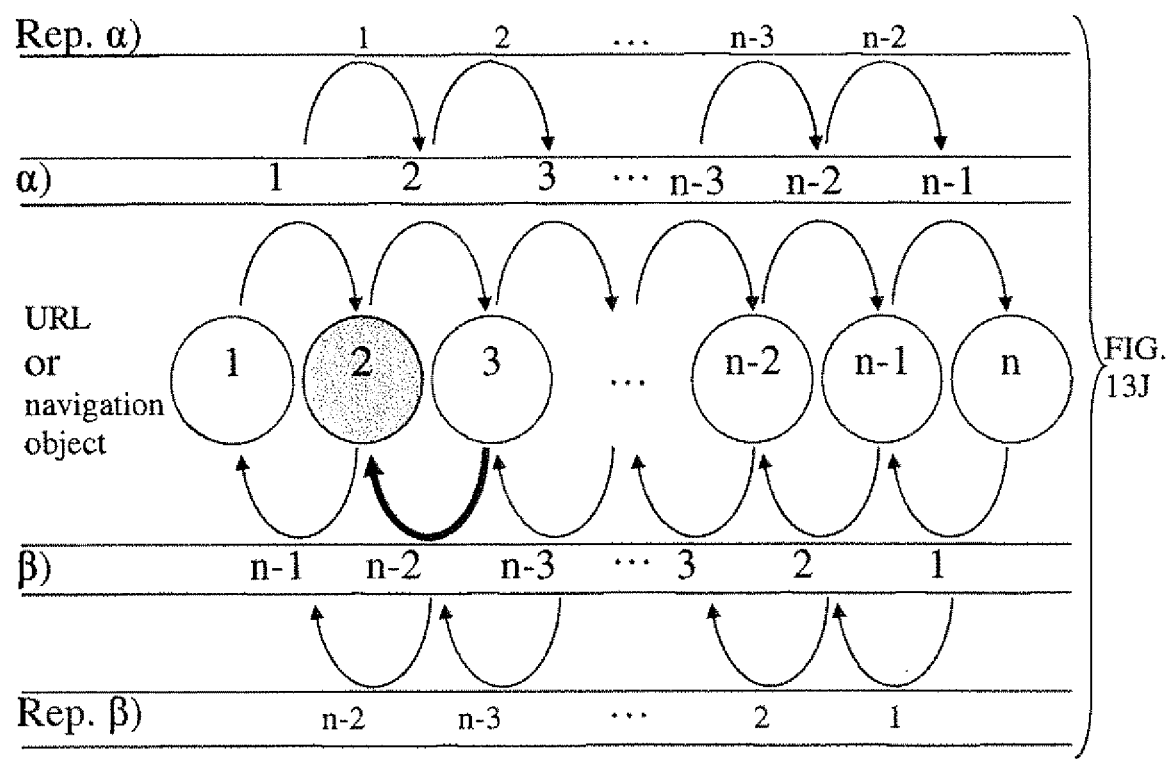
Figure 13K:
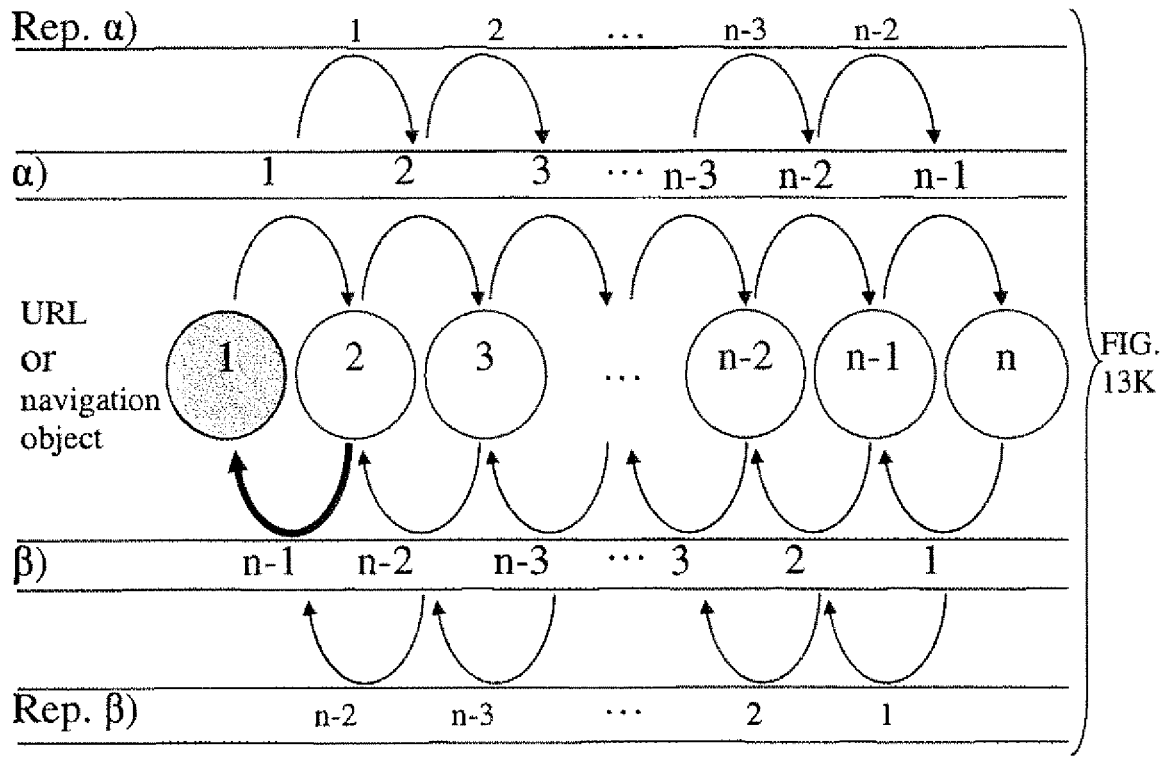
Figure 14:
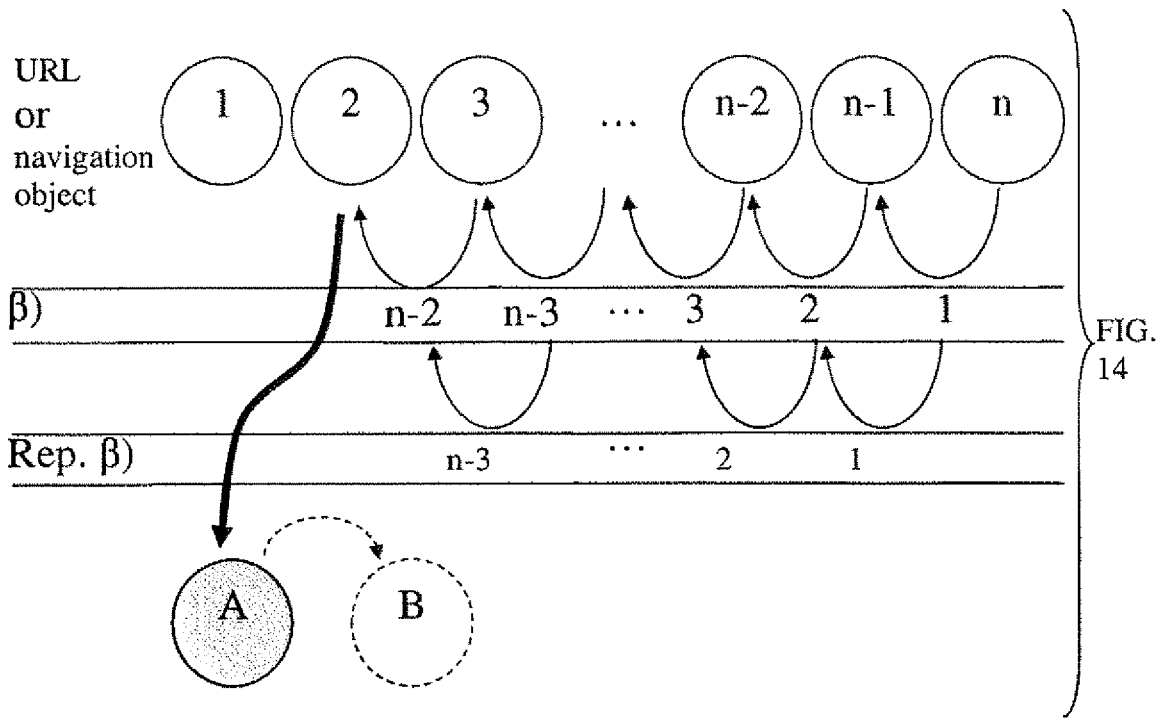
Figure 15:
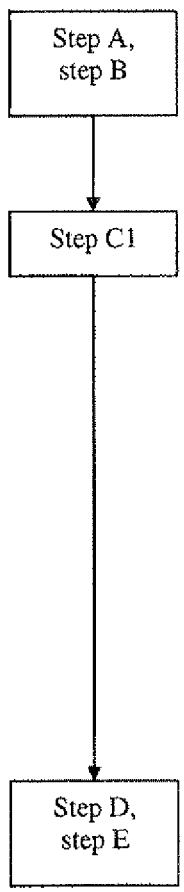
Figure 16:
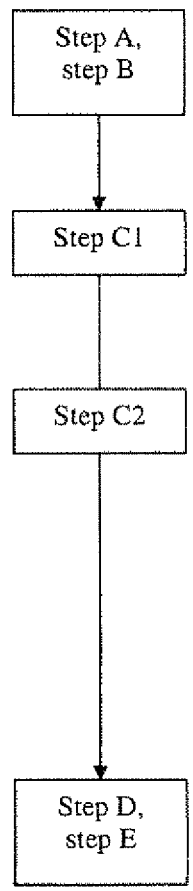
Figure 17:
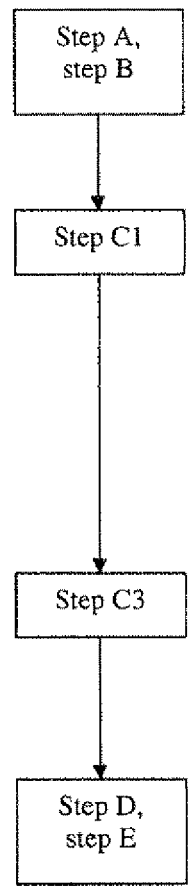
Figure 18:
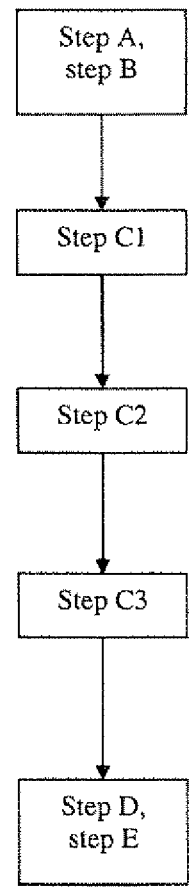

Other characteristics of the invention will emerge from the description detailed hereinafter given with reference to the appended drawings which represent, respectively:

in FIG. 1, a schematic plan view of an exemplary architecture of a network site according to the invention;

in FIG. 2, a schematic perspective view of an example of a three-dimensional space of a network site according to the invention;

in FIGS. 3 and 4, schematic perspective views of the implementation of the method of navigation according to the invention;

in FIG. 5, a flowchart of the method of navigation according to the invention;

in FIG. 6, a flowchart of the method of navigation according to the invention with a timeout step;

in FIG. 7, a flowchart of the method of navigation according to the invention with a timeout and repositioning step;

in FIG. 8, a schematic plan view of an example of navigation route of an avatar within a site A according to the invention, from the site A to a site B according to the invention, within the site B, and return to the site A;

in FIGS. 8A to 8P, the navigation route of FIG. 8, step by step;

in FIG. 9, a schematic plan view of an example of navigation route of an avatar within four three-dimensional spaces of a site according to the invention comprising the same network address, and of an example of a history table generated according to the method according to the invention;

in FIGS. 9A to 9F, the navigation route of FIG. 9, step by step;

in FIG. 10, a schematic plan view of an exemplary return navigation route within the site of FIG. 6 and comprising a bifurcation to two new three-dimensional spaces of the site, and of an example of history tables generated according to the method according to the invention;

in FIGS. 10A to 10E, the navigation route of FIG. 10, step by step;

in FIG. 11, a schematic plan view of an example of navigation route of an avatar between four sites according to the invention having different network addresses, and of an example of a history table generated according to the method according to the invention;

in FIG. 12, a schematic plan view of an exemplary return navigation route between two sites of FIG. 6 and comprising a bifurcation to two new sites having different network addresses, and of an example of history tables generated according to the method according to the invention;

in FIGS. 13A to 13J, schematic charts of an exemplary embodiment of the outward-and-return method of navigation according to the invention, step by step;

in FIG. 13K, a schematic chart of an exemplary embodiment of the method according to the invention of return navigation with direct return to URL1 from step URL2 of FIG. 13J;

in FIG. 14, a schematic chart of an exemplary embodiment of the method according to the invention of return navigation with a bifurcation to another website A from step URL2 of FIG. 13J;

in FIG. 15, a flowchart illustrating an embodiment of the method of building a site according to the invention; and in FIGS. 16 to 18, three flowcharts illustrating three embodiments of the method of building a site made secure according to the invention.

BUILDING THE SITE

The invention proposes a method of building a three-dimensional network site, such as an Internet site, consultable via an interface linked to the network.

In the description which follows, the exemplary embodiments will be given for an Internet site, but other types of network sites can be used.

In a first step A), a 3D modelling software package is used to define the structure of the 3D space or spaces and of the objects which will occupy it.

In the present description, a 3D modelling software package is a software package comprising at least the following functionalities:

design in simultaneous views (ISO, XY plan, YZ plan, XZ plan);

Point, curve, circles, intersection, projections, straight segment, line, spline, plane Surfaces, faces, volumes Volumetric extrusion Boolean operations, By way of illustrative and nonlimiting example, the following software packages may be cited:

3DS Max® published by the company Autodesk

Maya® published by the company Autodesk®

RealNAT® published by the company Bionatics® Solidworks® published by the company Dassault Systemes®. Certain architecture software packages can also fulfil these functions, such as:

Sketchup® published by the company Google®

Allplan® published by the company Nemetschek®

More precisely, during step A), a 3D modelling software package is used to:

a1) generate a three-dimensional site project comprising at least one three-dimensional space (hereinafter 3D space); in FIG. 1, the site obtained in accordance with the method according to the invention comprises six 3D spaces, numbered from A1 to A6;

a2) create at least one two- or three-dimensional so-called "navigation" object in the said project and place it in the or one of the spaces in a defined spatial position, called the "position of the navigation object"; the site illustrated in FIG. 1 comprises ten navigation objects, numbered from N1 to N10;

a3) create a two- or three-dimensional object 1, which is mobile in the said space and controllable by a user by virtue of a control interface or a peripheral, such as a mouse, keyboard keys, a joystick or a motion sensor, linked to the interface.

The navigation object is the equivalent of a door leading to another position: another 3D space of the same site, or another site, 3D or not. Any graphical object can be intended to be a navigation object. For example, simply, the representation of a door or a poster referring to another site.

Likewise, the mobile object 1 is advantageously 3D and constitutes an avatar of the user in the site. It can, in this respect, take the form of a human being, of a fictional stylized figure, of an animal or of an object.

Of course, during step A, other objects 2 can be created, such as decorative objects 2a, mobile or static non-functional stylized figures, video viewing or music streaming windows 2b, etc.

During step A, only the shapes of the 3D spaces and objects are defined. Acquisition of their function(s) (navigation, mobility, behaviour, etc.) is done only in step B subsequently, by virtue of a real-time 3D software package.

In the present description, a real-time 3D software package is a software package comprising at least the following functionalities:

Importing of data with application of a compression without degradation of shapes and volumes;

Application of at least one camera (XYZ point, focal length);

Assigning of a contemplative or onboard mode

In onboard mode, be capable of linking the movements to the functions of the navigation peripherals (advance, retreat, rotate, . . . )

Export according to a format interpretable by the main WEB browsers and allowing real-time interactive 3-dimensional navigation.

By way of illustrative and nonlimiting example, the following software packages may be cited:

UNITY3D® published by the company Unity Technologies

3DVIA® published by the company DASSAULT SYSTEMES®

Quest3D® published by the company Act-3D B.V.®

During this step B, a real-time 3D software package is used to:

b1) assign to the or to each three-dimensional space:

a benchmark system of three-dimensional coordinates. This benchmark makes it possible to define and to ascertain the position. (x, y, z) of each object with respect to an origin position x=0, y=0 and z=0;

aesthetic properties, such as textures, images, photos, or graphical animations (body of water or waterfall, movement of clouds on a surface representing a ceiling or a window), it being understood that the structure of the 3D space is created in step A;

functional properties, such as one or more light sources, a function of ascent and descent at regular intervals of an elevator (whose structure was created in step A), etc.; and simulated physical properties, such as a magnetic field, an electro-magnetic field, or a gravity force which makes it possible, for example, to drop water or an object in the 3D space with a trajectory in accordance with the simulated physical properties.

In the same manner, during a step b2), the said navigation object is assigned:

aesthetic properties, such as textures, images, photos;

navigation properties, such as a link to a so-called "arrival" position in the three-dimensional space or a link to a so-called "destination" network address. Thus, when the navigation object is selected in accordance with the subsequently described method according to the invention, the mobile object is moved to the arrival position or a destination network address is opened in the navigation software package; and simulated physical properties, such as deformation laws, or a mass (whose weight will be defined as a function of the gravity force assigned to the 3D space, for example).

Also, during a step b3), the mobile and controllable object is assigned:

an initial position 4 in the space or one of the spaces of the project. In the example of FIG. 1, the 3D space A1 comprises an initial position 4 at which the mobile object 1 is situated when the site is opened for the first time in the navigation software package. This entails the entrance door of the site according to the invention which is, by analogy with current 2D sites, the equivalent of the "home page";

aesthetic properties, such as textures; and functional properties, such as mobility in the three-dimensional space, the mobility possibly being only continuous, or comprising the ability to jump, to fall, to latch on to objects (which will have been given the property of being able to be caught by the mobile object, of course); and simulated physical properties, such as deformation laws, a mass.

Thereafter, in a step b5), the three-dimensional project is recorded as a digital file having a format interpretable by at least one navigation software package.

By way of illustrative and nonlimiting example, the Unity3D software package makes it possible to record the project in the ".EXE" (for auto-executable) format;

The file obtained in step b5) is thereafter stored on an on-line network server during a step D, and then a network address is assigned to the file during a step E so as to render it accessible by the network in the form of a network site.

The site obtained by the method according to the invention therefore comprises:

a network address;

at least one three-dimensional space;

at least one navigation object N placed in the space at a position (x,y,z) of the navigation object;

at least one object that is mobile and controllable in the said space.

Preferably, the navigation object N consists of a two- or three-dimensional information display, such as a display rack, a door, a screen or other object that displays information to the user, and of a two- or three-dimensional so-called "detection" zone preferably arranged in proximity to the information display.

"In proximity" signifies that the detection zone is preferably placed in a partial or total peripheral zone around the first object.

The navigation object therefore fulfils three functions:

through the information display, an information function for the user to indicate to the latter its capacity as navigation object and/or optionally the position or the network site to which it makes it possible to navigate;

through the detection zone, a function of detection of the mobile object in proximity to the navigation object; and through the information display and/or the detection zone (this depends on the choice made by the person who created the site), a navigation function, that is to say a function of opening a new network address or of positioning the mobile object at a destination position in a 3D space having the same network address as that of the space in which the navigation object is situated.

In FIG. 2, the 3D space comprises two navigation objects N11 and N12 (generally designated by an arrow).

The object N11 comprises a three-dimensional information display N111 (designated by a simple line on the figures) in proximity to which is situated a, likewise three-dimensional, detection zone N112 (designated by a simple line on the figures). Alternatively, the detection zone N112 could be two-dimensional.

The object N12 comprises a two-dimensional information display N121 (designated by a simple line on the figures) in the form of a door in proximity to which is situated a, likewise two-dimensional, detection zone N122 (designated by a simple line on the figures). Alternatively, the detection zone N122 could be two-dimensional.

As will be explained in greater detail subsequently, the navigation property associated with each navigation object is activated by the simple encountering of the navigation object N by the mobile object 1, without it being necessary to click on the navigation object with one of the buttons of a mouse.

Architecture of the Site

According to a first embodiment of the invention, each three-dimensional space of the site is associated with its own network address.

Thus, according to the invention, it is possible to create a site having several 3D spaces, each 3D space having its own network address. This amounts to considering each 3D space to be an independent network site. The only links which exist between the 3D spaces are the navigation properties of the navigation objects which allow the mobile object to navigate from 3D space to 3D space, that is to say from network address to network address.

In this first embodiment, at least one navigation object of each 3D space possesses as navigation property the ability to control the opening, in the navigation software package, of a destination network address which is different from the network address of the 3D space in which the navigation object is situated, and to position the mobile and controllable object at a so-called "arrival" position in a three-dimensional space of a three-dimensional site having the destination network address.

For example, if the site of FIG. 1 is embodied in accordance with this first embodiment, each 3D space A1 to A6 possesses its own network address.

Each space A2 to A5 comprises, in this simplified example, a navigation object making it possible to navigate to the next space and a navigation object making it possible to navigate to the previous space.

The space A1 comprises only a navigation object making it possible to navigate to the space A2, and the next space A6 comprises only a navigation object making it possible to navigate to the previous space A5.

When the mobile object 1 wanders around in the space A1 along the path F1, it may encounter the navigation object N1. This encounter triggers the opening of the network address of the 3D space A2 by the navigation software package, in the same tab, in the same window, in a new tab or in a new window.

The navigation software package then displays the 3D destination space (here the space A2) and positions the mobile object 1 therein.

Advantageously, the navigation property assigned to the navigation object comprises, furthermore, the ability to navigate the mobile object 1 to a specific arrival position.

Advantageously, this arrival position is situated in proximity to the position of a navigation object N2 situated in the destination space A2, this object N2 allowing a return to the departure space A1. Thus, in the case where the user has made a poor manipulation by triggering the opening of the address of the space A2, he can easily return to the previous space by virtue of the object N2.

In a second embodiment of the invention, each 3D space of the site is associated with a common network address. In this case, the navigation is performed not by loading a new network address, but by "teleporting" the mobile object in the 3D space to the arrival position, that is to say by positioning the mobile object directly at the arrival position, without the user needing to control the movement of the mobile object along the entire journey from the navigation object to the arrival position.

In this second embodiment, the or each navigation object has as navigation property the ability the ability to position the mobile and controllable object at an arrival position in a three-dimensional space of the network site in which the navigation object is situated.

For example, if the site of FIG. 1 is embodied in accordance with this second embodiment, each 3D space A1 to A6 possesses the same network address.

When the mobile object 1 wanders around in the space A1 along the path F1, it may encounter the navigation object N1. This encounter triggers the sending of the mobile and controllable object 1 to an arrival position in the 3D space A2 of the network site. It is of course conceivable to provide several navigation objects inside one and the same space, so that the object is sent from object to object in the same space.

Navigation

As explained hereinabove, the navigation property associated with each navigation object is activated by the simple encountering of the navigation object N by the mobile object 1.

More precisely, the invention proposes a method of navigation from or within the network address of a three-dimensional space of a network site according to the invention, comprising the following steps.

With the aid of a hardware interface,
α) In a navigation software package suitable for the hardware interface used (a computer, a tablet or a Smartphone, for example):
α.1) the user opens the network address of the site according to the invention;
α.2) and then he commands the movement of the mobile and controllable object 1 in the or one of the three-dimensional spaces from an initial position 4 (FIG. 1);
α.3) as a function of the information present on the navigation objects N or of their shape or of any other visual or auditory stimulus, the user may be interested in a navigation object and decide to implement the navigation action associated with the object which interests him. Accordingly, without it being necessary for the user to click on the object, he selects a navigation object by positioning the mobile and controllable object 1 in a secant manner with respect to the navigation object, which means in a manner where the mobile and controllable object overlaps the navigation object, especially the detection zone of the navigation object, i.e., in a manner where the mobile and controllable object intersects the navigation object, especially the detection zone of the navigation object;
α.6) the navigation software package then generates a navigation action as a function of the navigation properties assigned to the navigation object.

By secant, it is understood that the volume of the mobile and controllable object at least partially intersects with the volume of the detection zone of the navigation object. In other words, the geographical coordinates of at least a part of the mobile and controllable object are located within the geographical coordinates of the detection zone of the navigation object.

The mobile and controllable object can be displayed on the interface, as if the user were "outside" the mobile object. This representation allows convenient manipulation of the mobile object by the user.

Alternatively, the representation can be more immersive in the site by removing the display of the mobile object, so that the user has the impression of being the mobile object himself.

These two types of representations are known in video games, respectively under the labels "third-person view" (the avatar is displayed), and "first-person view" (the mobile object is not displayed).

Even if the mobile object is not displayed, it is nevertheless included in the network site according to the invention, and it is functional, that is to say it can be positioned overlapping a navigation object.

Control of the movement of the mobile object can be performed with keys of a keyboard (preferably the arrows), with a joystick, with one or more movement detectors (accelerometer, radar, camera, etc.), capable of detecting the movement of the interface itself, of at least one finger, of at least one hand, of at least one eye, of the head, or of the body.

The mobile object can also be moved by virtue of the movement of the mouse (or of the finger for touch-sensitive interfaces) but not by the buttons of the mouse (mouse "clicks") or manual clicks for touch-sensitive interfaces. According to the invention, selection of the navigation object, and therefore navigation, is done solely by a means for moving the mobile object, without a selection means (click buttons of a mouse) being necessary.

Advantageously, as illustrated in FIGS. 3 and 4, if the navigation object comprises an information display and a detection zone, step α3) consists in selecting the navigation object N by positioning the mobile object 1 in a secant manner with respect to the zone of detection of the navigation object, which means in a manner where the mobile and controllable object overlaps the navigation object, especially the detection zone of the navigation object (see zone 5 in FIG. 4).

As long as the mobile object does not overlap the detection zone (FIG. 3), no navigation action is generated. The user can however read on the screen what is inscribed on the navigation object. If he wishes to trigger navigation, for example because he is interested in visiting the site which is represented on the object, the user commands with his joystick, his arrow keys, or any other movement detection interface, the movement of the mobile object towards the navigation object (direction of the arrow F2 in FIG. 3).

Alternatively, the detection zone N122 can be plane, that is to say two-dimensional. In this case, selection of the navigation object is done when the mobile object encounters the plane, passes above the plane or passes below the plane of the detection zone.

When the mobile object 1 is secant to the detection zone, i.e., overlaps the detection zone, the navigation action is triggered.

Alternatively, the zone of detection of the navigation object can be included in the information display, if the information display is provided with a physical property making it possible to detect that the mobile object hits it rigidly or elastically (with or without deformation). The detection zone included in the information display can then command the navigation software package to generate the navigation action.

Preferably, step α) of the method according to the invention furthermore comprises, after step α.3), a step α.4) of timeout of predefined duration, starting as soon as the mobile object overlaps the navigation object or the detection zone, step α.6) being triggered only if the mobile object and the navigation object or the detection zone remain secant, i.e., overlapped, throughout the duration of the timeout.

Stated otherwise, if the mobile object 1 and the detection zone are no longer overlapped before the end of the predefined duration of timeout (for example 3 seconds), the navigation action is not triggered. This allows the user to separate the mobile object 1 from the navigation object if he does not ultimately wish to navigate, or if he has made a mistake. This timeout allows very fluid navigation, having the mobile object wander around without any risk of navigating unintentionally outside of the 3D space in which the user is situated, just by unintentionally overlapping a navigation object, especially the detection zone of said navigation object. In other words, the time out avoid travel if detection zone overlap was inadvertent. On the contrary, with a mouse click or finger click for touch-sensitive interfaces, it is necessary either to interrupt the loading of the new address, or to go back via the "page back" button of the navigation software package. In the present method, the user is informed that he has triggered a countdown to navigate outside of the 3D space in which he is situated, and he can choose to retract before triggering the navigation action.

In an optional manner, the method according to the invention can comprise, when the timeout is started (therefore after step α.4)), and before the navigation action is triggered (therefore before step α.6)), a step α.5) of predefined repositioning of the mobile object with respect to the navigation object, as soon as the mobile object overlaps the navigation object or the detection zone, the repositioning keeping the mobile object overlapping the navigation object or the detection zone so as to prevent the timeout from being cancelled.

This repositioning can be the information given to the user that he is on the point of triggering a navigation action.

FIGS. 5 to 7 summarize the method of navigation according to the invention, depending on whether it comprises a timeout step (FIG. 6), repositioning step (FIG. 7), or neither of these steps (FIG. 5).

The flowchart of FIG. 5 is interpreted in the following manner:

After having implemented step α.1), the user makes the mobile object 1 wander around in the 3D space of the site according to the invention, in a step α.2).

As long as no navigation object N is selected in accordance with step α.3) ("no" arrow of step α.3) of FIG. 5), the movement of the mobile object 1 can continue in accordance with step α.2).

When a navigation object N is selected in accordance with step α.3) ("yes" arrow of step α.3) of FIG. 5), step α.6) can be implemented, and a navigation action is triggered.

If the method according to the invention comprises a timeout step, the flowchart of FIG. 6 is interpreted in the following manner:

The steps from α.1) to the "no" arrow of step α.3) are identical to FIG. 5.

When a navigation object N is selected in accordance with step α.3) ("yes" arrow of step α.3) of FIG. 6), the timeout step α.4) is started.

If the timeout is interrupted ("no" arrow of step α.4) of FIG. 6), the movement of the mobile object 1 can continue in accordance with step α.2).

If the timeout runs to its term ("yes" arrow of step α.4) of FIG. 6), step α.6) can be implemented, and a navigation action is triggered.

If the method according to the invention comprises a repositioning step, the flowchart of FIG. 7 is interpreted in the following manner:

The steps from α.1) to the "no" arrow of step α.3) are identical to FIG. 6.

When a navigation object N is selected in accordance with step α.3) ("yes" arrow of step α.3) of FIG. 7), the timeout step α.4) is started. A repositioning of the mobile object 1 with respect to the navigation object N is then performed by the navigation software package so as not to unintentionally interrupt the timeout.

If the user retracts, he commands a retreat movement of the mobile object, so that the mobile object no longer overlaps the detection zone. The timeout is then interrupted intentionally by the user ("no" arrow of step α.4) of FIG. 7), and the movement of the mobile object 1 can continue in accordance with step α.2).

If the user leaves the mobile object in its repositioned position, the timeout runs to its term ("yes" arrow of step α.4) of FIG. 7), step α.6) can be implemented, and a navigation action is triggered.

As described previously, this navigation action can be either the opening of a new network address, or the immediate positioning of the mobile object at an arrival position, in the same 3D space or in a different 3D space, but furnished with the same network address as the network site in which the navigation object is situated.

Access Table

Advantageously, the invention proposes to associate with the 3D site according to the invention, a text file called, in the present description, "access table". This file comprises a nonmed description of the 3D site according to predefined descriptors.

Thus, the method of building a three-dimensional network site according to the invention comprises, before step D), a step C1) of creating and networking an access table for the site comprising at least the following items of information:
a descriptor of the access table comprising the lin address of the site, the number of three-dimensional spaces that the site comprises, the number of navigation objects that the site comprises, and the field separator used;
an initial position of a user when the latter accesses the site.
an identifier of the or of each three-dimensional space in the site;
an identifier of the or of each navigation object;
the position of each navigation object;
the navigation properties of each navigation object; and The access table therefore takes the form of an array consisting at least of the following columns:
identifier of 3D Space
identifier of navigation object;
position of navigation object;
navigation property of navigation object; and
initial position of the mobile object when a user accesses the site.

For example, the site of FIG. 1 could have as access table the following file:
http://www.XXXX.yyy
6
10
0,0,0
/
A1/N1/xN1yN1zN1/A2/N2/xN2yN2zN2
A2/N2/xN2yN2zN2/A1/N1/x.N1yN1zN1
A2/N3/xN3yN3zN3/A3/N4/xN4yN4zN4
A3/N4/xN4yN4zN4/A2/N3/xN3yN3zN3/
A3/N5/xN5yN5zN5/A4/N6/xN6yN6zN6/
A3/N7/xN7yN7zN7/A5/N8/xN8yN8zN8
A4/N6/xN6yN6zN6/A3/N5/xN5yN5zN5
A5/N8/xN8yN8zN8/A3/N7/xN7yN7zN7
  A5/N9/xN9yN9zN9/A6/N10/xN10yN10zN10
A6/N10/xN10yN10z10/A5/N9/xN9yN9zN9
This file is interpreted in the following manner:
The first row is the URL address of the site.
The second row is the number of three-dimensional spaces constituting the site. As seen in FIG. 1, the site comprises six spaces A1 to A6.

The third row is the number of navigation objects constituting the site. In the example of FIG. 1, the site comprises ten of them.

The fourth row is the initial position of the avatar of the visitor in the site. Here, the initial position is identical to the reference position where x=0, y=0 and z=0. This is, in FIG. 1, the entrance door referenced 4 in the figure.

The fifth row is the field separator used. Here, it is /. Thus, the site display system knows how to interpret the following rows comprising various fields (or columns).

The sixth to fifteenth rows describe each navigation object and its navigation properties. For example, the sixth row is interpreted as follows: In the space A1, the object N1 positioned at the coordinates xN1yN1zN1 has as navigation property that of placing the user in the space A2, in proximity to the object N2 positioned at the coordinates xN2yN2zN2.

Of course, this is merely an exemplary embodiment of an access table. Instead of directly comprising the above items of information, the access table could call upon other tables comprising the said items of information. This would make it possible to accelerate the reading and interpretation of the access table by the navigation software package.

A norm could be established for the design of the access table so that the navigation software packages can interpret in a uniform mariner the access tables of all the 3D sites according to the invention.

The access table of the site according to the invention is particularly advantageous since it allows:
ergonomic navigation inside a site or between two sites;
in combination with a navigation history table (described in detail subsequently), return navigation to be made possible;
enhanced securing of the site in terms of administration and access.

Indeed, when the network site according to the invention is associated with an access table, provision may be made for the navigation software package to consult the access table just before generating the navigation action. Thus, the software package knows the configuration of the destination 3D space before sending the mobile object 1 thereto.

Advantageously, the method according to the invention provides a timeout step α.4), comprising, furthermore, during the timeout, the consultation by the navigation software package of the access table of the network site towards which the navigation object points.

If this is an intra-site navigation (that is to say within one and the same network address), it is the access table of the site in which the mobile object 1 is already situated.

If it is an inter-site navigation (that is to say from a first network site according to the invention, termed the "departure" site, to a second network site according to the invention, termed the "arrival" site) it is the access table of the arrival network site.

The navigation software package can then position the mobile object at the initial position 4 of the arrival site.

Preferably, step α.4) of the method according to the invention comprises, furthermore, during the timeout, and after the reception of the access table of the second network site, the display of a so-called "arrival" position by default (for example the initial position of the arrival site) and of the position of the object or of each of the navigation objects of the second network site, so that the user can choose the position at which he wishes to arrive in the second network site.

Stated otherwise, the invention provides that during the timeout phase, the destination site envisaged by the navigation object of the departure site, sends the departure site its access table making it possible to locate each navigation object in the envisaged site.

The departure site then displays, still during the timeout phase, the possible destinations (that is to say, at least, the positions of the navigation objects) in the envisaged site.

Thus, after having interpreted the access table of the arrival site, the navigation software package can propose to the user either to position the mobile object in the initial position of the arrival site, or in proximity to one of the navigation objects, or indeed to another object. It then suffices for the user to select the destination position of his choice.

The access table therefore allows ergonomic navigation inside a site or between two sites.

An example of navigation according to the invention is illustrated in FIG. 8.

The mobile object illustrated in the form of an avatar 1 navigates within a site A according to the invention, from the site A to a site B according to the invention, within the site B, and returning to the site A.

In the exemplary embodiment of FIG. 8, the mobile object 1 is moved by the user from the initial position 4 of the site A, situated in the 3D space A7, until the navigation object N13 is selected in accordance with the method according to the invention (see FIG. 8A).

The navigation action for the object N13 consists in placing the mobile object 1 in proximity to the navigation object N14 of the 3D space A8 (see FIG. 8B).

The mobile object 1 is then moved in the space A8 until the navigation object N15 is selected in accordance with the invention (see FIG. 8C).

The navigation action, generated during step α.6), for the object N15 comprises the opening, in the navigation software package, of the network address of the destination site B, which is different from the network address of the three-dimensional space A8 in which the navigation object 1 is situated.

By default, the navigation action comprises, furthermore, the positioning of the mobile object 1 at an arrival position in the 3D space B3 of the site B having the destination network address (see FIG. 8D). Here, the arrival position is the initial position 6 in the space B3 (direction of the arrow F3 in FIGS. 8 and 8D).

As explained above, the method according to the invention can propose this arrival position 6 by default, but also, by virtue of the access table, another arrival position, here the position of the navigation object N16 in the 3D space B1 (see FIG. 8E; direction of the arrow F4 in FIGS. 8 and 8E).

Assuming that the user chooses the position N16, the navigation software package opens the network address of the site 13 and places the mobile object 1 in proximity to the navigation object N16 ("in proximity" so as to avoid being in a selection position of the navigation object N16 and avoid returning immediately to the position N15).

Next the user moves the mobile object until selection of the navigation object N17 (see FIG. 8F) which positions the mobile object in proximity to the navigation object N18 in the space B3 (see FIG. 8G).

Thereafter, the user moves the mobile object in the space B3 until the navigation object N19 is selected (see FIG. 8H) and positions the mobile object in proximity to the navigation object N20 in the space B2 (see FIG. 8I).

In the same manner, the mobile object passes from the navigation object N20 to N21 (see FIG. 8J), and then N22 (see FIG. 8K).

The user has thus visited the whole of the site B.

The return to the site A is done from the navigation object N16 to the navigation object N15 (see FIG. 8L; direction of the arrow F5 in FIGS. 8 and 8L), and the visit of the site A can continue via the navigation objects N23 (see FIG. 8M), N24 (see FIG. 8N), N25 (see FIGS. 8O) and N26 (see FIG. 8P), in a similar manner as explained before.

It will be noted that, in this example, navigation is always done in "walk forward" mode, that is to say that the return to the site A is not done by way of a history, but in a continuous manner, always by selecting the navigation objects.

However, the access table also allows, in combination with a navigation history table, effective return navigation, without having to select the navigation objects in order to retrace one's steps.

Navigation History

In the case of navigation from network address to network address, return navigation is done via the "page back" button of the navigation software package.

In order to allow an optimal return, in proximity to the position that the mobile object occupied before quitting the site, the invention proposes the creation of a specific history table. Indeed, the conventional history of the navigation software package is incapable of storing the spatial position of the mobile object in a three-dimensional network site. It stores only the network address of the previously visited site or sites.

Without the access table, the selection of the "page back" button of the navigation software package would systematically deposit the mobile object at the initial position in the 3D site according to the invention. Stated otherwise, the entire path traversed in the departure site would be lost during the return. If the 3D space is big, this would compel the user to command the movement of the mobile object again until proximity to the position where the mobile object was situated before quitting the site.

Two embodiments of a method according to the invention generating a table of histories are illustrated in FIGS. 9 and 10, for navigation between several 3D spaces having the same common network address, and in FIGS. 11 and 12 for navigation between several 3D spaces each having its own network address.

History of Navigation Within One and the Same Network Address

In the first embodiment of navigation within one and the same network address, provision must be made, while building the site, after step a3), for a step a4) of creating a "previous position" selectable button and a "next position" selectable button, and after step b3), a step b4) of assigning to each of these buttons the following properties:
  associated with a history table;
  selectable with a mouse click or a manual click for
    touch-sensitive interfaces; and
  displayed constantly on the site.

Stated otherwise, in this case, the buttons making it possible to go backwards or to go forwards must be introduced into the site. Indeed, navigation being done within the same network address, the use of the "Page forward" and "page back" buttons of the navigation software package would simply cause the 3D site to be exited, since the history of the navigation software package stores only network addresses.

The buttons introduced on the site and displayed constantly, whatever the position of the mobile object and/or whatever the 3D space of the site, make it possible, in association with a history table according to the invention and the access table according to the invention, to return to a previous spatial position, without having to recommence the movements of the mobile object.

In the case of navigation within one and the same network address, the or each navigation object has as functional property the ability to send the mobile and controllable object to an arrival position in a three-dimensional space of the same network site in which the navigation object is situated.

In order to manage the navigation history, the method according to the invention provides that step α.1) comprises, furthermore, the creation and the storage in memory of a first history table P1 of "last in-first out" type, as well as the association of the first history table with the "previous position" and "next position" selectable buttons of the network site; and step α.6) comprises the insertion, as first entry P11 in the first history table, of the identifier P11a of the three-dimensional space in which the mobile object is situated, and of the position P11b of the navigation object selected in the three-dimensional space.

A history table is an alphanumeric table comprising entries ordered according to their order of introduction into the table. Each entry represents an item of history information, such as the address of a visited network site.

A table is termed "last in-first out" ("LIFO") when it is read commencing with the last entry (that is to say the most recent entry in the order of introduction).

The exemplary embodiment of FIG. 9 illustrates forward navigation inside the site of FIG. 1, assuming that each 3D space of this site possesses the same common network address URL1. A first history table P1 has been created when opening the site A.

The forward navigation is globally illustrated in FIG. 9, and step-by-step illustrated in FIGS. 9A to 9F.

Figure 9A:
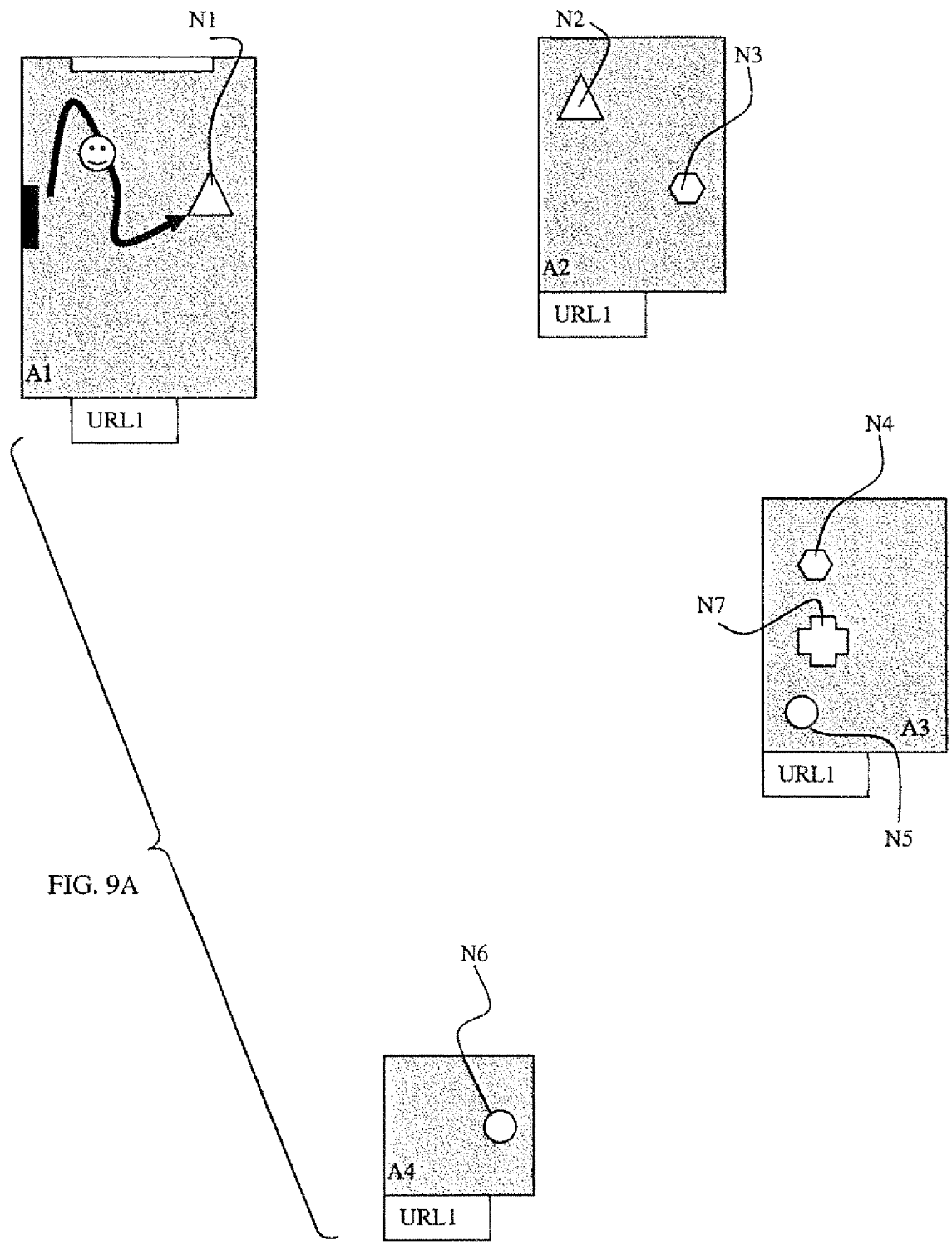
Figure 9B:
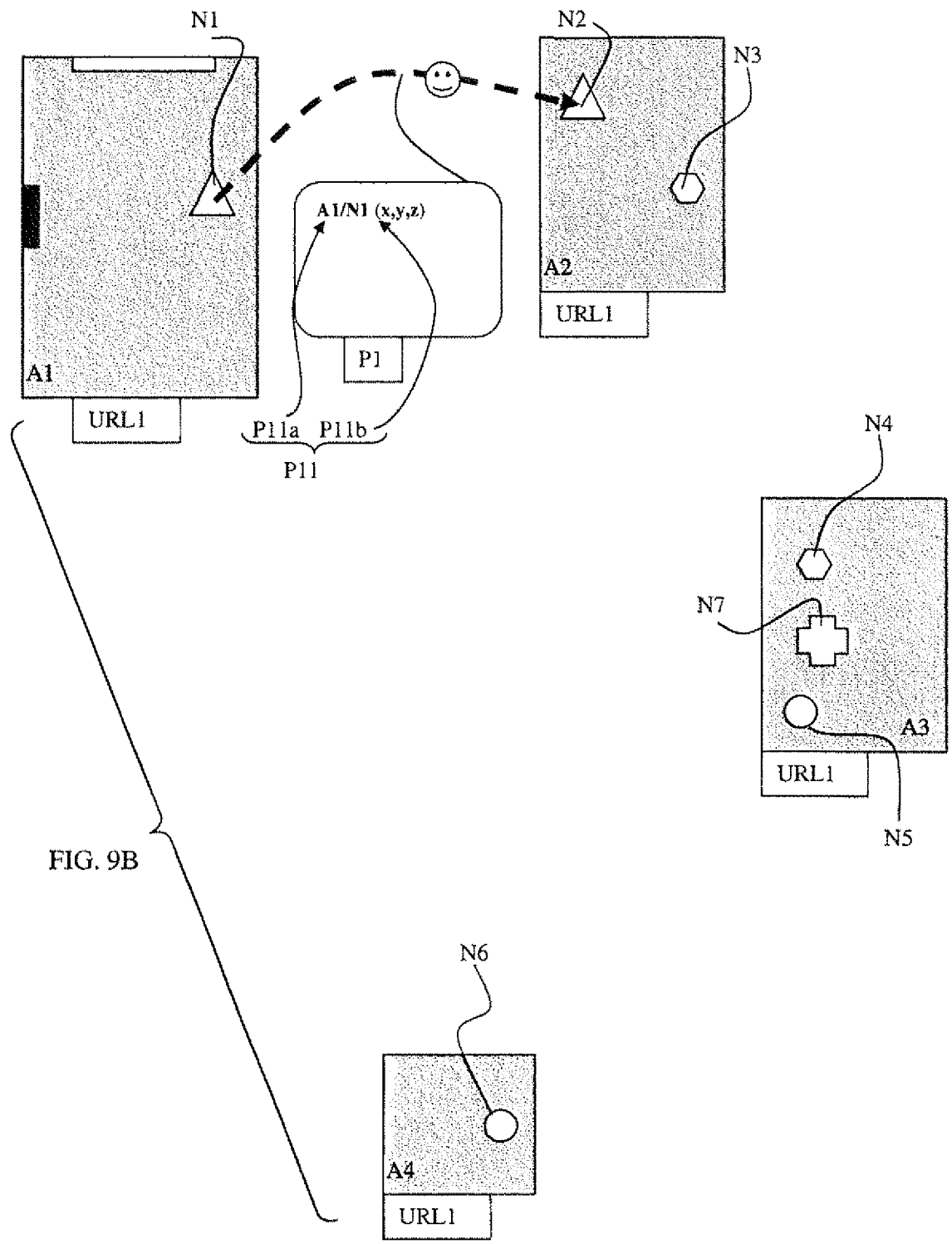
Figure 9C:
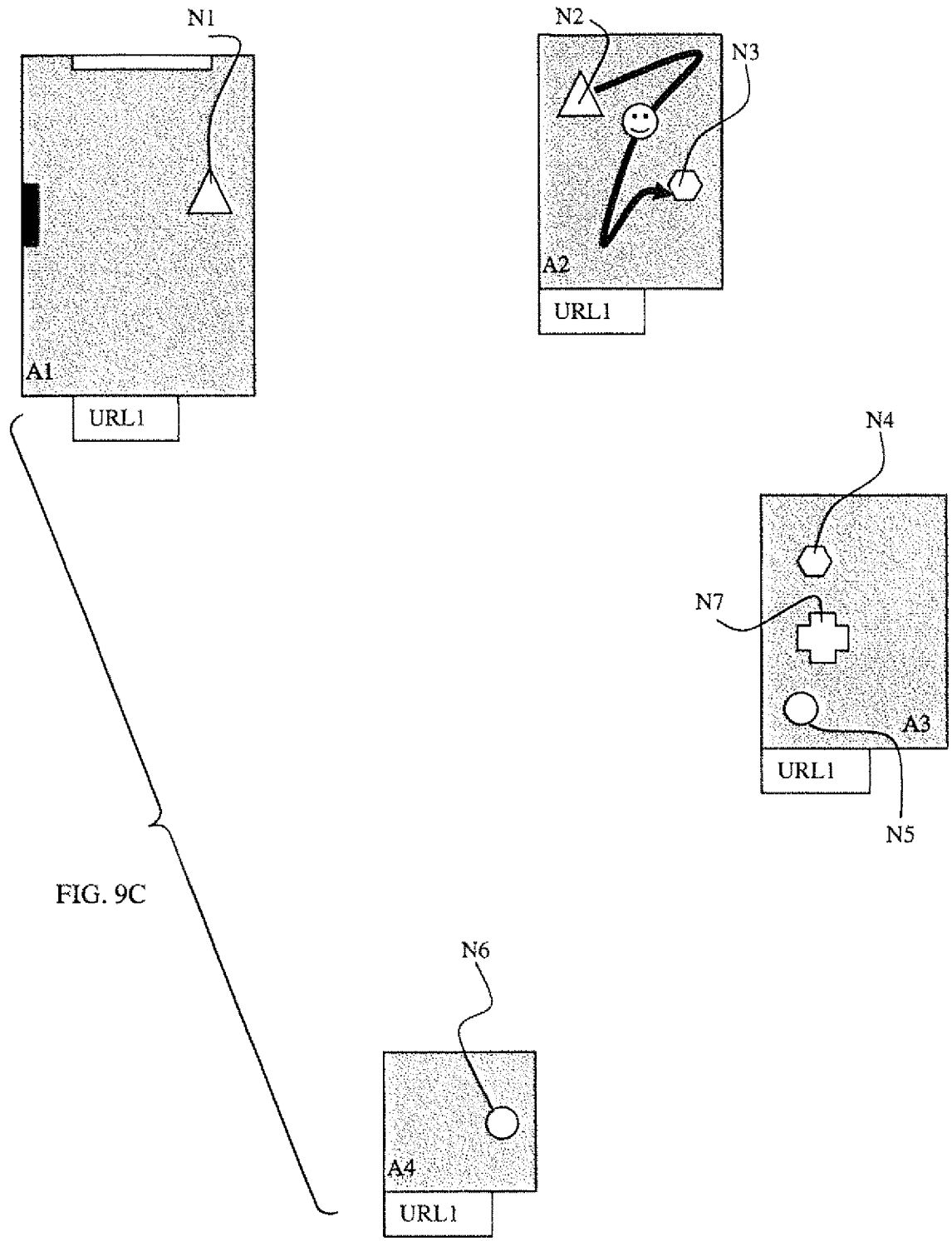

In this example, the mobile object 1 is moved by the user in the space A1, until the navigation object N1 is selected in accordance with the method according to the invention (see FIG. 9A).

The navigation action for the object N1 consists in placing the mobile object 1 in proximity to the navigation object N2 of the 3D space A2. In parallel, the history table P1 is supplemented with a first entry P11 comprising an item of information in respect of location of the mobile object 1 before its positioning in proximity to the object N2 (see FIG. 9B). This item of positioning information comprises the identifier P11a of the three-dimensional space in which the mobile object was situated (here the space A1), and of the spatial position P11b (in coordinates x, y and z) of the navigation object N1 selected in this space A1.

Figure 9D:
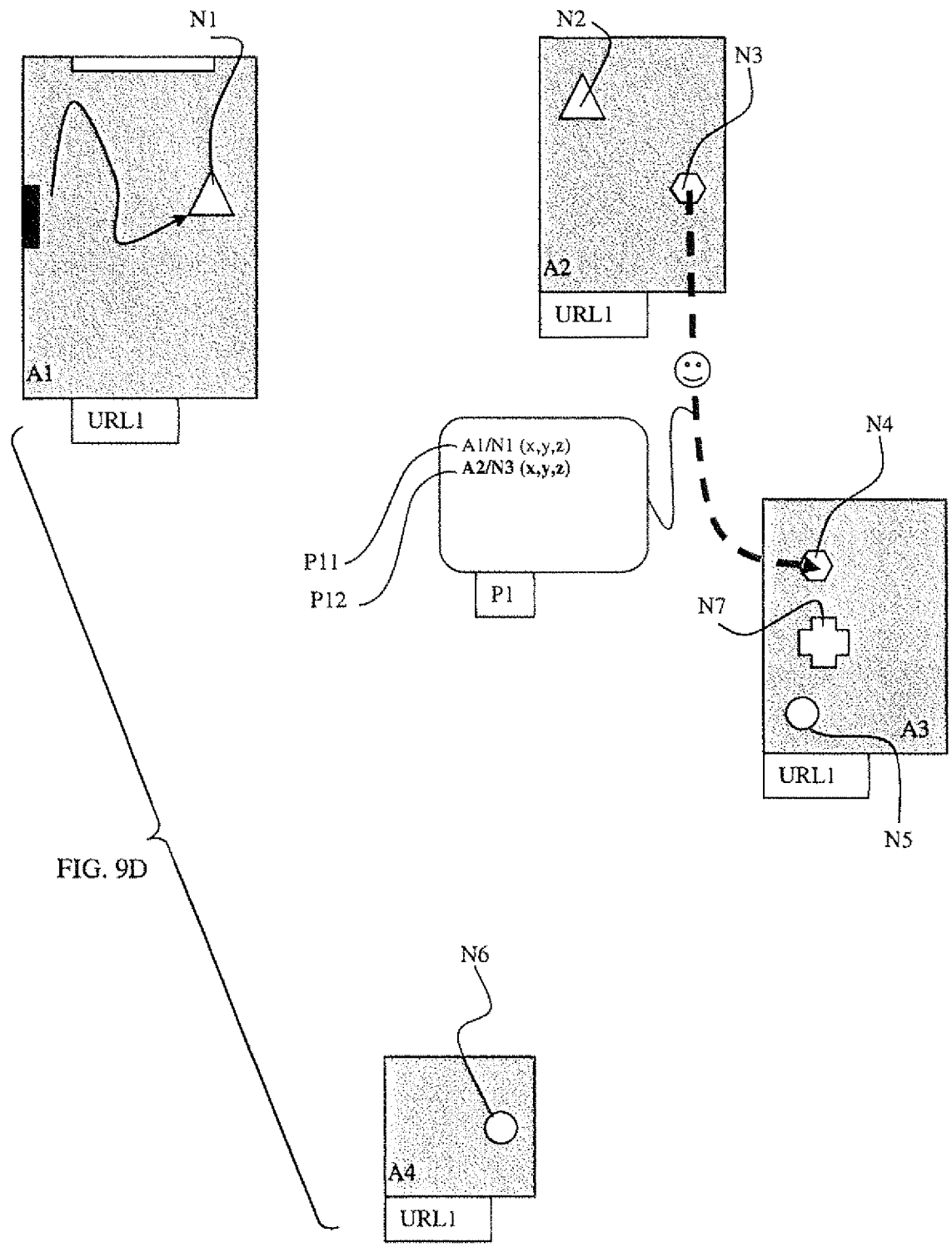
Figure 9E:
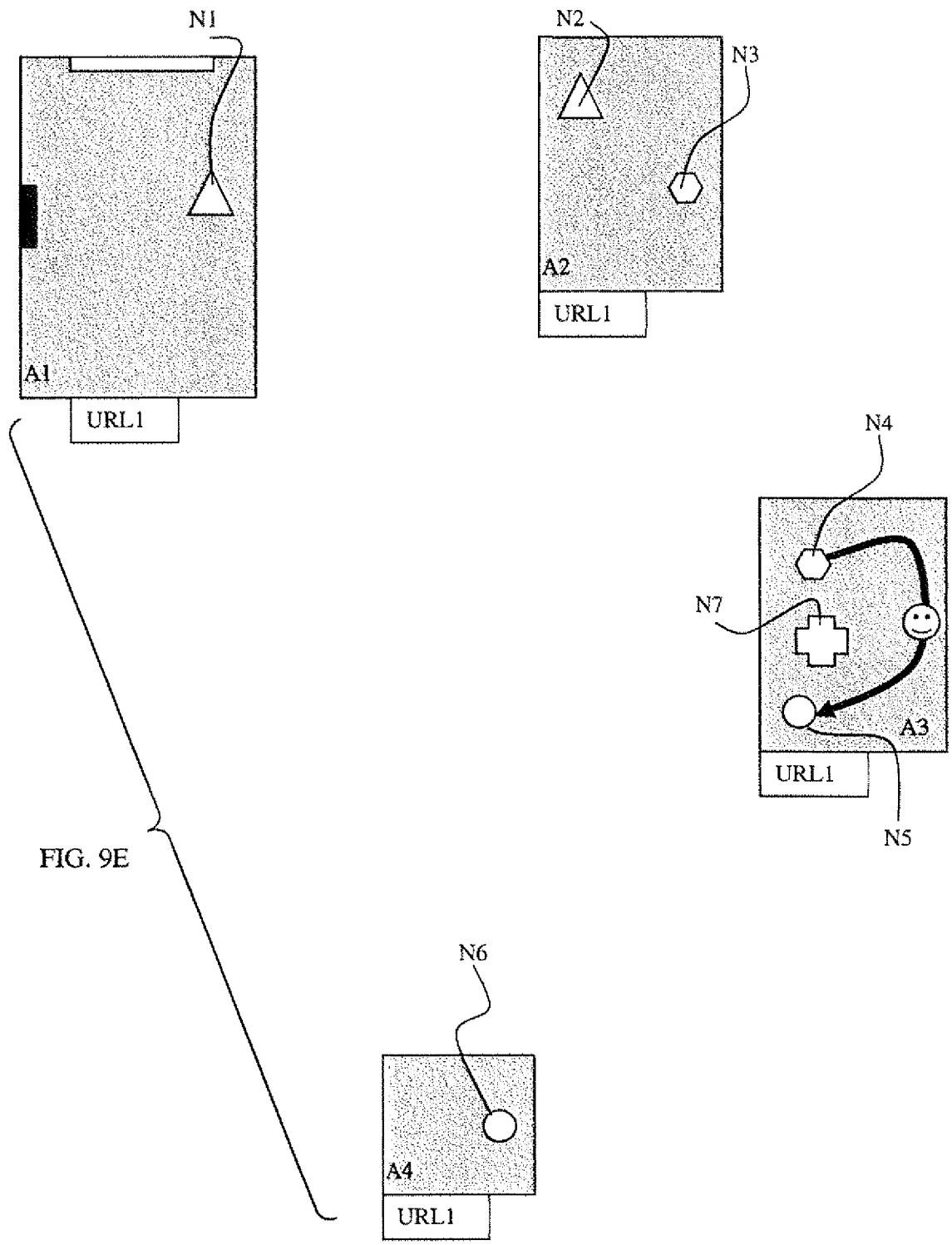

Next the user moves the mobile object in the space A2 until selection of the navigation object N3 (see FIG. 9C) which positions the mobile object in proximity to the navigation object N4 in the space A3 (see FIG. 9D). In parallel, the history table P1 is supplemented with a second entry P12 comprising an item of information in respect of location of the mobile object 1 before its positioning in proximity to the object N4. This item of positioning information comprises the identifier P12a of the three-dimensional space in which the mobile object was situated (here the space A2), and of the spatial position P12b (in coordinates x, y and z) of the navigation object N3 selected in this space A2.

Figure 9F:
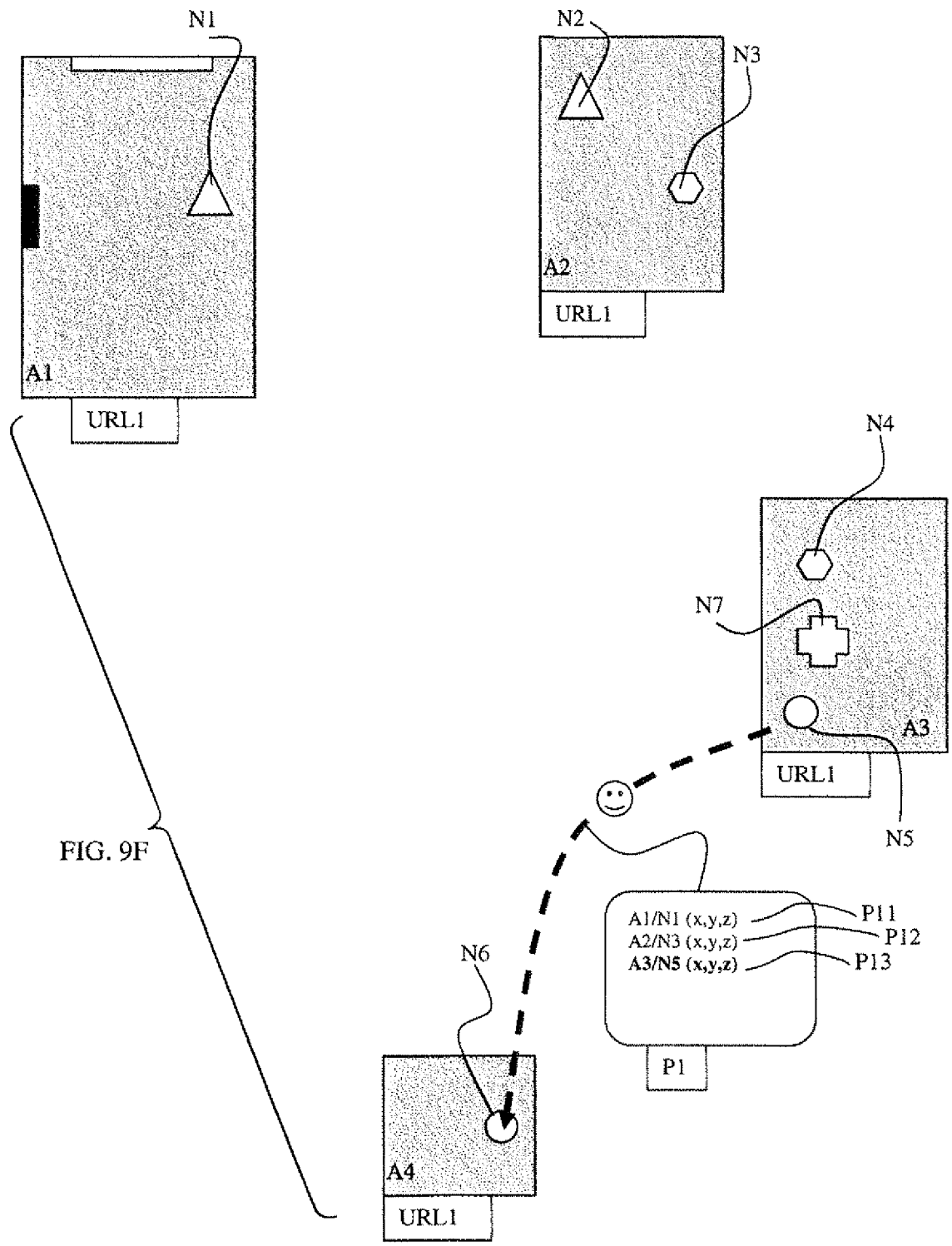

Next the user moves the mobile object in the space A3 until selection of the navigation object N5 (see FIG. 9E) which positions the mobile object in proximity to the navigation object N6 in the space A4 (see FIG. 9F). In parallel, the history table P1 is supplemented with a second entry P13 comprising an item of information in respect of location of the mobile object 1 before its positioning in proximity to the object N6. This item of positioning information comprises the identifier P13a of the three-dimensional space in which the mobile object was situated (here the space A3), and of the spatial position P13b (in coordinates x, y and z) of the navigation object N5 selected in this space A3.

The exemplary embodiment of FIG. 10 illustrates backward navigation after forward navigation as illustrated in FIGS. 9A to 9F.

The backward process example is globally illustrated in FIG. 10, and step-by-step illustrated in FIGS. 10A to 10E.

To go backwards, without having to select the navigation objects, the user can click on the "previous position" button of the network site. This button being associated with the LIFO table P1, the navigation software package will read the last entry of the stack: the entry P13. It will then place the mobile object 1 in the space A3, in proximity to the position (x, y, z) of the object N5 (see FIG. 10A).

The user could thus return to the departure 3D space A1, without having to command the movement of the mobile object, but simply by reversing his previous actions.

Figure 10A:
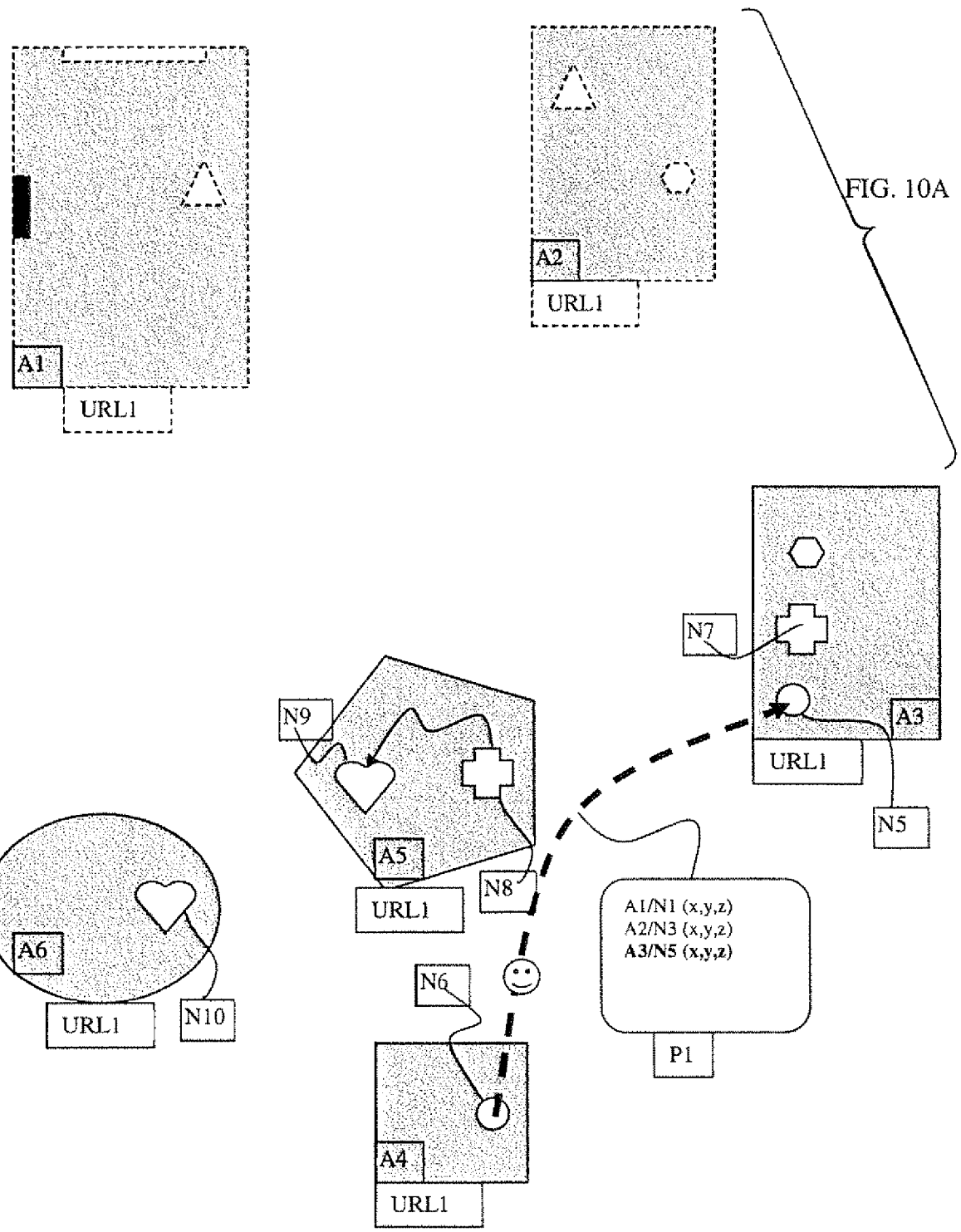

The schematic view of FIG. 10A shows that, in this example, the user has gone just one step back, at the level of the object N5 of the space A3.

There, he decides to visit the space A5, by selecting, in accordance with the invention, the navigation object N7 (see FIG. 10B), this navigation object N7 having a position not stored in the first history table P1.

Figure 10C:
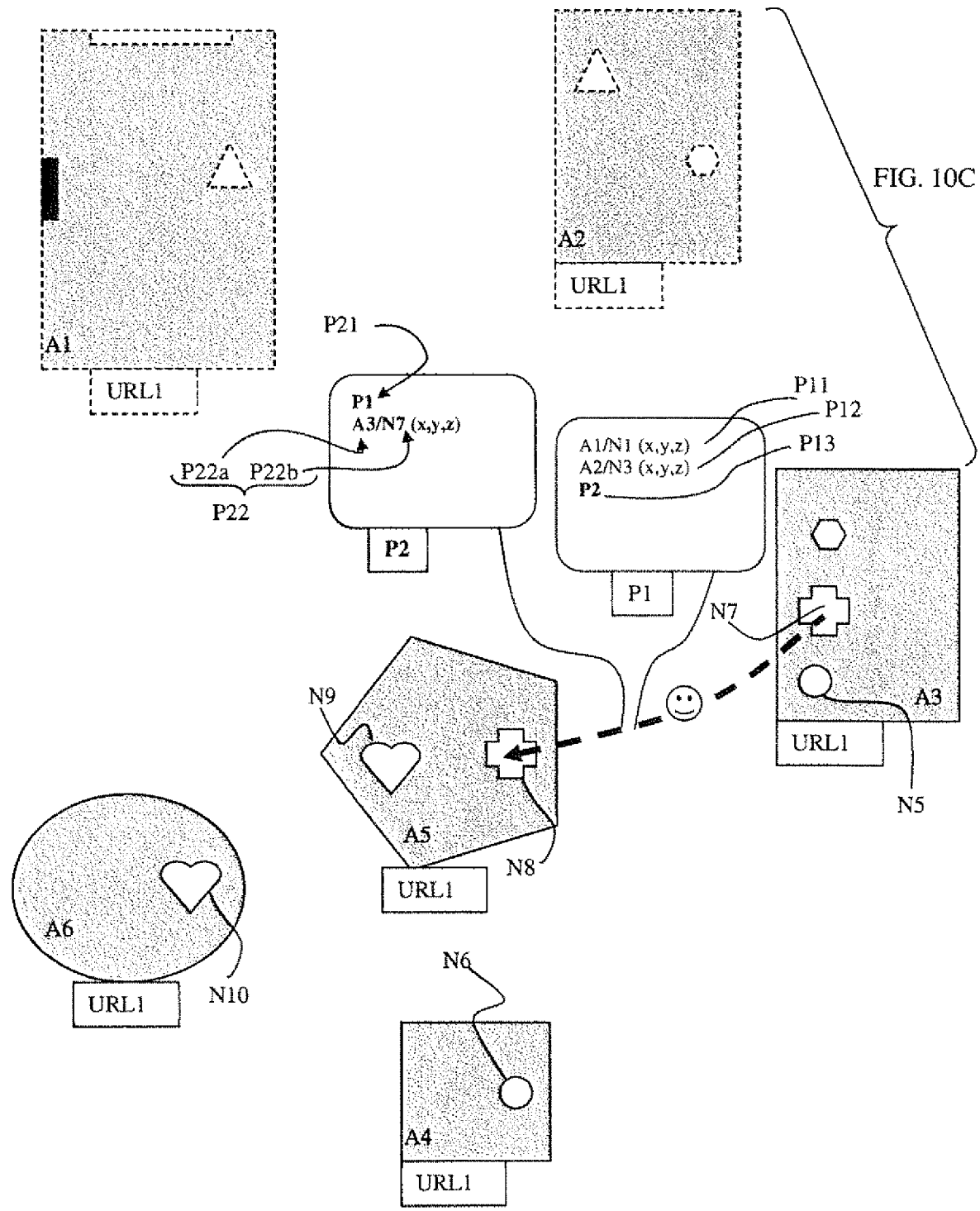

The navigation action associated with this object N7 places the mobile object 1 in proximity to the object N8 in the space A5 (see FIG. 10C).

In this case, the method comprises an additional step γ.1) of creating and storing in memory a second history table P2, of "last in-first out" type, as well as the association of the second history table with the "Page forward" and "page back" selectable buttons of the network site.

In parallel with the placement of the mobile object 1 in proximity to the navigation object N8, in the space A5, the method according to the invention makes provision to insert:

as first entry P21 in the second history table P2, a reference to the first history table P1;

as second entry P22 in the second history table P2, the identifier P22a of the departure three-dimensional space (here the space A3) and the spatial position P22b (in coordinates x, y and z) of the navigation object N7 selected in the three-dimensional departure space A3;

as last entry P13 in the first history table P1, a reference to the second history table P2. Next the user decides to visit the space A6 by selecting, in accordance with the invention, the navigation object N9 (see FIG. 10D).

The navigation action associated with this object N9 places the mobile object 1 in proximity to the object N10 in the space A6 (see FIG. 10E).

In parallel, the second history table P2 is supplemented with a third entry P23 comprising an item of information in respect of location of the mobile object 1 before its positioning in proximity to the object N10. This item of positioning information comprises the identifier P23a of the three-dimensional space in which the mobile object was situated (here the space A5), and of the spatial position P23*b* (in coordinates x, y and z) of the navigation object N9 selected in this space A5.

And so on and so forth.

History of Navigation Between Several Network Addresses

FIGS. 11 and 12 illustrate the same example path of the user, via the mobile object 1, among the spaces A1 to A6 of the site of FIG. 1, assuming that each of these spaces possesses its own network address, respectively URL1 to URL6. Therefore, FIG. 11 (several network addresses) is analogous to FIG. 9 (several spaces with the same network address), and FIG. 12 (several network addresses) is analogous to FIG. 10 (several spaces with the same network address).

The generation of the first and second history tables P3 and P4 is similar to what was described for a site having 3D spaces of common network address (FIGS. 9, 9A-9F and 10, 10A-10E), except for the difference that the history tables P3 and P4 are associated with the "Page forward" and "page back" selectable buttons of the navigation software package itself, whilst the history tables P1 and P2 are associated with buttons displayed on the site itself.

Moreover, the entries in the history tables P3 and P4 comprise tems of information in respect of location of the mobile object in the previous network address, namely: the network address of the departure three-dimensional space and the position of the navigation object selected in the departure three-dimensional space.

For example, in FIG. 12, when the user has arrived at the address URL4, the table P3 comprises three entries P31, P32 and P33 relating, chronologically, to the items of information in respect of location of the mobile object 1 in the sites URL1, URL2 and URL3.

An entry (for example the entry P31) comprises the network address P31*a* of the departure three-dimensional space and the position P31*b* of the navigation object selected in the departure three-dimensional space.

Likewise, still in this FIG. 12, when the user has arrived at the address URL6, the table P4 comprises two entries P41 and P42 relating, chronologically, to the items of information in respect of location of the mobile object 1 in the sites URL3 and URL5.

Generalization

More generally, the navigation may relate to more 3D spaces and/or more network addresses than is illustrated in the examples.

FIGS. 13 and 14 illustrate the generalization of the method according to the invention to create and supplement the history tables.

These figures illustrate navigation between sites having different network addresses (URL 1, 2, 3, . . . , n-2, n-1, n), or between different 3D spaces (space 1, 2, 3, . . . , n-2, n-1, n) having one and the same common address.

The general principle remains the same.

Thus, the method of navigation according to the invention provides that, for navigation while advancing from navigation objects to navigation objects, step α) is repeated n-2 times (in the figure "Rep n-2"), n being an integer greater than or equal to 3, so as to end up at an arrival position of rank n. Indeed, the first iteration α1 of step α) makes it possible to pass from the URL address 1 to the URL address 2 (or from the space 1 to the space 2) (see FIGS. 13A and 13B). The first repetition Rep 1 of step α) leads to iteration α2 of step α) which makes it possible to pass from the URL address 2 to the URL address 3 (or from the space 2 to the space 3) (see FIG. 13C), and so on and SD forth (see FIGS. 13D to 13F). Therefore, n-2 repetitions of step α) are required in order to end up at the URL n or at the space n.

The first history table P3 is, of course, created only at the first iteration and supplemented during the other iterations, each iteration of step α) corresponding to an opening of a new network address. Each network address and, preferably, a position of each navigation object being stored chronologically in the first history table during navigation.

Alternatively, the first history table P1 is also created only at the first iteration and supplemented during the other iterations, each iteration of step α) corresponding to the positioning of the mobile and controllable object at a new arrival position in a three-dimensional space having the same network address as the network site in which the navigation object is situated. The identifier of the three-dimensional space and the position of the selected navigation object are stored chronologically at each iteration in the first history table during navigation.

By virtue of the history table, the method according to the invention can comprise, furthermore, a step β) of backtracking consisting in reading the network address (or the identifier of the three-dimensional space and the position of the navigation object) of rank n-1 in the first history table, and in opening this network address of rank n-1 in the navigation software package (or in positioning the mobile object in proximity to the position of the selected navigation object of rank n-1) (see FIG. 13G). In the case of navigation between various network addresses, step β) can also comprise the positioning of the mobile object in proximity to the position of the navigation object selected in the three-dimensional space having the network address of rank n-1.

This step β) can be repeated k times, k being an integer lying between 1 and n-2 (k is the amount of repetition of step β; k is illustrated in line "Rep β) in FIGS. 13A to 14. If k equals n-2, the user is on the direct return to the first departure address URL 1 (or to the departure space 1) (see FIGS. 13H to 13K).

If k lies between 1 and n-3, the user may yet make a bifurcation in his navigation, which is shown in FIG. 14. In the example illustrated in this figure, the user starts from the same position as illustrated in FIG. 13J. But instead, direct to the first departure address URL 1 as shown in FIG. 13K, the user decides to visit another website A, as shown in FIG. 14, thus making a bifurcation on its history (bifurcation means that the user does not return by all its previous steps).

The method provides that the user can choose to set off again in a new direction, that is to say to select a navigation object not yet stored in the history table.

After the iteration of rank k of step β) (here Rep β=n-3), the method comprises at least one step γ) of navigating towards a network site having a network address not stored (or a navigation object having a position not stored) in the first history table P3 (or P1), step γ) comprising the following sub-steps:

γ.1) creating and storing in memory a second history table P4 (or P2) of "last in-first out" type, as well as associating the second history table with the "Page forward" and "page back" selectable buttons of the navigation software package (or of the network site);

γ.2) controlling the movement of the mobile and controllable object in the or one of the three-dimensional spaces of the network site having the network address not stored in the first history table (or in one of the three-dimensional spaces of a network site according to the invention);

γ.3) selecting a navigation object, preferably by positioning the mobile and controllable object in a secant manner with respect to the navigation object, which means in a manner where the mobile and controllable object overlaps the navigation object, especially the detection zone of the navigation object;

γ.6) generating a navigation action as a function of the navigation properties assigned to the navigation object, and inserting:

as first entry in the second history table P4 (or P2), a reference to the first history table P3 (or P1);

as second entry in the second history table P4 (or P2), the identifier of the departure three-dimensional space and the position of the navigation object selected in the departure three-dimensional space;

as last entry in the first history table P3 (or P1), a reference to the second history table P4 (or P2).

In FIG. 14, which illustrates the return to the previous network addresses (or 3D space) by virtue of the history table, k is equal to n-3. Stated otherwise, the user has returned to the URL address 2 (or to the space 2). At this address (or in this space), he selects a navigation object having a position not stored in the first history table P3 (or P1), this object allowing him to pass to the site "A", itself making it possible to pass to the site "B".

The explanation has been given for the creation of two history tables, corresponding to a single bifurcation in the navigation (bifurcation at rank k).

It is understood that at each bifurcation, an additional history table is created, that a reference to the previous history table is inserted thereinto, and that a reference to the new history table is inserted into the previous history table.

Securing of Access

The invention exploits the spatialization (three-dimensional rather than two-dimensional space) of the site to ensure that the site is made secure, both in terms of referencing by search engines, and also in terms of private access (usually managed by identifier and password) and of dynamic management of the site.

Thus, a site according to the invention, built according to the method according to the invention, makes it possible to secure the management of the site and its access in a very innovative mariner, by virtue of the three-dimensional spaces and of the navigation objects which are situated therein, in particular by virtue of the "physical" interactions between these objects and the mobile object (when the latter encounters the navigation objects, in accordance with the method according to the invention) and by virtue of the access table associated with the site according to the invention.

If the access table is written in a format interpretable by a navigation software package, then a search engine can also read it and interpret it. It can then reference the site, not only by keywords (as for conventional 2D sites), but also by its objects, in particular its navigation objects.

Access to the site is then totally unrestricted.

By virtue of the access table, it is possible to render this referencing selective, or indeed to prohibit the referencing of the site.

To this end, the method of building the site provides after step C1), a step C2) of encrypting the access table, this encryption possibly being partial (selective referencing) or total (absence of referencing).

Alternatively, or in combination, the method according to the invention provides, advantageously, that the access table comprises, furthermore, rights-of-access data. These rights-of-access data are, for example, data managing the possibility/impossibility of accessing the site, or managing the display/the concealment of one or more navigation objects, or managing the activation/the inactivation of one or more navigation objects.

Thus, as a function of the rights of access, it is possible to see, or not, certain objects, navigation objects in particular.

It is therefore possible either to dispense with access of identifier/password type, or to strengthen the security of this type of access.

For example, in the case of a site having a private part, one of the navigation objects can serve to access this part in which the user will have to enter his identifier and his password. By virtue of the invention, it is possible to display or to not display this navigation object as a function of the user's rights of access.

Private access in a network site known from the prior art takes the form of a selectable link on a public page of the site, for example "Client Access". The interested user clicks on this link and a page requesting an access key opens. Generally, this access key consists of an identifier (also known as a login) and a password.

During a so-called "brute force" attack of such a site, the hacker is perfectly aware of where to click in the public page of the site so as to arrive at the access page at the secure part, since the link is perfectly visible. The hacker can then launch a program which will try all the possible passwords.

In a site according to the invention, an unauthorized person does not even see the link to the private part, since this link (a navigation object) is displayed only for an authorized person.

To conjure an image, everything happens as if the door of the safe of a bank were to appear only for those authorized to access it, and to disappear for everyone else, so that raiders would not even know where to break in Thus, the method allows double security: conventional security by identifier and password, and upstream security, by display or concealment of the link to the private part.

Security can be further strengthened if the access rights are also encrypted.

Alternatively, or in combination, security of access can be further improved by providing, while building the site, after step C1), a step C3) of dividing the access table into several files, and of peer-to-peer sharing of the said files between several computer servers.

Thus, only users having a suitable peer-to-peer file management software package will be able to "reconstruct" the access table to enter the site.

Advantageously, step C3) is performed on a previously encrypted access table, so that not only a suitable peer-to-peer file management software package, but also the encryption key to access the site, will be required.

The flowcharts of FIGS. 15 to 18 summarize the various possibilities for securing an Internet site according to the present invention.

In FIG. 15, the site has unrestricted access and does not comprise any particular security other than what may exist in 2D sites (for example access by identifier and password).

It is only made by steps A, B, Cl, D and E as previously described.

FIG. 16 provides for encryption of the access table, whilst FIG. 17 provides only for division of the access table into several files, and peer-to-peer sharing of the said files between several computer servers. In other words, the website of FIG. 16 is made by steps A, B, C1, C2, D and E as previously described, where the website of FIG. 17 is made by steps A, B, C1, C3, D and E as previously described.

FIG. 18 provides for the combination of the encryption and of the division of the access table. In other words, the website of FIG. 18 is made by steps A, B, C1, C2, C3, D and E as previously described.

Other possibilities exist for exploiting the spatialization of the site. For example, provision may be made for the zone of detection of the navigation object making it possible to access the private part to be mobile with respect to the information display of the object. It is then possible to assign properties to this detection zone and to the mobile object which make an encounter therebetween impossible. For example, it is possible to define a North-South polarity in the site, and to assign different polarities to the mobile object (representing the user) and to the detection zone so that they attract one another, if the user is authorized to access the private part, and to assign them identical polarities if the user is not authorized. In the latter case, the detection zone will systematically "flee" from the mobile object without the latter being able to overlap the detection zone, so that the navigation object will not be able to be selected.

It is by virtue of the spatialization of a network site according to the invention that strategies for secure access can be put in place, strategies that are impossible with a 2D site. Furthermore, it is by virtue of the interactions provided for by the method according to the invention between the mobile object and the navigation objects that these strategies are effective. Were it sufficient to click on the navigation objects in order to select them, these strategies would be ineffective. Indeed, the invention exploits the physical properties allotted to the objects while building the site to use them as a security tool. Finally, the access table according to the invention plays an essential role in such securing of the site.

The invention claimed is:

1. A method of navigation from or within the network address of a three-dimensional space of a three-dimensional network site comprising:
   a network address (URL1-URL6),
   at least one three-dimensional space (A1-A6: B1-B3);
   at least one object (1) that is mobile and controllable in the space (A1-A6: B1 -B3);
   at least one navigation object (N1-N26) placed at a position (P11*b*) of the navigation object, the navigation object being programmed to detect whether the mobile object (1) overlaps a detection zone (N112), and to generate a navigation action as a function of the navigation properties assigned to the navigation object (N11) when the mobile object (1) overlaps the detection zone (N112);
   the three-dimensional network site being associated with an access table comprising at least the following items of information:
   the descriptor of the access table so as to be able to be interpreted by the navigation software package, comprising the number of rows, the number of columns and the field separator(s) used;
   an identifier (P11*a*) of the or of each three-dimensional space in the site;
   an identifier of the or of each navigation object;
   the position (P11*b*) of each navigation object: the navigation properties of each navigation object; and
   an initial position (4, 6) of the mobile object when a user accesses the site, the method being performed with aid of a hardware interface, and comprising, for a forward navigation:
   a) in a navigation software package suitable for the hardware interface:
   a.1) opening the network address (URL1-URL6);
   a.2) controlling the movement of the mobile object (1) in the or one of the three-dimensional spaces (A1-A6; B1-B3) from the initial position (4, 6);
   a.3) selecting the navigation object (N1-N26) by positioning the mobile object (1) in an overlapping manner with respect to the navigation object (N1-N26);
   a.4) starting a timeout of predefined duration, as soon as the mobile object (1) and the navigation object (N1-N26) or the detection zone (N112) overlap,
   a.6) generating a navigation action as a function of the navigation properties assigned to the navigation object (N1-N26), only if the mobile object (1) and the navigation object (N1-N26) or the detection zone (N112) remain overlapped throughout the duration of the timeout;
   wherein: step a.1) further comprises creation and storage in memory of a first history table (P1) of a last in-first out type, as well as an association of the first history table with:
   previous position and next position selectable buttons of the network site for navigation between several 3D spaces having the same common network address: or
   with page forward and page back selectable buttons of the navigation software package for navigation between several 3D spaces each having its own network address; and
   step (a.6)comprises an insertion, as first entry (P11, P1*a*) in the first history table (P1), of an item of history information in respect of location of the mobile object in the previous spatial position;
   wherein step a) is repeated n-2 times, n being an integer greater than or equal to 3, the first history table being created only at the first iteration and supplemented during the other iterations, each iteration of step a) corresponding to anew item of history information in respect of location of the mobile object in the previous spatial position being stored chronologically at each iteration in the first history table during navigation:
   the method further comprising, for a backward navigation:
   a step B) of backtracking consisting in reading the item of history information in respect of location of the mobile object in the previous spatial position of rank n-1 in the first history table, and in positioning the mobile object at its location in the spatial position of rank n-1, step B) being repeated k times, k being an integer lying between 1 and n-2, and
   the method further comprising, for a bifurcation in navigation towards a new direction not yet stored in the first history table:
   if k lies between 1 and n-3, after the iteration of rank k of step B), at least one step v) of navigating the mobile object in a new direction by selecting a navigation object not vet stored in the first history table, step v) comprising the following sub-steps:
   v.1) creation and storage in memory of a second history table of "last in-first out" type, as well as an association of the second history table with a "page forward" and a "page back" selectable buttons of the network site or of the navigation software package;

29 v.2) controlling the movement of the mobile object in the or one of the three-dimensional spaces of the network site;
v.3) selecting the navigation object not yet stored in the first history table by positioning the mobile object in an overlapping manner with respect to the navigation object;
v.6) generating a navigation action as a function of the navigation properties assigned to the navigation object, and inserting:
as first entry in the second history table, a reference to the first history table;
as second entry in the second history table, an item of history information in respect of location of the mobile object in the previous spatial position as last entry in the first history table, a reference to the second history table;
the method further comprising repeating steps y) for each new bifurcation, step y1) comprising the creation of an additional history table wherein a reference to the previous history table is inserted thereinto, and wherein a reference to the new history table is inserted into the previous history table.

2. The method of navigation according to claim 1 from or within the network address of the three-dimensional network site, wherein step a3) comprises selecting the navigation object (N1-N26) by positioning the mobile object (1) in an overlapping manner with respect to the zone of detection (N112) of the navigation object (N11).

3. The method of navigation according to claim 1, wherein step a) comprises furthermore, before step a.6), a step a.5) of predefined repositioning of the mobile object with respect to the navigation object, as soon as the mobile object and the navigation object or the detection zone of the navigation object overlap, the repositioning keeping the mobile object and the navigation object or the detection zone overlapping.

4. The method of navigation according to claim 1, wherein step a.4) of timeout further comprises, during the timeout, consultation by the navigation software package of the access table of the network site or the access table of the destination network site.

5. The method of navigation according to claim 4, wherein step a.4) comprises, furthermore, during the timeout, and after the reception of the access table, the displaying of an arrival position by default and of the position of the object or of each of the navigation objects of the network site or the destination network site, so that the user can choose the position at which he wishes to arrive.

6. A method of navigation from or within the network address of a three-dimensional space of a three-dimensional network site comprising:
a network address (URL1-URL6);
at least one three-dimensional space (A1-A6; B1-B3);
at least one object (1) that is mobile and controllable in the space (A1-A6: B1-B3);
at least one navigation object (N1-N26) placed at a position (P11b) of the navigation object, the navigation object being programmed to detect whether the mobile object (1) overlaps a detection zone (N112), and to generate a navigation action as a function of the navigation properties assigned to the navigation object (N11) when the mobile object (1) overlaps the detection zone (N112);
the three-dimensional network site being associated with an access table comprising at least the following items of information:

30 the descriptor of the access table so as to be able to be interpreted by the navigation software package, comprising the number of rows, the number of columns and the field separator(s) used;
an identifier (P11a) of the or of each three-dimensional space in the site;
an identifier of the or of each navigation object;
the position (P11b) of each navigation object;
the navigation properties of each navigation object; and
an initial position (4, 6) of the mobile object when the user a user accesses the site, the method being performed with aid of a hardware interface, and comprising for a forward navigation:
a) in a navigation software package suitable for the hardware interface:
a.1) opening the network address (URL1-URL6);
a.2) controlling the movement of the mobile object (1) in the or one of the three-dimensional spaces (A1-A6; B1-B3) from the initial position (4, 6);
a.3) selecting the navigation object (N1-N26) by positioning the mobile object(1) in an overlapping manner with respect to the navigation object (N1-N26);
a.4) starting a timeout of predefined duration, as soon as the mobile object (1) and the navigation object (N1-N26) or the detection zone (N112) overlap,
a.6) generating a navigation action as a function of the navigation properties assigned to the navigation object (N1-N26), only if the mobile object (1) and the navigation object (N1-N26) or the detection zone (N112) remain overlapped throughout the duration of the timeout;
wherein step a.1) further comprises creation and storage in memory of a first history table (P1) of a last in-first out type, as well as an association of the first history table with page forward and page back selectable buttons of the navigation software package; and
step a.6) comprises the insertion, as first entry (P11a) in the first history table (P1), of the network address (URL1-URL6) of the departure three-dimensional space and the position (P11b) of the navigation object selected in the departure three-dimensional space;
wherein step a) is repeated n-2 times, n being an integer greater than or equal to 3, so as to end up at a network address of rank n, the first history table being created only at the first iteration and supplemented during the other iterations, each iteration of step a) corresponding to an opening of a new network address, each network address and, if appropriate, a position of each navigation object being stored chronologically in the first history table during navigation;
the method further comprising, for a backward navigation:
a step B) of backtracking consisting in reading the network address of rank n-1 in the first history table, and in opening this network address of rank n-t in the navigation software package, step B) being repeated k times, k being an integer lying between 1 and n-2;
wherein k lies between 1 and n-3, the network address of rank k corresponding to a network site according to the invention, the method comprising, furthermore, after the iteration of rank k of step B),at least one step y) of navigating towards a network site having a network address not stored in the first history table, step v) comprising the following sub-steps:
v.1) creation and storage in memory of a second history table of a "last in-first out" type, as well as an association of the second history table with a "page forward" and a "page back" selectable buttons of the navigation software package;

v.2) controlling the movement of the mobile object in the or one of the three-dimensional spaces of the network site having the network address not stored in the first history table;

v.3) selecting a navigation object by positioning the mobile object in an overlapping manner with respect to the navigation object;

v.6) generating a navigation action as a function of the navigation properties assigned to the navigation object, and inserting: as first entry in the second history table, a reference to the first history table;

as second entry in the second history table, the network address of the departure three-dimensional space and the position of the navigation object selected in the departure three-dimensional space;

as last entry in the first history table, a reference to the second history table.

7. The method of navigation according to claim 1, wherein the item of history information in respect of location of the mobile object in the previous spatial position comprises:

the identifier (P11a) of the three-dimensional space in which the mobile object is situated, and of the position (P11b) of the navigation object selected in the three-dimensional space, in case of navigation between several 3D spaces having the same common network address;

or:

the network address (URL1-URL6) of the departure three-dimensional space and the position (P11b) of the navigation object selected in the departure three-dimensional space, in case of navigation between several 3D spaces each having its own network address.

8. The method of navigation according to claim 6, wherein step β) also comprises the positioning of the mobile object in proximity to the position of the navigation object selected in the three-dimensional space having the network address of rank n-1.

9. The method of navigation according to claim 6 from or within the network address of the three-dimensional network site, wherein step a3) comprises selecting the navigation object (N1-N26) by positioning the mobile object (1) in an overlapping manner with respect to the zone of detection (N112) of the navigation object (N11).

10. The method of navigation according to claim 6, wherein step a) comprises furthermore, before step a.6), a step a3) of predefined repositioning of the mobile object with respect to the navigation object, as soon as the mobile object and the navigation object or the detection zone of the navigation object overlap, the repositioning keeping the mobile object and the navigation object or the detection zone overlapping.

11. The method of navigation according to claim 6, wherein step a.4) of timeout further comprises, during the timeout, consultation by the navigation software package of the access table of the network site or the access table of the destination network site.

12. The method of navigation according to claim 11, wherein step o.4) comprises, furthermore, during the timeout, and after the reception of the access table, the displaying of an arrival position by default and of the position of the object or of each of the navigation objects of the network site or the destination network site, so that the user can choose the position at which the user wishes to arrive.

13. The method of navigation according to claim 6, wherein the item of history information in respect of location of the mobile object in the previous spatial position comprises:

the identifier (P11a) of the three-dimensional space in which the mobile object is situated, and of the position (P11b) of the navigation object selected in the three-dimensional space, in case of navigation between several 3D spaces having the same common network address;

or:

the network address (URL1-URL6) of the departure three-dimensional space and the position (P11b) of the navigation object selected in the departure three-dimensional space, in case of navigation between several 3D spaces each having its own network address.

* * * * *